United States Patent
Ke et al.

(10) Patent No.: US 11,814,527 B2
(45) Date of Patent: Nov. 14, 2023

(54) THREE-DIMENSIONAL PRINTING WITH SUPRAMOLECULAR TEMPLATED HYDROGELS

(71) Applicant: Trustees of Dartmouth College, Hanover, NH (US)

(72) Inventors: Chenfeng Ke, Lebanon, NH (US); Pengfei Zhang, Hanover, NH (US); Longyu Li, Lebanon, NH (US); Qianming Lin, West Lebanon, NH (US)

(73) Assignee: Trustees of Dartmouth College, Hanover, NH (US)

( * ) Notice: Subject to any disclaimer, the term of this patent is extended or adjusted under 35 U.S.C. 154(b) by 903 days.

(21) Appl. No.: 16/605,651

(22) PCT Filed: Apr. 27, 2018

(86) PCT No.: PCT/US2018/029780
§ 371 (c)(1),
(2) Date: Oct. 16, 2019

(87) PCT Pub. No.: WO2018/200944
PCT Pub. Date: Nov. 1, 2018

(65) Prior Publication Data
US 2020/0131383 A1    Apr. 30, 2020

Related U.S. Application Data

(60) Provisional application No. 62/490,635, filed on Apr. 27, 2017.

(51) Int. Cl.
*C09D 11/102*    (2014.01)
*B33Y 70/00*    (2020.01)
(Continued)

(52) U.S. Cl.
CPC .......... *C09D 11/102* (2013.01); *B29C 64/314* (2017.08); *B33Y 40/10* (2020.01);
(Continued)

(58) Field of Classification Search
CPC ..... C09D 11/102; C09D 11/04; C09D 11/101; B33Y 40/10; B33Y 40/703; B33Y 10/00;
(Continued)

(56) References Cited

U.S. PATENT DOCUMENTS

2016/0279868 A1*  9/2016  Burdick ............... C09D 11/101
2016/0333145 A1* 11/2016  De Cola ............... C08L 101/16
(Continued)

FOREIGN PATENT DOCUMENTS

CN         104151257 A      11/2014
WO      WO-18200944 A1     11/2018

OTHER PUBLICATIONS

International Search Report and Written Opinion for PCT/US18/29780, dated Aug. 31, 2018.
(Continued)

*Primary Examiner* — Jessica M Roswell
(74) *Attorney, Agent, or Firm* — Shackelford, Bowen, McKinley & Norton, LLP

(57) ABSTRACT

The invention provides a supramolecular polymer composition capable of co-assembly to maintain a three dimensional (3-D) macrostructural form after 3-D printing, made of a solvent, a template molecule; and a reactive component. The reactive component can be at least one monomer that is capable of hydrogen bonding with the template molecule to form a 1D supramolecular structure. The template may be an amphiphilic polymer. The monomer has at least two pendant groups capable of covalent crosslinking. The invention also includes a 3-D structure formed by crosslinking a 3-D printed supramolecular polymer composition, which option-
(Continued)

ally has a mesoporous structure. Also included is a method of manufacturing a 3-D structure by delivering a supramolecular polymer composition onto a surface of a substrate to form the 3-D structure.

45 Claims, 41 Drawing Sheets

(51) Int. Cl.
  *B29C 64/314* (2017.01)
  *B33Y 40/10* (2020.01)
  *B33Y 10/00* (2015.01)
  *B33Y 80/00* (2015.01)
  *B29C 64/106* (2017.01)
  *B29K 105/00* (2006.01)

(52) U.S. Cl.
  CPC ............ *B33Y 70/00* (2014.12); *B29C 64/106* (2017.08); *B29K 2105/0061* (2013.01); *B33Y 10/00* (2014.12); *B33Y 80/00* (2014.12)

(58) Field of Classification Search
  CPC ..... B33Y 80/00; B29C 64/106; B29C 64/314; B29K 2105/0061
  See application file for complete search history.

(56) References Cited

U.S. PATENT DOCUMENTS

2018/0273743 A1* 9/2018 Sumerlin .............. C08F 220/54
2019/0144569 A1 5/2019 Ke et al.

OTHER PUBLICATIONS

International Preliminary Report on Patentability for PCT/US18/29780, dated Nov. 7, 2019.
Lin et al.; Ring Shuttling Controls Macroscopic Motion in a Three-Dimensional Printed Polyrotaxane Monolith; Angew. Chem. Int. Ed. Mar. 22, 2017, vol. 56, pp. 4452-4457.
Zhou, et al.; Reversible Shape-Shifting in Polymeric Materials; Journal of Polymer Science, Part B .: Polymer Physics, 2016, vol. 54, pp. 1365-1380.
Chiappone, et al.; 3D Printing PEG-Based Hybrid Nanocomposites Obtained by Sol-Gel Technique; Applied Materials and Interfaces, 2016, vol. 8, pp. 5627-5633.
Lee, et al.; Novel Stereocomplexed Sol-Gel Transition Hydrogels Prepared from Physical Packing of Self-assembled PEO-PPO-PEO and PPO-PEO-PPO Copolymer Nanoscale Micelles; Journal of Nanoscience and Nanotechnology, 2008, vol. 8 (10), pp. 5236-5241. Abstract Only.
Li et al.; Roles of silanes and silicones in forming superhydrophobic and superoleophobic materials; J. Mater. Chem.A, 2016, vol. 4, pp. 13677-13725.
Brinker, C. (2004). Evaporation-Induced Self-Assembly: Functional Nanostructures Made Easy. MRS Bulletin, 29(9), 631-640. doi:10.1557/mrs2004.183.
Van der Voort et al.; Periodic Mesoporous Organosilicas; Chem. Soc. Rev., 2013, 42: 3913.
Krieg et al.; Supramolecular polymers in aqueous media; Chem. Rev. 2016, 116, 2414-2477.
G. Chen, M. Jiang; Cyclodextrin-based inclusion complexation bridging supramolecular chemistry and macromolecular self-assembly; Chem. Soc. Rev. 2011, 40, 2254-2266.
Z. Qi, C. A. Schalley; Exploring Macrocycles in Functional Supramolecular Gels: From Stimuli Responsiveness to Systems Chemistry; Acc. Chem. Res. 2014, 47, 2222-2233.
Weng,et al.; Understanding the Mechanism of Gelation and Stimuli-Responsive Nature of a Class of Metallo-Supramolecular Gels; J. Am. Chem. Soc. 2006, 128, 11663-11672.

K. Kinbara, T. Aida; Toward Intelligent Molecular Machines: Directed Motions of Biological and Artificial Molecules and Assemblies; Chem. Rev. 2005, 105, 1377-1400.
J. F. Stoddart; The chemistry of the mechanical bond; Chem. Soc. Rev. 2009, 38, 1802-1820.
I. Aprahamian; Hydrazone switches and things in between; Chem. Commun. 2017, 53, 6674-6684.
Harada, et al. .; Macroscopic self-assembly through molecular recognition; Nat. Chem. 2011, 3, 34-37.
Iamsaard, S., et al.; Conversion of light into macroscopic helical motion; Nat. Chem. 2014, 6, 229-235.
Li, Q., et al.; Macroscopic contraction of a gel induced by the integrated motion of light-driven molecular motors; Nat. Nanotech. 2015, 10, 161-165.
K. Iwaso, Y. Takashima, A. Harada; Fast response dry-type artificial molecular muscles with [c2]daisy chains; Nat. Chem. 2016, 8, 625-632.
Chen, J., et al.; Artificial muscle-like function from hierarchical supramolecular assembly of photoresponsive molecular motors; Nat. Chem. 2018, 10, 132-138.
Goujon, A. et al.; Bistable [c2] Daisy Chain Rotaxanes as Reversible Muscle-like Actuators in Mechanically Active Gels; J. Am. Chem. Soc. 2017, 139, 14825-14828.
L. Ionov; Hydrogel-based actuators: possibilities and limitations; Mater Today 2014, 17, 494-503.
Aβhoff, S. J. et al; High-Power Actuation from Molecular Photoswitches in Enantiomerically Paired Soft Springs ; Angew. Chem. Int. Ed. 2017, 56, 3261-3265.
Foy, J. T. et al.; Dual-light control of nanomachines that integrate motor and modulator subunits; Nat. Nanotech. 2017, 12, 540-545.
Coskun, A. et al; Great expectations: can artificial molecular machines deliver on their promise?; Chem. Soc. Rev. 2012, 41, 19-30.
Abendroth, J. M. et al; Controlling Motion at the Nanoscale: Rise of the Molecular Machines; ACS Nano 2015, 9, 7746-7768.
M. Hegde, et al; 3D Printing All-Aromatic Polyimides using Mask-Projection Stereolithography: Processing the Nonprocessable; Adv. Mater. 2017, 29, 1701240.
Wang, J. et al; All-in-One Cellulose Nanocrystals for 3D Printing of Nanocomposite Hydrogels; Angew. Chem. Int. Ed. 2018, 57, 2353-2356.
Hong, S. et al; 3D Printing of Highly Stretchable and Tough Hydrogels Into Complex, Cellularized Structures; Adv. Mater. 2015, 27, 4035-4040.
Roh, S et al; 3D Printing by Multiphase Silicone/Water Capillary Inks; Adv. Mater. 2017, 29, 1701554.
O'Bryan, C. S. et al; Self-assembled micro-organogels for 3D printing silicone structures; Sci. Adv. 2017, 3, e1602800.
Gladman, S. A. et al; Biomimetic 4D Printing; Nat. Mater. 2016, 15, 413-418.
Q. Lin, X. Hou, C. Ke; Ring Shuttling Controls Macroscopic Motion in a Three-Dimensional Printed Polyrotaxane Monolith; Angew. Chem. Int. Ed. 2017, 56, 4452-4457.
R. L. Truby, J. A. Lewis; Printing Soft Matter in Three Dimensions; Nature 2016, 540, 371-378.
Jungst, T. et al.; Strategies and Molecular Design Criteria for 3D Printable Hydrogels; Chem. Rev. 2016, 116, 1496-1539.
Zhang, X. et al; Rational Design of a Tetrameric Protein to Enhance Interactions between Self-Assembled Fibers Gives Molecular Hydrogels. Angew. Chem. 2012, 51, 4388-4392.
Ding, B. et al.; Two approaches for the engineering of homogeneous small-molecule hydrogels; Soft Matter 2013, 9, 4672-4680.
Martínez-Calvo, M. et al; Healable Luminescent Self-Assembly Supramolecular Metallogels Possessing Lanthanide (Eu/Tb) Dependent Rheological and Morphological Properties; J. Am. Chem. Soc. 2015, 137, 1983-1992.
G. Ducouret, et al; Rheological characterisation of bis-urea based viscoelastic solutions in an apolar solvent; J.Coll. Inter. Sci. 2007, 310, 624-629.
X. Yu, et al; Fluorescent and Electrochemical Supramolecular Coordination Polymer Hydrogels Formed from Ion-Tuned Self-Assembly of Small Bis-Terpyridine Monomer; Inorg. Chem. 2017, 56, 7512-7518.

(56) References Cited

OTHER PUBLICATIONS

Xie, Z et al; Shear-assisted hydrogels based on self-assembly of cyclic dipeptide derivatives; J. Mater. Chem. 2009, 19, 6100-6102.
A. J. P. Teunissen, et al; Mechanically Induced Gelation of a Kinetically Trapped Supramolecular Polymer; Macromolecules 2014, 47, 8429-8436.
Ouyang, L. et al; A Generalizable Strategy for the 3D Bioprinting of Hydrogels from Nonviscous Photo-crosslinkable Inks; Adv. Mater. 2017, 29, 1604983.
Bertlein, S. et al; Thiol-Ene Clickable Gelatin: A Platform Bioink for Multiple 3D Biofabrication Technologies; Adv. Mater. 2017, 29, 1703404.
Soler-Illia, G. et al; Chemical Strategies To Design Textured Materials: from Microporous and Mesoporous Oxides to Nanonetworks and Hierarchical Structures; Chem. Rev. 2002, 102, 4093-4138.
Alexandridis, P. et al.; Poly (ethylene oxide)-poly (propylene oxide)-poly (ethylene oxide) block copolymer surfactants in aqueous solutions and at interfaces: thermodynamics,structure,dynamics, and modeling; Coll. Surf. A: Phys. Eng. Asp. 1995, 96, 1-46.
C. J. Brinker, Y. Lu, A. Sellinger, H. Fan; Evaporation?Induced Self?Assembly: Nanostructures Made Easy; Adv. Mater. 1999, 11, 579-585.
Pérez-Sanchez, G. et al; Multiscale Model for the Templated Synthesis of Mesoporous Silica: The Essential Role of Silica Oligomers; Chem. Mater. 2016, 28, 2715-2727.
W. Y. Shih, W. H. Shih, I. A. Aksay; Elastic and Yield Behavior of Strongly Flocculated Colloids; J. Am. Ceram. Soc. 1999, 82, 616-624.
H. Yuk, X. Zhao; A New 3D Printing Strategy by Harnessing Deformation, Instability, and Fracture of Viscoelastic Inks; Adv. Mater. 2017, 29, 1704028.
A. Nakajima; Fluorescence spectra of anthracene and pyrene in water and in aqueous surfactant solution; J. Lumin. 1977, 15, 277-282.
Y. Hong, J. W. Y. Lam, B. Z. Tang; Aggregation-induced emission; Chem. Soc. Rev. 2011, 40, 5361-5388.
S. Tibbits; 4D Printing: Multi-Material Shape Change; Architect. Des. 2014, 84, 116-121.
Ge, Q. et al.; Multimaterial 4D Printing with Tailorable Shape Memory Polymers; Sci. Rep. 2016, 6, 31110.
Huang, L. et al; Ultrafast Digital Printing toward 4D Shape Changing Materials; Adv. Mater. 2017, 29, 1605390.
P. R. Selvin; The renaissance of fluorescence resonance energy transfer; Nat. Struc. Mol. Bio. 2000, 7, 730.
Cantekin, S. et al.; Benzene-1,3,5-tricarboxamide: a versatile ordering moiety for supramolecular chemistry; Chem. Soc. Rev. 2012, 41, 6125-6137.
De Greef, T. F. A et al; Supramolecular Polymerization; Chem. Rev. 2009, 109, 5687-5754.
T. Aida, E. W. Meijer, S. I. Stupp; Functional Supramolecular Polymers; Science 2012, 335, 813-817.
C. E. Hoyle, C. N. Bowman; Thiol-Ene Click Chemistry; Angew. Chem. Int. Ed. 2010, 49, 1540-1573.
Bakker, M. H. et al.; Multicomponent Supramolecular Polymers as a Modular Platform for Intracellular Delivery; ACS Nano 2016, 10, 1845-1852.
Leenders, C. et al.; Supramolecular polymerisation in water; elucidating the role of hydrophobic and hydrogen-bond interactions; Soft Matter 2016, 12, 2887-2893.
Ogura, Y. et al; Self-Assembly of Hydrogen-Bonding Gradient Copolymers: Sequence Control via Tandem Living Radical Polymerization with Transesterification; Macromolecules 2017, 50, 3215-3223.
H. Matsukizono, H. Murada, R.- H. Jin; Nanosheet-Stacked Chiral Silica Transcribed from Metal Ion- and pH-Tuned Supramolecular Crystalline Complexes of Polyamine-D-Glucarate; Chem.-Eur. J. 2014, 20, 1134-1145.
Garcia-Iglesias, M. et al.; Nanopatterned Superlattices in Self-Assembled C2-Symmetric Oligodimethylsiloxane-Based Benzene-1,3,5 Tricarboxamides; Chem.Eur. J. 2015. 21, 377-385.
Zhang, X. Q. et al.; In Vitro Gene Delivery Using Polyamidoamine Dendrimers with a Trimesyl Core†; Biomacromolecules, 2005, 6, 341-350.
Wijnen, B. et al; Open-Source Syringe Pump Library; Plos One 2014, 9, 107216.
Kulkarni, C. et al; Cooperativity Scale: A Structure-Mechanism Correlation in the Self-Assembly of Benzene-1,3,5-tricarboxamides; Acc. Chem. Res. 2017, 50, 1928-1936.

* cited by examiner

| Entry | TEOS (mL, mmol) | F127 (g, mmol) | Acid (mmol/mM) | EtOH / H₂O (mL) | Reaction Time (h) | Gel Transparency | Suitable for 3D printing |
|---|---|---|---|---|---|---|---|
| 1 | (6.0, 26.87) | (2.89g 0.23) | HAc (0.40/20) | 0 / 20 | 4 | opaque | No / formation of particle aggregates [b] |
| 2 | (7.0, 31.35) | | (0.30/15) | 5 / 15 | 4 | opaque | No / formation of particle aggregates [b] |
| 3 | (6.0, 26.87) | | (0.30/10) | 15 / 15 | 4 | transparent | No / elastic modulus too low [c] |
| 4 | (7.0, 31.35) | | (0.30/10) | 15 / 15 | 24 | transparent | No / elastic modulus too low [c] |
| 5 | (8.0, 35.83) | | (0.24/10) | 12 / 12 | 4 | transparent | Yes |
| 6 | | | (0.20/10) | 10 / 10 | 4 | transparent | Yes |
| 7 | | | | | 24 | transparent | Yes |
| 8 | | | | | 36 | opaque | Yes |
| 9 | | | | | 48 | opaque | Yes |
| 10 | | | | | 72 | opaque | No / formation of particle aggregates [b] |
| 11 | (4.0, 17.92) | | (0.16/10) | 8 / 8 | 4 | transparent | Yes |
| 12 | | | (0.24/10) | 12 / 12 | 4 | transparent | Yes |
| 13 | (0) | | (0.14/10) | 7 / 7 | 0 | not a gel | N/A[a] |
| 14 | (0) | | 0 | 10 / 10 | 0 | transparent | N/A[a] |
| 15 | (8.0, 35.83) | | | | N/A | transparent | Yes |

[a] N/A = not applicable. [b] Particle aggregates resulted in clogging of the printing tip. [c] The synthesized hydrogel deformed after 3D printing.

FIG. 3

| Stage | Relative volume (%)[a] | | Linewidth (μm) | | enhancement factor[b] | | L/d | |
|---|---|---|---|---|---|---|---|---|
| | 4 h[c] | 168 h[c] | 4 h | 168 h | 4 h | 168 h | 4 h | 168 h |
| As printed | 100.0 | 100.0 | 332.0 | 332.0 | 1.0 | 1.0 | 2.71 | 2.71 |
| After solvent evaporation | 33.3 | 14.5 | 145.5 | 205.8 | 2.3 | 1.6 | 4.36 | 2.44 |
| Calcined at 200°C | 8.4 | 4.9 | 65.0 | 151.7 | 5.1 | 2.2 | 7.06 | 2.23 |
| 700°C | 2.8 | 1.8 | 43.4 | 114.6 | 7.6 | 2.9 | 7.23 | 2.28 |
| 1000°C | 2.7 | 1.0 | 37.8 | 90.8 | 8.8 | 3.7 | 8.21 | 2.48 |

[a] The relative volume and linewidth percentage was calculated by dividing the size at each post-treatment stage by the as-printed size. [b] enhancement factor was calculated by dividing the as-printed linewidth with the linewidth at each post-treatment stage. [c] 4 h and 168 h are the stocking time in the sealed chamber.

FIG. 6

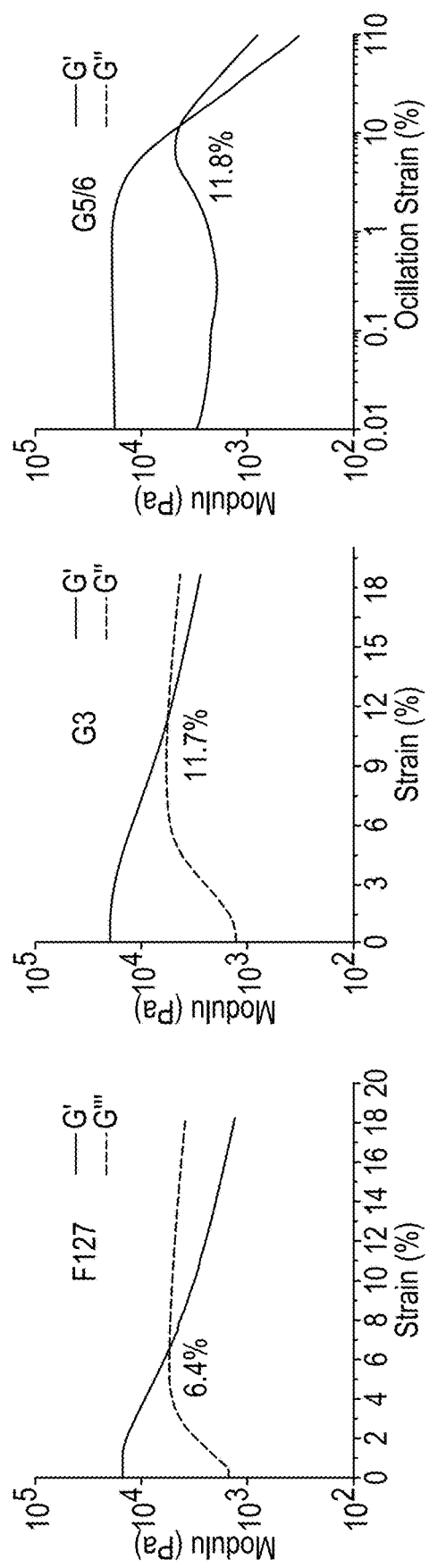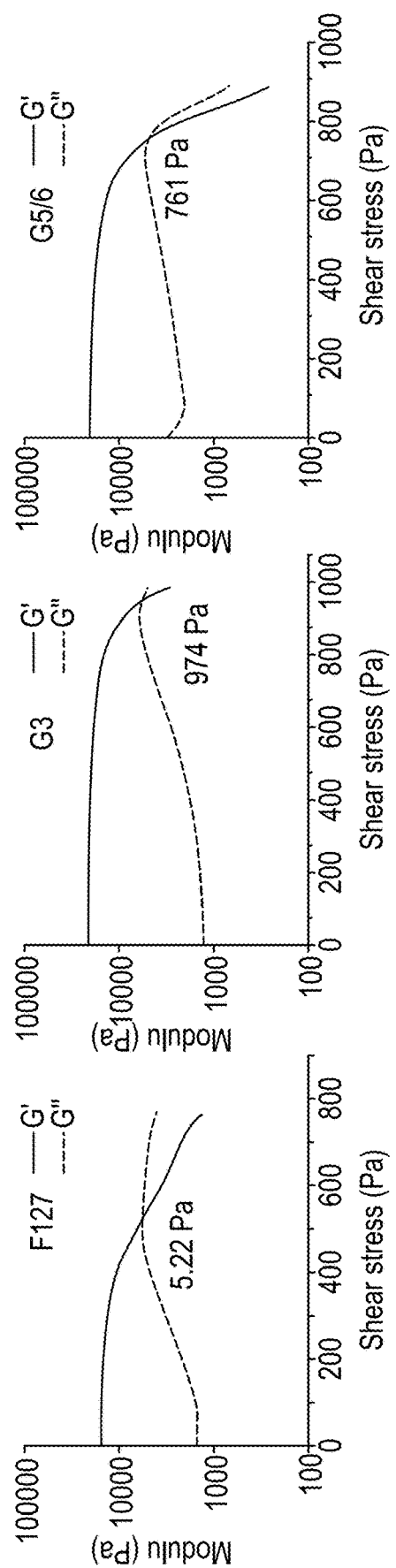
FIG. 11

Table S5. Measured dimensions of organosilica monolith M3 at each stage. 1st, 2nd and 3rd stages correspond to as-printed, cross-linked and template removed states respectively.

| Monomer | | TPE | |
|---|---|---|---|
| Stages | 1st | 2nd | 3rd |
| d (μm) | 362.00 | 188.00 | 154.80 |
| Enhanced factor [a] | 1.00 | 1.93 | 2.34 |
| L/d | 2.49 | 3.20 | 2.94 |
| x/y dimension (mm) | 9.08 | 6.01 | 4.55 |
| x/y shrunk ratio [b] | 0.00 | 0.33 | 0.49 |
| z (mm) | 11.76 | 5.24 | 3.43 |
| z shrunk ratio [c] | 0.00 | 0.55 | 0.71 |
| relative volume (%) [d] | 100 | 19.9 | 7.5 |

[a] enhancement factor is calculated by dividing the as-printed linewidth with the linewidth at each post-treatment stage. [b, c] Shrunk ratio is calculated by dividing the reduced dimension at specific stage with the as-printed dimension. [d] The relative volume is calculated by dividing the volume at specific stages with the as-printed volume.

FIG. 13

Scheme S2. Schematics of *fast* and *slow* solvent evaporation processes

| Stocking time in ~85% RH | BET (m²/g) | Langmuir (m²/g) | t-plot micropore area (m²/g) | Horvath – Kawazoe pore volume (cm³/g) |
|---|---|---|---|---|
| 4 h | 304.2 | 410.4 | 333.3 | 0.54 |
| 24 h | 326.5 | 380.9 | 359.5 | 0.45 |
| 36 h | 218.8 | 250.1 | 229.2 | 0.89 |

FIG. 27

| Entry | monomer (mg, mmol) | F127 (g, mmol) | [structure] (g, mmol) | solvent THF/EtOH/H₂O (mL) |
|---|---|---|---|---|
| 1 | 3 (140, 0.1) | (1.26, 0.1) | 0 | 5/5/5 [a] |
| 2 | 5 (155, 0.1) | (1.26, 0.1) | (183, 0.375) | 5/5/5 [b] |

[a] CH₃COOH aqueous solutions with a concentration of 20 mM CH₃COOH were employed.

[b] DMPA (8 mg) was used as photoinitiator

FIG. 28

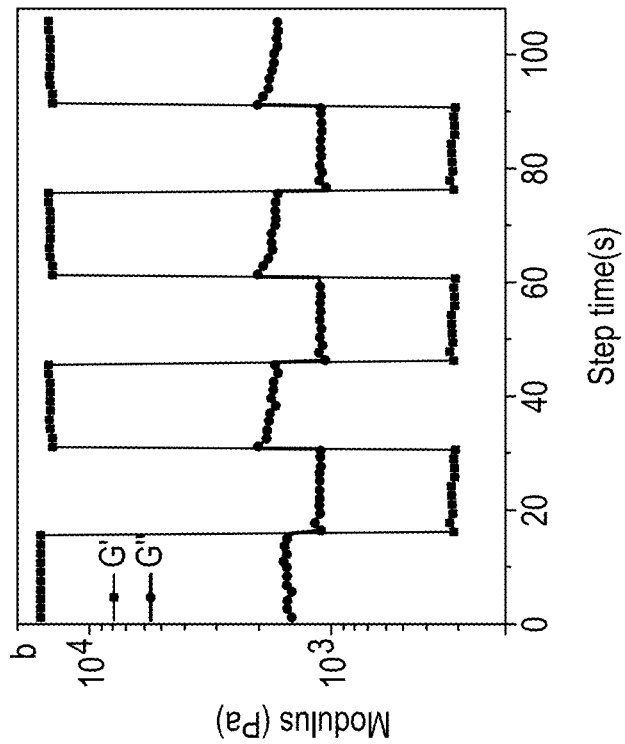
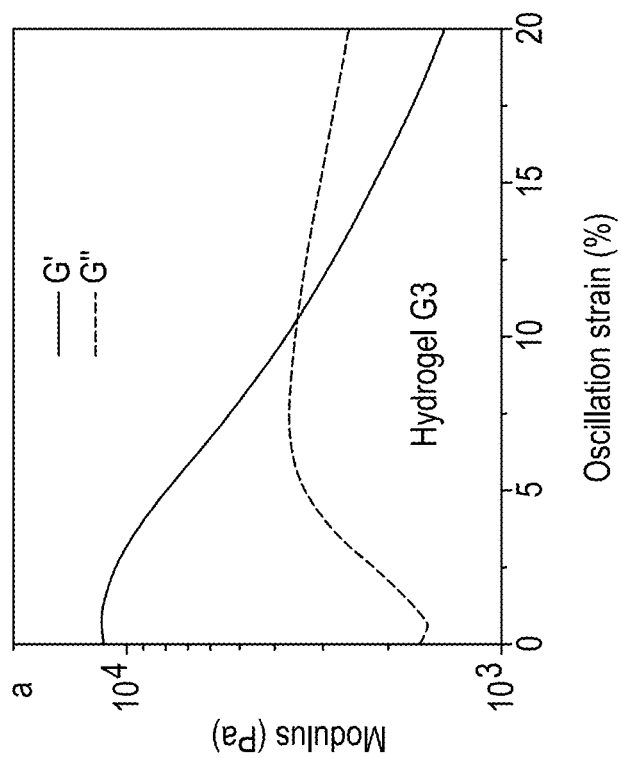
FIG. 29

THREE-DIMENSIONAL PRINTING WITH SUPRAMOLECULAR TEMPLATED HYDROGELS

CROSS-REFERENCE TO RELATED APPLICATIONS

This application claims the benefit of and priority to U.S. Provisional Application No. 62/490,635 filed Apr. 27, 2017, which is incorporated by reference herein in its entirety.

BACKGROUND OF INVENTION

"Direct-write" printing is one family of techniques in the field of "additive manufacturing," also known as 3-D printing. The material used in direct-write printing is dispensed as a fluid or some other form of flowable material (e.g., a suspension, a mixture of particles within a flowable matrix, a polymer at a temperature above its glass transition temperature.) The dispensed material hardens upon deposition, thus holding its as-deposited shape. This hardening can be initiated via contact with air (or oxygen), via a chemical initiated polymerization or co-polymerization, via a light-initiated polymerization, or via some other mechanism that changes the viscosity or phase of the dispensed fluid. In some cases, a metal powder can be dispensed in a binder and sintered.

A three-dimensional model of the 3D object to be printed is encoded into instructions for the printer and further organized into slices or layers perpendicular to a direction in which the material is deposited. These printing instructions are provided to the printing device regarding the location and quantity at which material is to be dispensed. By depositing material at locations within each layer prescribed by the printing instructions, material is progressively deposited as a 3D shape corresponding to the 3D object described by the three-dimensional model.

Integrating intelligent molecular systems into 3D printing materials and transforming their molecular functions to the macroscale with controlled superstructures can unleash the great potential for the development of smart materials. Compared to those macromolecular 3D printing materials, self-assembled small molecule-based 3D printing materials are very limited due to the difficulties of facilitating 3D printability as well as preserving their molecular functions macroscopically.

Self-assembled molecular systems with stimuli-responsive behavior and molecular mechanical motions have been demonstrated with great promise for the advancement of smart materials. Collectively harnessing their dynamic molecular features to the macroscale and performing complex tasks, however, remains a grand challenge, because it requires hierarchical control of materials' nanoscale chemical structure, mesoscale assembly, and macroscale three-dimensional (3D) architectures. Integrating assembled functional molecules with 3D printing technology is a promising path to achieve this goal, since it combines the controlled nanoscale assembly with designed macroscale 3D geometry.

Intelligent small molecular systems, however, often lack the required features to be integrated into 3D printing materials, which is a major roadblock that limits the number of smart materials available for use in 3D printing applications. For example, inks for direct ink writing (DIW, FIG. 1) need to possess shear thinning and rapid self-healing properties. Self-assembled molecular systems are often too weak to be self-supportive due to the low-degree of non-covalent crosslinking and/or too fast association/dissociation kinetics, or difficult to self-heal rapidly (within seconds) as a result of high kinetic barrier for the reformation of the superstructure. In effort to facilitate 3D printability to small molecules for DIW, Burdick et al. recently reported a simultaneous photo-crosslinking while DIW method to print previously non-compatible acrylic monomers. While in situ photo-crosslinking is desired for rapid prototyping, the readily formed polymer network can limit the control over the assembled superstructures because (1) the extrusion process will disrupt the ordered superstructures and those ill-defined structures will be fixed by rapid photo-crosslinking; and (2) the covalently linked polymer chains can perturb the molecular moieties from assembling and dissembling cooperatively, resulting in the loss of molecular features macroscopically.

It would thus be desirable to provide materials with an ordered superstructure which can be disrupted by an extrusion process, then self-heal upon printing prior to fixing by a polymerization process, while retaining molecular features macroscopically.

SUMMARY OF THE INVENTION

The present invention includes, in one aspect, a supramolecular polymer composition capable of co-assembly to maintain a three dimensional (3-D) macrostructural form after 3-D printing. The supramolecular polymer composition includes a solvent, a template molecule which includes at least partially linear amphiphilic or hydrophilic polymer; and a reactive component including at least one monomer. In one embodiment, the at least one monomer is capable of hydrogen bonding with the template molecule to form a 1D supramolecular structure, and wherein the monomer comprises least two pendant groups capable of covalent crosslinking.

In embodiments, the supramolecular polymer composition has a suitable viscoelastic property which allows for 3-D printing of the hydrogel to form a 3-D structure, and is capable of co-assembly after 3-D printing to maintain the printed three dimensional (3-D) macrostructural form. Further, the template molecule is removable after a chemical crosslinking step.

In another embodiment, the present invention provides a 3-D structure which includes a supramolecular polymer composition which includes a crosslinked polymer network comprising a crosslinked monomer. Optionally, the crosslinked polymer network has a mesoporous structure. The 3-D structure comprises internal cavities or voids that are interconnected in one, two or three dimensions within the structure.

In another embodiment, the present invention provides a method of manufacturing a 3-D structure. The method includes the steps of (a) delivering one or more supramolecular polymer compositions of the invention onto a surface of a substrate to form the 3-D structure, wherein the 3-D structure comprises internal cavities or voids that are interconnected in one, two or three dimensions within the structure. The supramolecular polymer composition has a suitable viscoelastic property which allows for 3-D printing of the supramolecular polymer composition to form a 3-D structure, and is capable of re-co-assembly after 3-D printing to maintain the printed three dimensional (3-D) macrostructural form.

The invention also includes articles of manufacture made by the methods of the invention.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 3 shows a table providing results of synthesis of TEOS, F127-hydrogels at various concentrations of components.

FIG. 6 shows a table providing the relative shrunk volume, linewidth and L/d ratio of the G1 printed lattice cubes at different post-treatment stages.

FIG. 11, panels (a)-(f), shows a graphical representation of storage and loss moduli of (left panel, top and bottom) F127 hydrogel at 21% wt; (middle panel, top and bottom) G3 hydrogel with F127=22% wt; and (right panel, top and bottom) G5/6 hydrogel, F127=24 wt %) as a function of oscillation strain and shear stress.

FIG. 13 shows a table providing the measured dimensions of organosilica monolith M3 at each stage, $1^{st}$ (as-printed), $2^{nd}$ (crosslinked) and $3^{rd}$ (template removed).

FIG. 27 shows a table with summary of porosity parameters of the silica monoliths with different polycondensation times.

FIG. 28 shows a table with conditions for preparation of hydrogels composed of organosilica and organic monomers for direct ink writing.

FIG. 29, panels (a)-(b), shows a graph with the strain sweep (left panel) and dynamic strain sweep (right panel) of G3.

DETAILED DESCRIPTION OF THE INVENTION

Figure 1A:
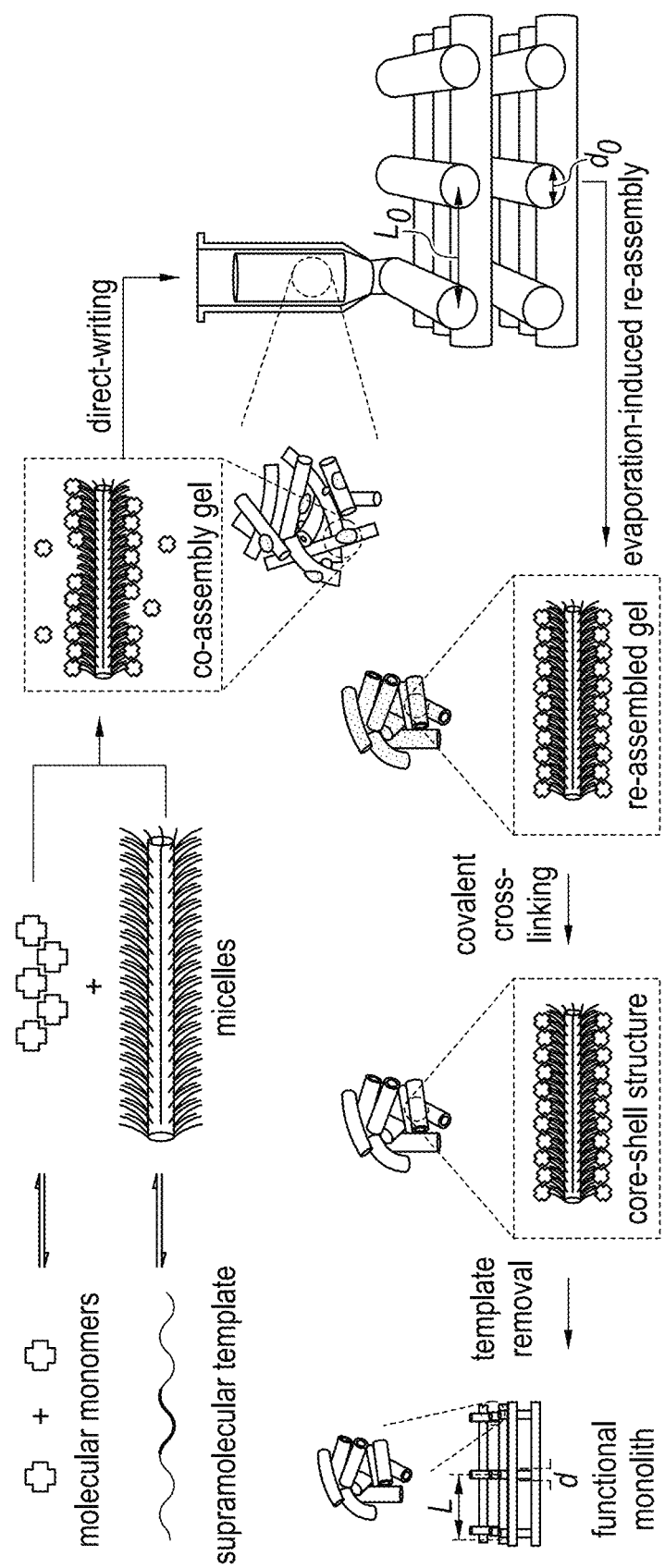
FIG. 1A shows a schematic with the design principle of hierarchical co-assembly direct ink writing.

In general, the terms and phrases used herein have their art-recognized meaning, which can be found by reference to standard texts, journal references and contexts known to those skilled in the art. The following definitions are provided to clarify their specific use in the context of the invention.

Here we report a general approach to integrate functional small molecules into direct ink writing 3D printing materials through the introduction of a supramolecular template. A variety of inorganic and organic small molecule-based inks are 3D printed and their superstructures are refined by post printing hierarchical co-assembly to effectively transform their molecular features to the macroscale. Through the spatial and temporal control of individual molecular events across nano-to macroscale, fine-tuned macroscale features of the monoliths have been successfully achieved, including hierarchical porous structures with enhanced printing resolution, dynamic fluorescence color change and macroscopic volume expansion/contraction.

To address the challenges as pointed out for photocrosslinking to form a polymer network after 3D printing, provided is a general method (see, e.g., FIG. 1) to integrate a variety of assembled inorganic and organic molecules (molecular monomers) into 3D printing inks through the introduction of supramolecular templates. The high-density multivalent supramolecular network formed between monomers, templates and monomer-templates can rapidly deform upon extrusion and reform to self-heal, as well as sufficiently strong to be self-supportive. After 3D printing, these molecular monomers and templates co-assemble hierarchically to refine their superstructures across nano-to-macroscale, affording homogeneous hard and soft functional monoliths with fine-tuned features such as high-resolution hierarchical porous structures, dynamic fluorescence color change, and macroscopic volume expansion and contraction that are collectively amplified from their molecular entities.

In this hierarchical co-assembly enhanced direct ink writing design (FIG. 1), molecular monomers and supramolecular templates co-assemble via multivalent noncovalent interactions to form a viscoelastic ink (step 1). After 3D printing (step 2), the molecular monomers and supramolecular templates in the 3D printed monolith co-assemble in a holistic manner, affording monoliths with hierarchically ordered superstructures (step 3). In this process, a localized reconfiguration of monomer and template is critical to maintain the macroscale structure against gravity. Subsequent chemical crosslinking (step 4) and template removal (step 5) staple these assembled molecular monomers together at the macroscale to afford the desired functional monoliths.

Embodiments of the present invention described herein include compositions and methods of using compositions for "high resolution" direct-write three-dimensional (3D) printing. As described below, a composition comprising (a) a template (b) a solvent (which includes individual solvents and combinations of solvents) and (c) reactive component (as well as combinations of reactive components) is used for direct-write printing a three-dimensional structures by successively forming (otherwise referred to as "printing," "dispensing," or "depositing") a plurality of layers. The composition and a method of processing the composition reduce a feature size of a printed feature (e.g., optionally referred to as "a line width resolution" for convenience of comparison and explanation) in one or more of at least four ways.

First, because reactive components can self-assemble in association with an appropriately selected template upon printing the composition into a three-dimensional structure, an as-printed feature size (which includes a "line width") is not limited by a printing nozzle port size (e.g., diameter) used in the direct-write 3D printer. Furthermore, in embodiments described herein, a final feature size of a printed object is not limited by physical dimensions of a port defined by a print nozzle for reasons that will be apparent upon reading the present disclosure. As explained below in more detail, various processes are used to further reduce an as-printed feature size, thus improving print resolution to lower than even 10 microns.

Second, after printing the composition into a 3D structure, a solvent of the composition is removed using a controlled evaporation technique. This controlled removal of the solvent causes volume, and feature size, of the as-printed structure to shrink uniformly, without formation of irregularities or lack of homogeneity in the features that could lead to failure.

Third, the template itself can be removed from a three-dimensional printed structure. This removal can occur by heating (also referred to as "calcining") or by using a solvent that is a good solvent for the template but does not solvate the reacted reactive components or their reacted products.

Figure 1B:
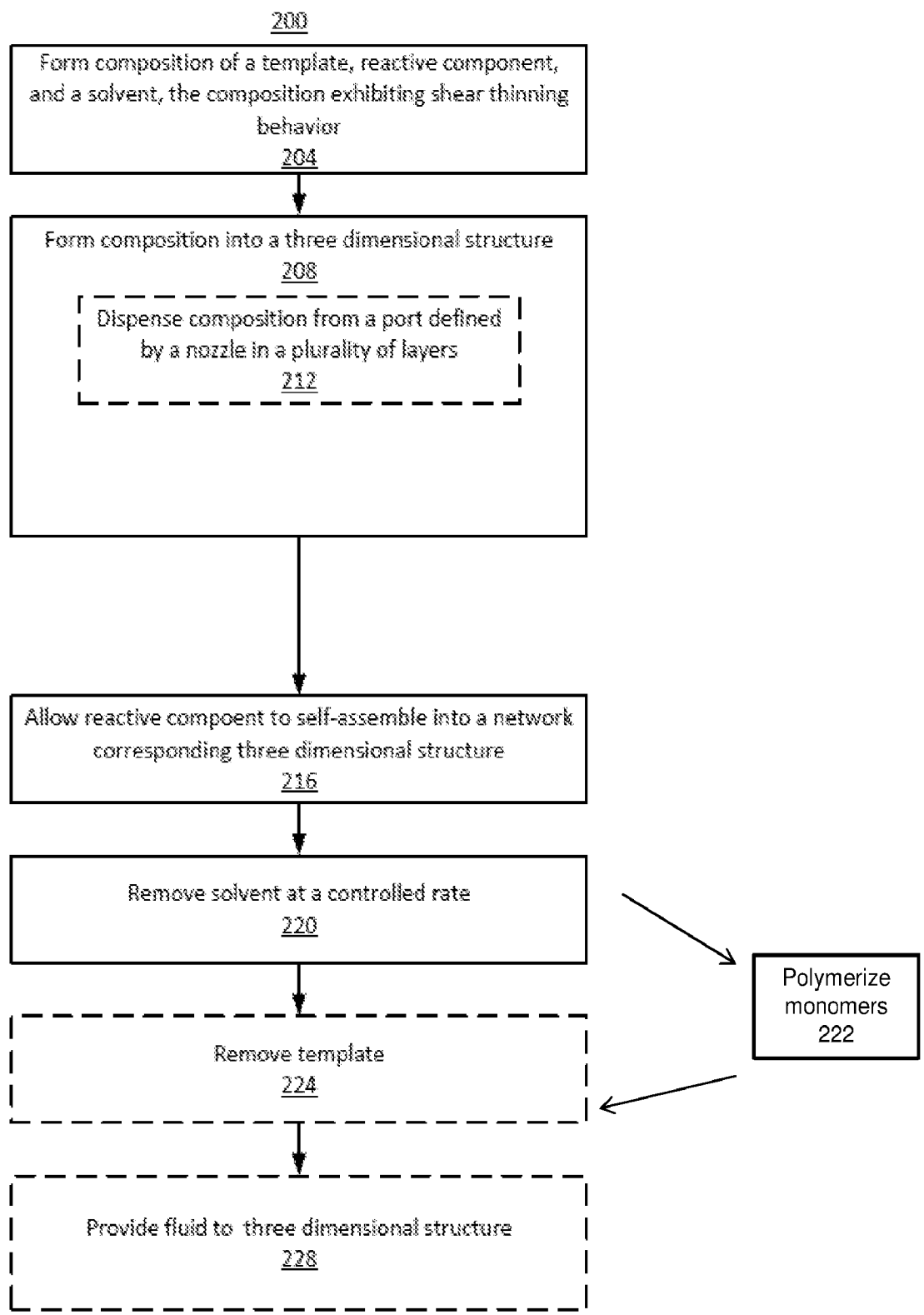
FIG. 1B shows a method flow diagram illustrating an example method for formation of a 3-D structure having a high print resolution.

The embodiments described herein are in contrast to conventional 3D printing techniques, which typically include stereolithography, powder bed, and extrusion techniques. For example, as schematically illustrated in FIG. 1A, stereolithography 3D printing exposes a viscous photo curable monomers (e.g. "Mammoth" resin) to UV radiation. The UV radiation is directed to points within a tank of the viscous photo curable monomer so that the monomer polymerizes in a shape or shapes corresponding to the structure to be "printed." Another conventional 3D printing technique, powder bed printing, is schematically illustrated in FIG. 1B. In this technique, layers of powder (whether polymeric or metallic) and are deposited. The particles of powder within a layer are then joined (e.g., for polymeric particles, melted by a laser and for metallic particles, adhered) in a shape that corresponds to the shape of a layer of the object to be fabricated. Layer after layer is thus formed, ultimately producing the intended three dimensional object. A third conventional 3D printing technique uses extrusion. In this technique, schematically illustrated in FIG. 1C, viscous polymers are extruded into a desired pattern. The polymer hardens and/or is cured (e.g., cross-linked) so as to form a rigid structure.

Each of these conventional techniques has drawbacks which are overcome using techniques of the present disclosure. An example benefit of embodiments described herein include the ability to use a wide variety of materials (e.g., molecular monomers) that are not compatible with conventional techniques for any of a number of reasons (e.g., lacking a suitable viscosity). Another example benefit of embodiments described herein include using a molecular template that allows monomer molecules to organize at a nanometer scale, thus creating highly ordered structures.

Compositions

Compositions described herein can be formulated and printed in three dimensions. An as-printed feature size (such as a line width) can be reduced significantly (by as much as a factor of 10, or more) after performing a solvent removal process, as described below in more detail. For example, some of the embodiments described include a reduction from an as-printed feature size of 360 µm to as small as 40 µm after solvent removal. It will be appreciated that the embodiments described herein can be used to print feature sizes less than 12.5 µm, less than 10 µm, or even less than 5 µm and that the feature size after solvent removal can be as low 1 µm or lower.

In one embodiment, the present invention includes a supramolecular polymer composition capable of co-assembly to maintain a three dimensional (3-D) macrostructural form after 3-D printing. The compositions of the invention, after 3D printing, and prior to a crosslinking step, allow the molecular monomers and supramolecular templates in the 3D printed monolith to co-assemble in a holistic manner, affording monoliths with hierarchically ordered superstructures. In this process, the monomers and templates of the invention provide for a localized re-configuration of monomer and template which allows the printed composition to maintain its macroscale structure against gravity.

The term "supramolecular polymer" is understood to mean an organic compound that obtains its polymeric properties, for example with respect to mechanical strength, etc., essentially through a combination of covalent bonds and secondary specific interactions, the latter preferably having a high bond strength and contributing substantially to the polymeric behavior.

In one form of supramolecular polymers, there has been interest in ordered templated mesoporous organosilicas, which can be prepared by use of a surfactant as a template and an organosilane compound. See, e.g., Van der Voort et al, "Periodic Mesoporous Organosilicas", *Chem. Soc. Rev.*, 2013, 42: 3913. These materials can be created by simultaneous use of a soft template material comprising a surfactant and a hydrolysable bis, tris etc. silane (as monomer) which can condense around the template. The silane compound can optionally be an organosilane having an organic functional linker between each of the silicon atoms, wherein the silicon atoms are also attached to a hydrolyzable group (generally ethoxy or methoxy groups). A number of surfactants are suitable for these systems and the synthesis conditions can be hydrothermal or evaporation-driven, which allows for co-assembly of the template and the organosilane. Generally, a surfactant that forms micelles is brought together with a hydrolyzable silane compound under acid conditions. The monomer can form organosilica around the micelles of the surfactant, with the surfactant being later removable leaving behind a porous, for example mesoporous, silica material behind. These materials are typically not crystalline, but are ordered on a mesoscopic scale.

Outside of the silica and organosilica area, the supramolecular polymer area includes those supramolecular polymers in aqueous solution in which the monomers are at least in part bound to one another via H-bridges. Advantages of such polymers are that, in principle, materials with polymeric properties can be obtained in which the bond via the H-bridges can be used in a reversible manner, and that the polymer can be composed from simple low-molecular-weight units. 1-dimensional supramolecular polymers are known in the art, and described in publications such as Krieg et al. "Supramolecular polymers in aqueous media", *Chem. Rev.* 2016, 116, 2414-2477.

In order to form the supramolecular polymer, there are art-known primary binding motifs that give rise to supramolecular polymers. These motifs include (1) H binding motifs; (2) π-π and hydrophobic interactions (3) host-guest complexes (4) systems based on DNA. Many supramolecular polymers use combinations of binding motifs that contribute to the polymer. In the present invention, the supramolecular polymers are formed by both H-binding and π-π and hydrophobic interactions. H binding motifs allow for self-assembly of supramolecular polymers, and well-known groups include the quadruple H bonding unit 2-ureidopyrimidinone. However, in aqueous solution, the solvent participates in (and competes with) H-bonding, which can destabilize supramolecular polymers. Therefore, in aqueous solution, the H-bonding motif, in order to form a supramolecular polymer, is, in embodiments, surrounded by a hydrophobic microenvironment.

For a number of art-known supramolecular polymeric materials, the H-bonding and hydrophobic motifs are covalently linked to long chain polymers, such as ureido-pyrimidinone units covalently linked to a polymer, such as polyethylene glycol, to form the supramolecular polymer. In embodiments, the present monomers of the invention are not covalently linked to the template molecules until after the 3D printing.

Known structures incorporating H-bonding motifs together with hydrophobic motifs include ureido-based systems, such as ureido-pyrimidinone and ureidotriazine units. Another H-bonding motif includes the bis-urea motif, which can be optionally separated with a hydrophobic group. Another motif the carboxamide motif, which is exemplified by the molecule benzenetricarboxamide (BTA). In aqueous solution, the template molecule allows the BTA motif to create hydrophobic pockets to stabilize the assembly with H bonds, π-π interactions. Other H-bonding motifs which can drive supramolecular polymers include 1,3,5 cyclohexyltrisamide.

In aqueous media, self-assembly can be driven by large, planar and uncharged r-conjugated moieties. In aqueous solution, the driving force for polymerization scales linearly with the increasing size of the hydrophobic surface, and stabilizes the formed supramolecular polymers. These systems are rigid and tend to form ordered stacks in accordance with steric and electrostatic properties of the hydrophobic surface. Stacking interactions can result in delocalized r-electrons which may result in properties such as semiconductivity, providing for sensing applications.

The compositions may include the following components. First, the composition may include a template and a monomer. Optionally, the template and monomer are in the form of a co-assembled supramolecular structure which may be also understood to be a 1-D supramolecular polymer. The supramolecular 3-D structure's molecular structure/network can be infiltrated by the molecules of a liquid, where such infiltration may or may not alter the shape or dimensions of the 3-D structure.

"Co-assembled" refers to the fact that is a process in which a disordered system of pre-existing components forms an organized structure or pattern as a consequence of specific, local interactions among the components themselves, without external direction. When the constitutive components are molecules, the process is termed molecular self-assembly (or, co-assembly wherein two or more molecular constituents are involved). Self-assembly (SA) in the classic sense can be defined as the spontaneous and reversible organization of molecular units into ordered structures by non-covalent interactions. The first property of a self-assembled system that this definition suggests is the spontaneity of the self-assembly process: the interactions responsible for the formation of the self-assembled system act on a strictly local level—in other words, the nanostructure builds itself.

The composition may comprise (a) a solvent. The solvent can be selected from any materials that are compatible with one or more of the template and reactive components. Practically, compatibility of the solvent means that the solvent will not react with the template itself or with the reactive components. Rather, the solvent will solvate the template and the reactive components. In some examples, the solvent facilitates micelle formation of the template. Micelle formation further facilitates "long range" self-organization between the template and the reactive components, as described in examples below.

Examples of the solvent can include an aqueous solvent which includes one or more of the following: water, an alcohol, an organic solvent, and an acid. Examples of the alcohol include ethanol, methanol, among others. When the monomer is a silicon or organosilane, an acid may be included in order to facilitate the condensation reaction. Examples of the acid include acetic acid, nitric acid, sulfuric acid, among others. The organic solvent may be an aqueous miscible solvent such as tetrahydrofuran (THF), acetone, among others.

The solvent, in one embodiment, may be a polar solvent generally having a larger dipole moment between atoms of different electronegativities. In one embodiment, the solvent will have a high dielectric constant (greater than 20) which allows the solvent to support e.g., hydrogen bonding with the solutes. The solvent may be a polar protic or polar aprotic solvent. In one embodiment, the polar protic solvent is useful for participating in hydrogen bonding in the compositions of the invention. Polar protic solvents include aqueous solutions comprising water, as well as alcohols such as t-butanol, n-propanol, ethanol, methanol, acetic acid and combinations thereof. Polar aprotic solvents have large dielectric constants (greater than 20) and large dipole moments but do not participate in hydrogen bonding due to lack of O—H or N—H bonds. The high polarity of polar aprotic solvents allows for dissolution of charged species. Examples of polar aprotic solvents include acetone, N,N-dimethylformamide, acetonitrile, dimethyl sulfoxide.

The template molecule may include an at least partially linear amphiphilic or hydrophilic polymer which has surfactant properties, which is capable of co-assembly with the monomer molecules in a manner in which to provide a suitable viscoelastic property to allow for extrusion and 3-D printing. The template-monomer co-assembly is understood to be a 1-D supramolecular polymer. The template can be any material that exhibits shear thinning (to facilitate dispensing even with local and/or long range self-assembly within the composition) and includes sites that interact with reactive components to self-assemble, as described herein. Examples of the template include block copolymers (including, for example, triblock copolymers or diblock copolymers). In some examples, a template copolymer includes blocks of polypropylene glycol and polyethylene glycol. In some examples, the copolymers include Pluronic® F127 and Pluronic® 123 available from BASF Corporation®. Alternative polymeric templates can include any polymers, copolymers, and surfactants that exhibit shear thinning behavior and/or can associate with corresponding reactive components so as to act as a template for reactive component self-assembly. Other factors used to select a template can include tendency to form micelles (i.e., "local" self-organization), dissolution by a solvent that does not solvate reacted reactive components and/or an ability to be combusted.

These polymers may comprise natural, synthetic, biocompatible, biodegradable, non-biodegradable, and/or biosorbable building blocks. Unless specifically restricted to one or more of these categories, the polymers may comprise materials from any one of these categories. For performance reasons, it may be desirable to incorporate biodegradable or porogenic materials into the design.

The term "polymer" is not intended to necessarily refer to a single polymer; rather it is intended to also connote a mixture of individual molecules, said mixture having a distribution of molecular weights, as is understood by those skilled in the art. The present invention is not limited to any particular molecule weight distribution, provided the distribution provides a mixture suitable for the purposes described herein. For example, a polymer comprising hyaluronic acid refers to a mixture of individual polymers, each molecule comprising hyaluronic acid.

The phrase "synthetic polymer" refers to polymers that are not found in nature, even if the polymers are made from naturally occurring biomaterials. Examples include, but are not limited to, poly(amino acids), copoly(ether-esters), polyalkylenes, oxalates, polyamides, tyrosine derived polycarbonates, poly(iminocarbonates), polyorthoesters, polyoxaesters, polyamidoesters, polyoxaesters containing amine groups, poly(anhydrides), polyphosphazenes, polysiloxanes, and combinations thereof.

The phrase "biocompatible polymer" refers to any polymer (synthetic or natural) which when in contact with cells, tissues or body or physiological fluid of an organism does not induce adverse effects such as immunological reactions and/or rejections and the like. It will be appreciated that a biocompatible polymer can also be a biodegradable polymer.

The at least partially linear polymer may be an amphiphilic or hydrophilic polymer, and may be ionic or nonionic. In one embodiment, the at least partially linear polymer is a nonionic amphiphilic polymer. The amphiphilic polymer may be present at a concentration either at, below or above its critical micellular concentration (cmc). In one embodiment, the polymer is used at above its cmc to allow for micellular formation in the compositions of the invention.

The polymer can be a homopolymer. In some embodiments, a "homopolymer" is a polymer where only one type of monomers is used. Examples of homopolymers include, but are not limited to, polyvinyl alcohol, poly(meth)acrylic acid, polyacrylamide, poly(ethylene oxide), poly(propylene oxide), poly(ethylene glycol), polyisoprene, poly(propylene glycol), poly(vinyl methyl ether), polyethylene, polypropylene, polyisobutylene, polybutadiene, polyureas, polysulfides, polydimethylsiloxane. In some embodiments, the linear molecule may be selected from the group consisting of poly(ethylene glycol), poly(propylene glycol), polydimethylsiloxane, polyethylene, and polypropylene.

In some embodiments, the polymer can be a copolymer. A "copolymer" can be called a "heteropolymer." In some embodiments, a copolymer refers to a polymer derived from two or more monomeric species. It can be a block copolymer, which includes two or more chemically distinct homopolymer blocks linked by covalent bonds. The block copolymer can be a diblock copolymer, a triblock copolymer, or a block copolymer with more than three distinct blocks. For example, it can be poly(ethylene glycol)-poly(propylene glycol)-poly(ethylene glycol) triblock copolymer. Poloxamers (PLURONICS) are another triblock copolymer which is composed of a central chain of poly(propylene oxide) (PPO) flanked by two chains of poly(ethylene oxide) (PEO).

In embodiments, the at least partially linear polymer is a nonionic polymer wherein the hydrophilic blocks are selected from the group consisting of polyethylene oxide (PEO), polyethylene imide, and polyvinyl alcohol, and the block of lesser hydrophilicity (and/or the hydrophobic block) is selected from the group consisting of polypropylene oxide (PPO), polydimethylsiloxane (PDMS), polystyrene, and polycaprolactone (PCL).

In one embodiment, the nonionic amphiphilic polymer is a copolymer comprising poly(ethylene oxide) and poly(propylene oxide), or a PPO-PEO-PPO triblock copolymer. The general formula a block copolymer surfactant is wherein X can be approximately 20-250 and Y can be approximately 10-150. In one embodiment, the copolymer is POLOXAMER 407 which is a triblock copolymer consisting of a central hydrophobic block of polypropylene glycol flanked by two hydrophilic blocks of polyethylene glycol (PEG). The approximate lengths of the two PEG blocks is 101 repeat units while the approximate length of the propylene glycol block is 56 repeat units. This particular compound is also known by the BASF trade name PLURONIC F127 or by the Croda trade name SYNPERONIC PE/F 127.

In some embodiments, the average molecular weight of the linear molecule, such as a polymer, may range from about 1 kDa to about 80 kDa, or from about 1 kDa to about 60 kDa, or from about 5 kDa to about 80 kDa, or from about 5 kDa to about 60 kDa. In some embodiments, the average molecular weight of the polymer can be from about 1 kDa to about 40 kDa, or from about 1 kDa to about 30 kDa, or from about 5 kDa to about 40 kDa, or from about 5 kDa to about 30 kDa, or from about 5 kDa to about 20 kDa. In some embodiments, the average molecular weight of the polymer may also range from about 1 kDa to about 10 kDa. In other embodiments, the average molecular weight of the polymer may range from about 20 kDa to about 30 kDa. In some embodiments, the "average molecular weight" can refer to the weight average molecular weight (Mw), methods to derive the same are known in the art.

The composition also includes a reactive component comprising a monomer. The monomer, functionally, is capable of hydrogen bonding with the template molecule to form a 1D supramolecular structure. The monomer also includes at least two pendant groups capable of participating in covalent crosslinking following a polymerization step. As indicated above, embodiments described herein can be used with any number of reactive components, some of which are listed above. For convenience of explanation to illustrate application of embodiments described herein, some examples described below refer to a system using tetraethyl orthosilicate, also known as tetraethoxysilane or "TEOS," as the reactive component. TEOS, solvated by a solvent or solution of solvents (as described above), can self-assemble with the template and be processed to produce 3D structure of meso-porous silicon dioxide. As used herein, meso-porous silicon dioxide (or "silica") defines pores within silica having approximate diameters (or characteristic dimensions) anywhere in the range of 2 nm to 50 nm. It will be appreciated that the reactive components (with compatible solvent and template) may prepared according to the embodiments described herein and that the description of the TEOS system is for convenience of explanation.

In one embodiment, the supramolecular polymer composition includes wherein the monomer is a hydrolyzable silicate or hydrolyzable organosilicate compound. In one embodiment, the hydrolyzable silicate or hydrolyzable organonosilicate compound includes wherein the monomer is selected from tetraethyl orthosilicate (TEOS) or a compound represented by Formula 1

(Formula 1)

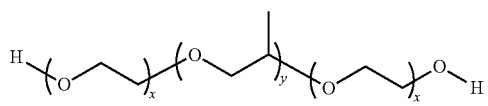

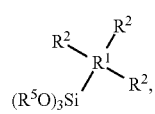

wherein $R^1$ is substituted or unsubstituted $C_1$-$C_{20}$ alkylene, substituted or unsubstituted $C_1$-$C_{20}$ alkenylene, substituted or unsubstituted $C_1$-$C_{20}$ cycloalkylene, substituted or unsubstituted $C_1$-$C_{20}$ cycloalkenylene, substituted or unsubstituted $C_5$-$C_{20}$ arylene, or substituted or unsubstituted $C_5$-$C_{20}$ heteroarylene; $R^5$ is independently selected from $C_1$-$C_4$ alkyl; and each $R^2$ is independently null, H, or —Si(OR$^5$)$_3$.

In another embodiment, the monomer is selected from a compound represented by Formula 2:

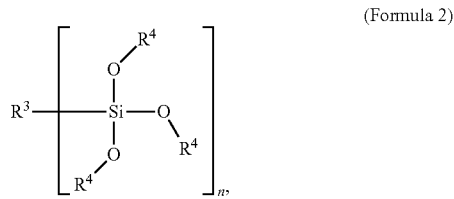

(Formula 2)

wherein $R^3$ is substituted or unsubstituted $C_1$-$C_{20}$ alkylene, substituted or unsubstituted $C_1$-$C_{20}$ alkenylene, substituted or unsubstituted $C_1$-$C_{20}$ cycloalkylene, substituted or unsubstituted $C_1$-$C_{20}$ cycloalkenylene, substituted or unsubstituted $C_5$-$C_{20}$ arylene, or substituted or unsubstituted $C_5$-$C_{20}$ heteroarylene; $R^4$ is independently selected from $C_1$-$C_4$ alkyl; and n is 1, 2, 3, 4, 5, or 6. In embodiments, the monomer is a compound represented by Formula 2 or Formula 3:

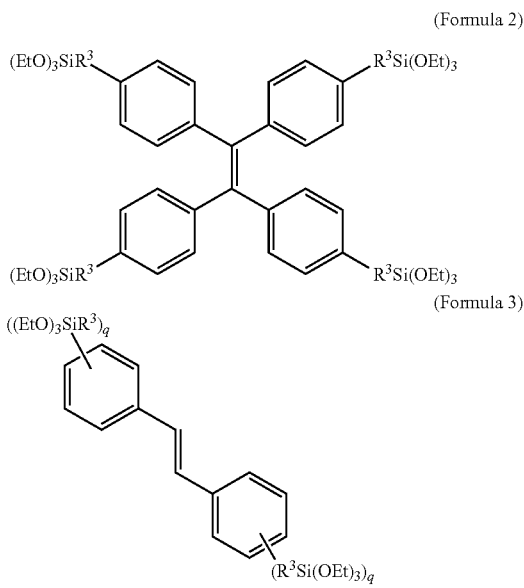

(Formula 2)

(Formula 3)

wherein $R^3$ is independently —R$^7$NC(O)R$^7$—, —R$^7$C(O)NR$^7$—, R$^7$NC(O)NR$^7$—, —R$^7$NCO$_2$R$^7$—, —R$^7$O$_2$R$^7$—, —R$^7$(NH)NR$^7$—, —C(NH)NR$^7$—, —R$^7$C(NH)NR$^7$—, —S(O)$_2$NR$^7$—, —R$^7$SO$_2$NHCOR$^7$—, —R$^7$SO$_2$NR$^7$—, —R$^7$SO$_2$R$^7$—; wherein each $R^7$ is the same or different and is independently selected from null, an alkylene, cycloalkylene, alkenylene, cycloalkenylene or alkynylene group; and wherein q is selected from 1, 2, 3, or 4.

In separate embodiments, the at least one monomer is an organic moiety. As discussed hereinabove, the monomer is selected to be capable of forming a supramolecular polymer assembly together with a template molecule. The monomer, in some embodiments, will contain at least one π-conjugated moiety such as an aryl group linked to at least one, two, three, four, five, six or more H-bonding groups. The monomer, in order to facilitate eventual covalent crosslinking after 3-D printing, will have at least two crosslinking groups which are, in some embodiments, linked to the aromatic hydrocarbon group through a H-bonding group.

Suitable monomer molecules for the supramolecular polymer compositions of the invention include compositions represented by Formula 3,

(Formula 3)

X may be an aromatic hydrocarbon group (aryl), which is linked through L to a crosslinkable group. L is a H-bonding group, and Y is crosslinkable group, wherein m is 2, 3, 4, 5 or 6. In embodiments, X is one of the following:

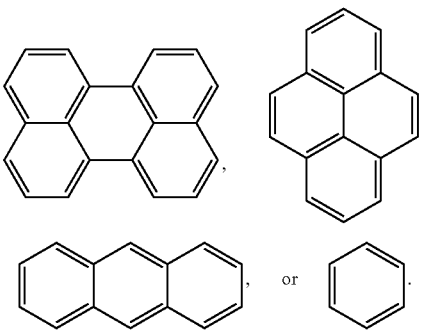

In embodiments, the crosslinking groups independently include one or more of the following groups

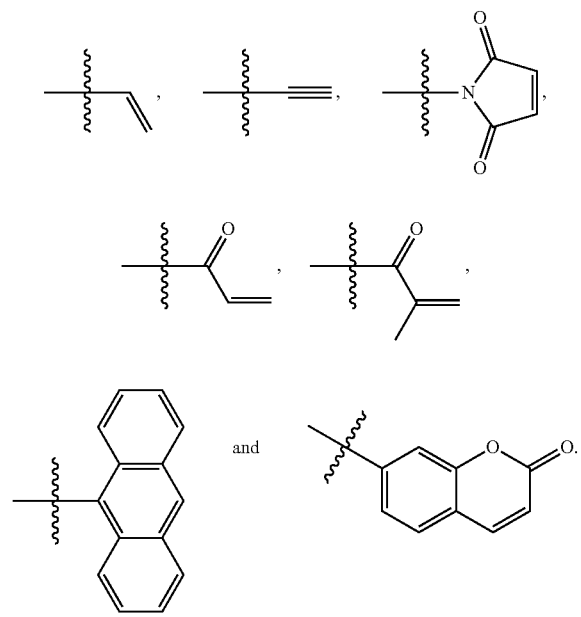

In embodiments, L is a H bonding group and may be selected from the following groups:

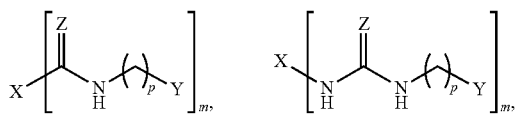

wherein Z is O or S, p is 0, 1, 2, 3, 4, or 5; and m is 2, 3, 4, 5, or 6, wherein X is substituted or unsubstituted aryl.

Alternatively, the at least one monomer includes an embodiment where two or more monomers form a charge donor/charge acceptor complex which is capable of self-assembly. In this embodiment, the at least one monomer comprises two monomers wherein the two monomers independently comprise a charge donor and a charge acceptor capable of forming a charge donor/charge acceptor complex. In one embodiment, the monomer comprises a charge donor molecule which may be selected from

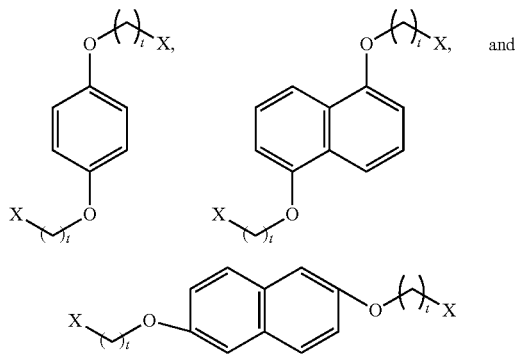

wherein X is substituted or unsubstituted aryl; and t is 0, 1, 2, 3, 4, 5 or 6.

In embodiments, the charge acceptor molecule may include a compound selected from the group consisting of:

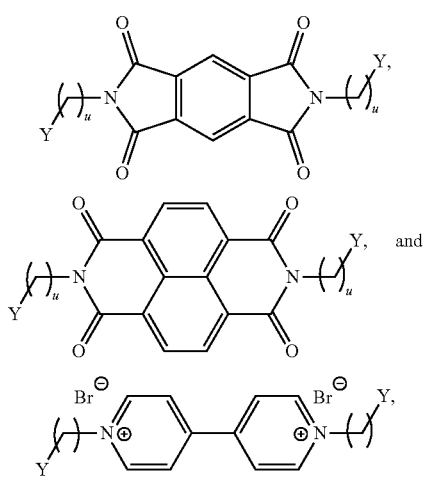

wherein u is 0, 1, 2, 3, 4, 5, or 6, and Y is selected from the group consisting of

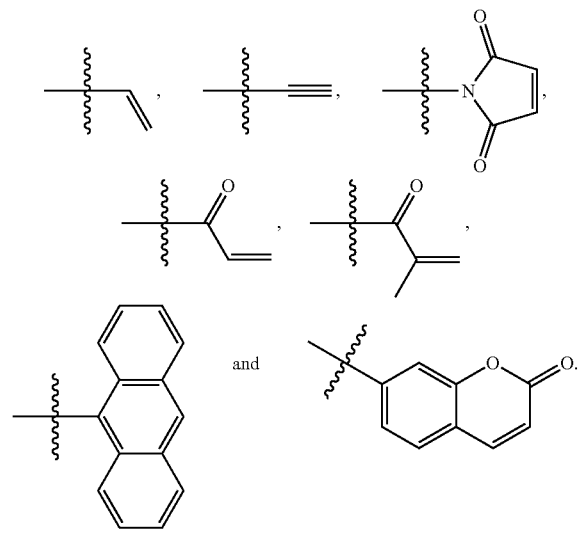

In particular embodiments, the hydrogen bonding group is a urea or carboxamide group and the aromatic hydrocarbon is aryl, such as substituted or unsubstituted $C_5$-$C_{20}$ arylene, or substituted or unsubstituted $C_5$-$C_{20}$ heteroarylene. The crosslinkable group may be allyl. In this embodiment, the monomer may comprise

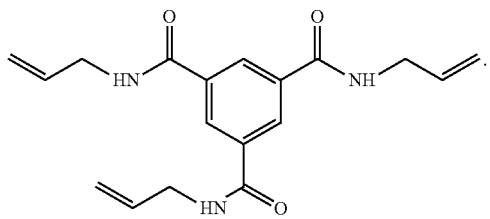 [SMILES: C=CCNC(=O)c1cc(C(=O)NCC=C)cc(C(=O)NCC=C)c1]

In embodiments, the at least one monomer may include a second monomer which is a crosslinking monomer, e.g., a "second crosslinking monomer." In embodiments, the chemical structure of the second crosslinking monomer does not directly participate in forming the supramolecular polymer composition, e.g., it is a "bystander" type material. In embodiments, the second crosslinking monomer comprises a crosslinking moiety capable of crosslinking with a crosslinkable group on the at least one monomer. In certain embodiments, the covalent crosslinking reaction is a condensation reaction or a free radical polymerization reaction. In related embodiments, the at least one set of chemical moieties capable of participating in a covalent chemical crosslinking reaction comprises an acrylate, acrylamide, optionally protected alcohol, aldehyde, alkyne, optionally protected amine, anhydride, azide, carboxy, epoxy, ester, hydrazide, ketone, maleimide, methacrylate, styrenyl, optionally protected thiol, or vinyl or vinyl sulfone group. In still further related embodiments, the product of the chemical covalent cross-linking reaction is an ester, ether, amide, hydrozone, polyacrylate, polymethacrylate, thioamide, thioester, thioether, or urethane.

The skilled artisan would appreciate how to modify the desired polymer to attach or incorporate, the chemical covalent cross-linkable moiety based on the guidance provided herein.

In embodiments, the crosslinking group on the second crosslinking monomer independently comprises at least one thiol group. In embodiments, the second crosslinking monomer is

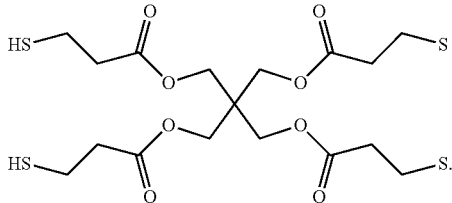

The supramolecular polymer composition also includes where the monomer includes an oligopeptide. In embodiments, the oligopeptide can include at least three peptide residues linked to least two crosslinkable groups. Oligopeptides and polypeptides are found in nature and are covalently linked, but contain side groups that provide H bonding as well as hydrophobic bonding and are capable of associating with the template molecules disclosed herein, and as such, are suitable for creation of the co-assembled supramolecular polymer compositions of the invention. The oligopeptides and polypeptides of the invention can be incorporated as monomer(s) of the present invention with H bonding and hydrophobic bonding associations which are predictable from those known in nature, for example, e.g., the well known associations between amino acid side groups. A variety of natural and non-natural peptides are suitable for incorporation into the oligopeptides and polypeptides of the invention. In one embodiment, the oligopeptide comprises 2, 3, 4, 5, 6, 7, 8, 9, 10 or more residues. In embodiments, the oligopeptide comprises at least one cysteine residue and at least two cysteine-reactive crosslinkable groups, or the oligopeptide comprises at least two cysteine residues and at least one cysteine-reactive crosslinkable groups.

In one embodiment, the oligopeptide is a compound of Formula 4:

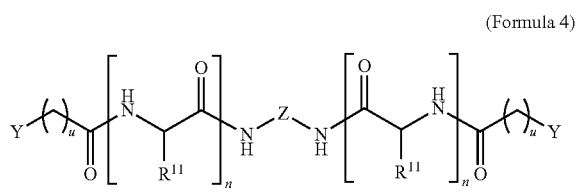

(Formula 4)

wherein each $R^{11}$ is independently an amino acid residue side group; Z is a linking group comprising substituted or unsubstituted $C^1$-$C^{20}$ alkylene, substituted or unsubstituted $C^1$-$C^{20}$ alkenylene, substituted or unsubstituted $C^1$-$C^{20}$ cycloalkylene, substituted or unsubstituted $C^1$-$C^{20}$ cycloalkenylene, substituted or unsubstituted $C^5$-$C^{20}$ arylene, or substituted or unsubstituted $C^5$-$C^{20}$ heteroarylene; wherein Y is any of

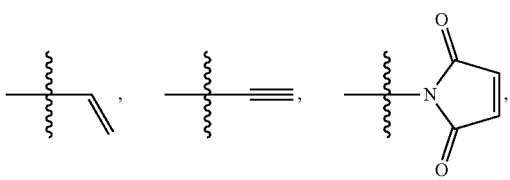

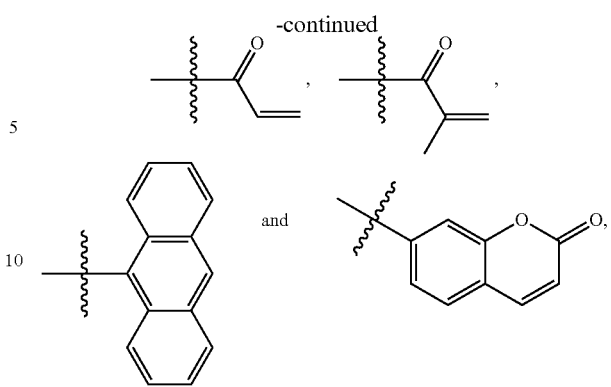

u is 0, 1, 2, 3, 4, 5, or 6, and n is 1, 2, 3, 4, 5, 6, 7 or 8.

In embodiments, $R^{11}$ is $H_2NR^{12}$—, $H_2NCOR^{12}$—, $HSR^{12}$—, $HO_2R^{12}$—, $R^{13}R^{12}$—, wherein $R^{12}$ is substituted or unsubstituted $C_1$-$C_{20}$ alkylene, substituted or unsubstituted $C_1$-$C_{20}$ alkenylene and $R^{13}$ is imidazoline, pyrazolidine, pyrrolidine, triazoline, pyridine, diazine, or triazine. In embodiments, $R^{11}$ is selected from at least one of

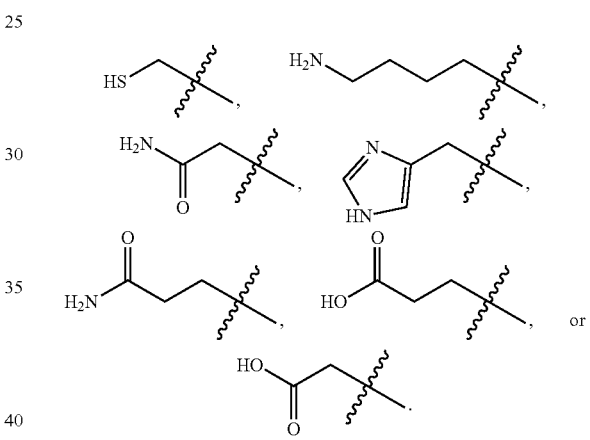

In one embodiment, at least one $R^{11}$ is $HSR^{12}$—, and at least one $R^{11}$ is selected from $H_2NR^{12}$—, $H_2NCOR^{12}$—, or $R^{13}R^{12}$—, wherein $R^{12}$ is substituted or unsubstituted $C_1$-$C_{20}$ alkylene, substituted or unsubstituted $C_1$-$C_{20}$ alkenylene and $R^{13}$ is imidazoline, pyrazolidine, pyrrolidine, triazoline, pyridine, diazine, or triazine.

In embodiments, Z is a linking group comprising substituted or unsubstituted $C^1$-$C^{20}$ alkylene, substituted or unsubstituted $C^1$-$C^{20}$ alkenylene, substituted or unsubstituted $C^1$-$C^{20}$ cycloalkylene, substituted or unsubstituted $C^1$-$C^{20}$ cycloalkenylene, substituted or unsubstituted $C^5$-$C^{20}$ arylene, or Z is —$NR^{14}N$—, wherein $R^{14}$ is substituted or unsubstituted $C^1$-$C^{20}$ alkylene, substituted or unsubstituted $C^1$-$C^{20}$ alkenylene. In embodiments, $R^{14}$ is substituted with carbamate or carboxyl.

The supramolecular polymer composition of the invention typically has a suitable viscoelastic property which allows for 3-D printing of the hydrogel (supramolecular polymer composition) to form a 3-D structure, and is capable of co-assembly after 3-D printing to maintain the printed three dimensional (3-D) macrostructural form. In an embodiment, the supramolecular polymer composition has a viscosity (shear-thinning) which allows for 3-D printing of the supramolecular polymer to form a 3-D structure, and a storage (elastic) modulus after crosslinking that allows for the 3-D structure maintain its 3-D structure without significant deformation upon storage or change in conditions, such as evaporation. These properties are critical to define as the major challenge associated with developing inks for direct writing is to tailor their rheological properties to allow for flow through the nozzle during the direct writing process (shear-thinning) and rapidly recover their mechanical strength afterward (self-healing).

In the present context, the term shear thinning has a meaning normally associated with that term—i.e., an effect where a fluid's viscosity (the measure of a fluid's resistance to flow) decreases with an increasing rate of shear stress. As contemplated herein, such shear-thinning compositions are composed of a template and at least one monomer that are held together in unique structural relationships by forces other than those of full covalent bonds, e.g., hydrogen bonds. Non-covalent bonding is critical in the described shear-thinning and self-healing properties. The compositions of the invention are preferably shear-thinning (which allows for their extrusion through needles) and rapidly self-healing (which allows the disrupted bonds to form again). Depending on the supramolecular chemistry used, properties of these materials can also be tuned, including mechanical/rheological properties and dynamic properties such as kinetics of bond formation.

In some embodiments, the supramolecular bonding in an ink material enables a solid or supramolecular polymer to be pushed through a channel, as in extrusion from a needle, as the driving stimulus of applied force causes bond dissociation that allows the material to behave in a fluid-like fashion. After the force is removed (for example, once the material leaves the needle and there are no tensile or compressive forces acting on the ink) bonds reform to stabilize the structure. Because the bonds dissociate during the application of force, a print head (e.g. needle) can be moved through the material, depositing an ink, which is then enclosed in the supramolecular polymer as bonds reform. Any breaks in the material left by the needle will be healed by bonds that reform.

The chemically covalent crosslinking step results in a covalently cross-linked supramolecular polymer having a mechanical stability that is higher than the mechanical stability of the printed composition before chemical cross-linking. In separate embodiments, this "higher" mechanical stability may be described in terms of improved resistance to bio-erosion—defined in terms of disassociation of the non-covalent linkages; i.e., improved resistance correlating with longer times necessary to realize degradation of the polymer network—or increased viscosity, stiffness or higher storage or loss modulus of the polymer network. Within each of these property classes, this higher stability reflects an improvement or increase in at least one physical property of at least about 10%, at least about 25%, at least about 50%, or at least about 100%, or at least about 2 times, at least about 5 times, or at least about 10 times relative to the corresponding property of composition.

In additional to the settable, shear thinning supramolecular polymer composition (i.e., which exists before the covalent crosslinking reaction(s) has occurred or is complete), individual embodiments of the present disclosure include those supramolecular polymer compositions, based on the previous descriptions, which have undergone at least one of the covalent cross-linking reactions, either partially or completely. This includes embodiments where any number of the at least one set of the chemical moieties capable of covalent crosslinking of settable, shear thinning supramolecular polymer composition has reacted, either partially or entirely.

In separate embodiments, the cured supramolecular polymer compositions exhibit a higher stability or lower diffusivity than the pre-cured (i.e., settable, shear thinning) supramolecular polymer composition. In several of these embodiments, the cured, covalently cross-linked supramolecular polymer exhibits a mechanical stability that is higher than the mechanical stability of the (pre-cured) shear-thinning supramolecular polymer composition (i.e., before covalent crosslinking). In separate embodiments, this "higher" mechanical stability may be described in terms of improved resistance to bio-erosion—defined in terms of disassociation of the non-covalent linkages; i.e., improved resistance correlating with longer times necessary to realize degradation of the polymer network—or increased viscosity, stiffness or higher storage or loss modulus of the polymer network. Within each of these property classes, this higher stability reflects an improvement or increase in at least one physical property of at least about 10%, at least about 25%, at least about 50%, or at least about 100%, or at least about 2 times, at least about 5 times, or at least about 10 times, relative to the corresponding property of the shear-thinning supramolecular polymer composition.

For compositions of the invention, in the composition the storage modulus may be at least about 1 to 100 kPa, and/or, in the composition the viscosity at a shear rate of 1 s−1 and 25° C. is between 5 and 5000 Pa·s. Alternatively, the storage modulus can be between about 5 and 70 kPa, between about 10 and 50 kPa. Alternatively, the viscosity at a shear rate of 1 s$^{-1}$ and 25° C. is between 10 and 2500 Pa·s is between 50 and 1500 Pa·s, between about 100 and 1000 Pa·s, between about 300 and 700 Pa·s.

With the respect to the chemical moieties capable of chemical covalent crosslinking, the chemical moieties can be the same or can be different chemical groups which react together to form a cross-link, e.g., a "set"; i.e., from this perspective, the "at least one set" may be envisioned as comprising a matched pair of chemical groups. In one example, a set may comprise a thiol group and a vinyl group, together capable of forming a thiol ether on reaction with light. Another set may comprise a hydrazide and an aldehyde or ketone, capable of forming a hydrazone. Or a set may comprise simply a single radical polymerizable moiety, such as an acrylate or methacrylate. In some embodiments, the polymer is methacrylated by methods known in the art.

These at least one set of chemical covalent cross-linkable moieties may be attached as a pendant to at least one monomer, e.g. via a linking group. In certain embodiments, where the chemical moieties capable of chemical covalent crosslinking are activated, or "triggered" by exposure to external stimulus, such as radiation in the microwave range (i.e., in the range of about 1 MHz to about 10 GHz). In still other embodiments, the external stimulus may be a change in pH or temperature, a free radical initiator, or a combination thereof. Where the chemical covalent cross-linking reaction is a free radical polymerization, the (hydro)gel may further comprise a thermal radical initiator. Exemplary free radical initiators include azobisisobutyronitrile, dilauroyl peroxide lauroyl acid, dioctanoyl peroxide caprylic acid, didecanoyl peroxide n-decanoic acid, di-n-propionyl peroxide propionic acid, bis(3,5,5-trimethylhexanoyl) 3,5,5-trimethyl peroxide hexanoic acid, dibenzoyl peroxide benzoic acid, bis(2,4-dichlorobenzoyl) 2,4 dichlorobenzoic acid peroxide, bis(o-methylbenzoyl) peroxide o-methyl benzoic acid, acetyl cyclohexane sulphonyl cyclohexane sulphonic peroxide acid, t-butylperoxypivalate pivalic acid, t-butyl peroxy-2-ethylhexanoate 2-ethyl caproic acid, t-butyl peroxy isobutyrate isobutyric acid, t-butyl peroxybenzoate benzoic acid, and mixtures thereof.

In embodiments, after crosslinking, the material, while still being referred to as a "supramolecular polymer composition", is actually no longer associated by only noncovalent interactions and instead is associated at least in part by covalent associations formed by crosslinking.

In one embodiment, the supramolecular polymer composition's monomer molecule is present in an amount, relative to the template, on a molar ratio basis, wherein the monomer is a hydrolysable silicate compound, such as TEOS, of about 150:1 monomer to template. The amount can be adjusted in accordance with the disclosure herein to yield a supramolecular polymer composition with properties suitable for 3D printing. Suitable properties include compositions that are a transparent gel, e.g., a clear gel (not opaque), compositions having no particle aggregates, compositions are able to associate to form a supramolecular polymer composition, compositions providing a high enough elastic modulus for printing, and other properties which are known to those of skill in the art of optimizing ink properties for 3D printing. Ratios for TEOS can range from about 130:1 to about 200:1, or about 140:1 to about 180:1, or about 150:1 to about 160:1. When the monomer is an organosilicate compound, the relative ratios of each component may include 1:1 molecule in the template-monomer co-assembled supramolecular polymer structure. The ratios of solvent and the amount of solvent to use can also be determined by one of skill, and in some embodiments, include a volume/volume ratio of alcohol, such as ethanol, to water of about 1:1. The time for the reaction is also relevant for producing inks with suitable properties, and includes between 1 minute and one year, or optionally about 1 hour, two hours, three hours, four hours, six hours, eight hours, ten hours, sixteen hours, twenty four hours, thirty six hours, forty eight hours, seventy-two hours, a week, two weeks, a month, or more.

The ratios found for supramolecular polymer compositions of the invention can be extrapolated to other at least partially linear polymers and to other monomer(s) by one of skill in the art using the guidance provided by the present invention.

The invention also includes a 3-D structure which includes a crosslinked polymer network comprising a crosslinked monomer, and wherein the 3D structure comprises internal cavities or voids that are interconnected in one, two or three dimensions within the structure. In embodiments, the 3D structure has a porous, such as a mesoporous, structure, which may optionally arise or been formed by removal of a template molecule as defined herein.

The invention also includes a structure/composition as claimed or a composition/structure prepared by any of the methods described herein whether as an intermediate or final structure or device. Such exemplary non-limiting structures may provide the basis for, or be incorporated into, such devices as blood analyzers, micro-/nano-fluidic conduction or mixing devices, macro-, micro-, or nano-scale reaction vessels, artificial/replacement tissue scaffolds, tissue models, pumps, balloons, sensors (e.g., for toxins/pathogens, biomarkers), filters, and cell culture platforms. In other embodiments, the exemplary non-limiting structures may provide the bases for, or be incorporated into, such devices as shaped implantable tissue graft scaffolds, implantable cellular matrices, drug release reservoirs, model tissues, implantable (hydro)gels, including those for filling/bulking spaces energy storage devices, wound dressings, and sorption devices. Such devices are considered within the scope of the present disclosure.

3D structure of the invention may include, without limit, any number of useful articles. Such articles include, for example, a shaped implantable tissue graft scaffold, an implantable cellular matrix, a drug release reservoir, a model tissue, an implantable gel, a wound dressing, a sensing device, a wearable device, a porous ceramic scaffold for catalyst loading, a porous device for molecular sieving, a porous device for gas separation, or a sorption device. Other articles include a porous ceramic scaffold, such as for catalyst loading; a porous device for molecular sieving, or a porous device for gas separation, for example.

The porous or expandable nature of the articles of the present disclosure are further developed by the ability to incorporate materials or devices within any one or more of the inks or any portion of the template material. For example, in certain embodiments, any one of the at least one of the ink materials, the template material, or any combination thereof, may independently comprise pharmaceutically active drugs or nutraceuticals; populations of cells (including mammalian stem cells and progenitor cells); peptides or peptide derivatives; one or more types of nanoparticles (carbon, metallic, semiconductor, or inorganic oxide, carbide, or nitride) or quantum dots; conductive fillers (such as nanoscale carbon or metals), fluorescent or phosphorescent materials; magnetic materials; or combination thereof. Any one or more of these materials may also comprise a functional electronic device, such that the resulting structure forms an electrical or sensing connection to such a device. Similarly, the template material may be positioned adjacent to an electronic substrate material, comprising such a device, such that later formed channels or tunnels have access to devices capable of acting as chemical sensors or other electronic components.

In one set of embodiments, these additional materials comprise at least one therapeutic compound or agent, capable of modifying cellular activity. Similarly, agents that act to increase cell attachment, cell spreading, cell proliferation, cell differentiation and/or cell migration in the scaffold may also be incorporated into the (hydro)gels. Such agents can be biological agents such as an amino acid, peptides, polypeptides, proteins, DNA, RNA, lipids and/or proteoglycans. These agents may also include growth factors, cytokines, proteases, and protease substrates. Additionally and/or alternatively, the (hydro)gels of the present disclosure may comprise an antiproliferative agent, an immunosuppressant drug, and/or a non-thrombogenic or anti-adhesive substance. The cells which can be used according to the teachings of the present disclosure may comprise non-autologous cells or non-autologous cells (e.g. allogeneic cells or xenogeneic cells), such as from human cadavers, human donors or xenogeneic (e.g. porcine or bovine) donors. The cells may comprise a heterogeneous population of cells or a homogeneous population of cells. Such cells can be for example, stem cells, progenitor cells, or differentiated cells. Stem cells may include adipose derived stem cells, embryonic stem cells, bone marrow stem cells, cord blood stem cells, mesenchymal stem cells, adult stem cells, and pluripotent or induced pluripotent stem cells. Mesenchymal stem cells are preferred. Furthermore, such cells may be live or non-viable and/or of autologous origin or non-autologous origin, such as postpartum-derived cells. Typically the cells are selected according to the tissue being generated.

In additional to the settable, shear thinning supramolecular polymer compositions (e.g., which exists before the covalent crosslinking reaction(s) has occurred or is complete), individual embodiments of the present disclosure include those supramolecular polymer compositions, based on the previous descriptions, which have undergone at least one of the covalent cross-linking reactions, either partially or completely. This includes embodiments where any number of the at least one set of the chemical moieties capable of covalent crosslinking of the supramolecular polymer composition has reacted, either partially or entirely.

In separate embodiments, the crosslinked supramolecular polymer compositions exhibit a higher stability or lower diffusivity than the pre-crosslinked material (i.e., crosslinkable, shear thinning supramolecular polymer.) In several of these embodiments, the covalently cross-linked supramolecular polymer composition exhibits a mechanical stability that is higher than the mechanical stability of the (pre-crosslinked) shear-thinning supramolecular polymer composition (i.e., before covalent crosslinking).

In some embodiments, further elaborated below, at least one, and preferably all, of the ink materials, the template materials, or additives thereof are biocompatible. In some cases, at least one, and preferably all, of the ink materials, the template materials, or additives thereof are suitable for implanting into a mammal, preferably a human.

Printing Method

As indicated above, embodiments described herein include using a composition of a shear thinning template, a solvent, and reactive components to form a three-dimensional structure having a feature size that is as low as approximately 20 µm or lower.

Figure 2A:
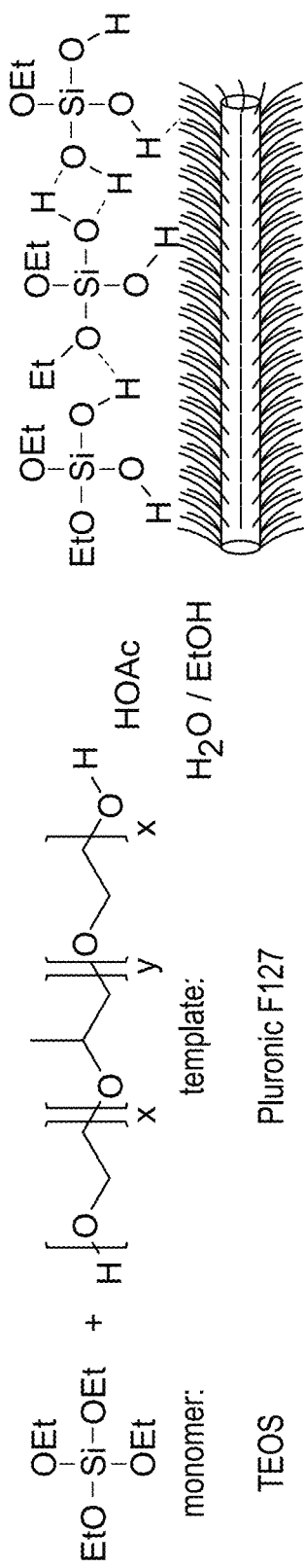
FIG. 2A shows a schematic for the preparation of TEOS/F127 co-assembled supramolecular hydrogel inks.

An example method 200, illustrated in FIG. 1B, is one method by which embodiments described herein can be performed. Schematic illustrations of some elements of the method 200 appear in FIGS. 1A, 2A, and 2B. Concurrent reference to FIG. 1A and FIGS. 2A to 2B will facilitate explanation. The method 200 begins by forming 204 a composition that includes a template, TEOS, and a solvent. The composition is then formed 208 into a three-dimensional structure. Techniques for forming 208 the three-dimensional structure, at a high level, include using a printing apparatus and executable instructions that can instruct the printing apparatus to dispense the composition in a plurality of layers, each layer corresponding to a pattern, so that the plurality of layers cumulatively forms the three-dimensional structure.

The printing apparatus includes at least a stage and a print head that, either collectively or individually, are capable of three-dimensional movement so that the plurality of layers may be deposited in three dimensions according to a pattern (and in a quantity) prescribed by the executable instructions. The print head includes a nozzle that defines a port through which the composition is dispensed 212 into a layer and an articulation mechanism that enables one, two, or three-dimensional movement of the print head. While successive deposition of layer is described herein as the printing method, it will be appreciated that other techniques of 3D printing may also be used with embodiments herein. In examples, the port defined by the nozzle can have a diameter of less than 20 microns, less than 15 microns, less than 12.5 microns, less than 10 microns, and less than 5 microns.

The print head is further in communication with a reservoir of the composition and in electrical communication with the executable instructions. The respective ink materials may be delivered by any suitable means, but in preferred embodiments, at least one of the ink materials is delivered by injection into or through the respective volume of the preceding ink or template material. Such injection may be accomplished by using a needle, cannula, catheter, or other tubing. It should be apparent that, in such cases, the dimensions of the internal volumes of the ink material(s) is defined by the internal dimensions of the injection devices used. As devices ranging from nanotube cellular probes through standard micron or millimeter dimensioned needles or other such devices are known, and can be used by these inventive methods, these internal structures may be defined as having at least one cross-sectional dimension (typically the diameter of a channel) in a range of from about 100 nm to about 500 nm, from about 500 nm to about 1000 nm, from about 1 micron to about 5 microns, from about 5 microns to about 10 microns, from about 10 microns to about 50 microns, from about 50 microns to about 100 microns, from about 100 microns to about 500 microns, from about 500 microns to about 1000 microns, from about 1 millimeter to about 5 millimeters, from about 5 millimeters to about 10 millimeters, or larger, or any combination of two or more of these ranges. Note also that, depending on the nature of the specific ink materials used, their further processing (for example, polymerization or crosslinking as described below) may result in expansion or contraction of the initially injected volumes, which may need to be considered in defining the ultimately desired dimensions. While the delivery devices typically have circular or ovoid cross-sections, devices with other cross-sectional shapes (e.g., triangles, squares. or other polygonal shapes, stars, etc.) can be employed to derive correspondingly shaped channels or tunnels.

Similarly, the lengths of internal channels or dimensions of internal voids can be any of the dimensions described above, as these are defined by the size of the original templates, which can be on the order of from about 100 nm to 1000 nm, from about 1 micron to about 1000 microns, from about 1 mm to about 10 mm, 100 mm, 1000 mm, or even larger. The templates can also be shape molded prior to providing (injecting) the ink materials, thereby providing articles nearly shape fit for their ultimate use, even before introduction of the inks, or subsequent selective removal techniques.

Upon deposition, the supramolecular polymer composition self-assembles 216 in association with micelles of the template. Various illustrations of this self-assembly appear in FIGS. 1A and 2B. In the example shown, the template (either one of or both of block copolymers commercially available as Pluronic® F127 and Pluronic® P123, alternatively known as Poloxamer), begins to organize into micelles. In the illustration, the monomer molecules, e.g., TEOS molecules (indicated in FIG. 1A as "molecular monomers") begin to co-assemble proximate to the exposed blocks and/or functional groups on exterior surfaces of the micelle to form a supramolecular polymer. The extent of self-assembly depends, in part, on the strength of interaction between the reactive components and the template, and a length of time between formation of the composition and deposition of the composition. Regardless, the composition can be dispensed even upon some self-assembly of the template into micelles and co-assembly of the template and reactive components because of the shear thinning behavior exhibited by the composition.

The micelle structure and co-assembly of the micelles with, e.g., TEOS molecules can be disrupted upon dispensing. However, self-assembly recurs after dispensation. After dispensation and the subsequent self-assembly (or re-assembly), when the monomer is a hydrolyzable silicate, such as TEOS, the molecules condense with one another, leaving the template molecule still associated (removal of template ultimately forms meso-porous silica; this is indicated as "covalent cross-linking" in FIG. 1A).

Solvent present in the composition as dispensed in the three-dimensional structure is then removed at a controlled rate. Removal can occur by evaporation or assisted evaporation (e.g., decreasing relative humidity or elevated temperatures). In examples, the solvent is removed 220 at a controlled rate using an environment that has a controlled relative humidity. For example, a three-dimensional structure prepared according to embodiments described herein can be exposed to an environment in which the relative humidity is maintained. By controlling the relative humidity, the solvent evaporation rate from the composition used to form the three-dimensional structure can be controlled. In one example, the relative humidity can be maintained by disposing the three-dimensional structure within a closed environment with an exposed bath of potassium chloride (KCl). KCl can maintain a relative humidity within a closed environment that is about 80% at 20°-25° C. In another example, the relative humidity can be maintained by disposing the three-dimensional structure within a closed environment with an exposed bath of lithium chloride (LiCl). LiCl can maintain an relative humidity within a closed environment that is about 15% at 20°-25° C. These relative humidity values are approximate to within 5%.

Figure 2B:
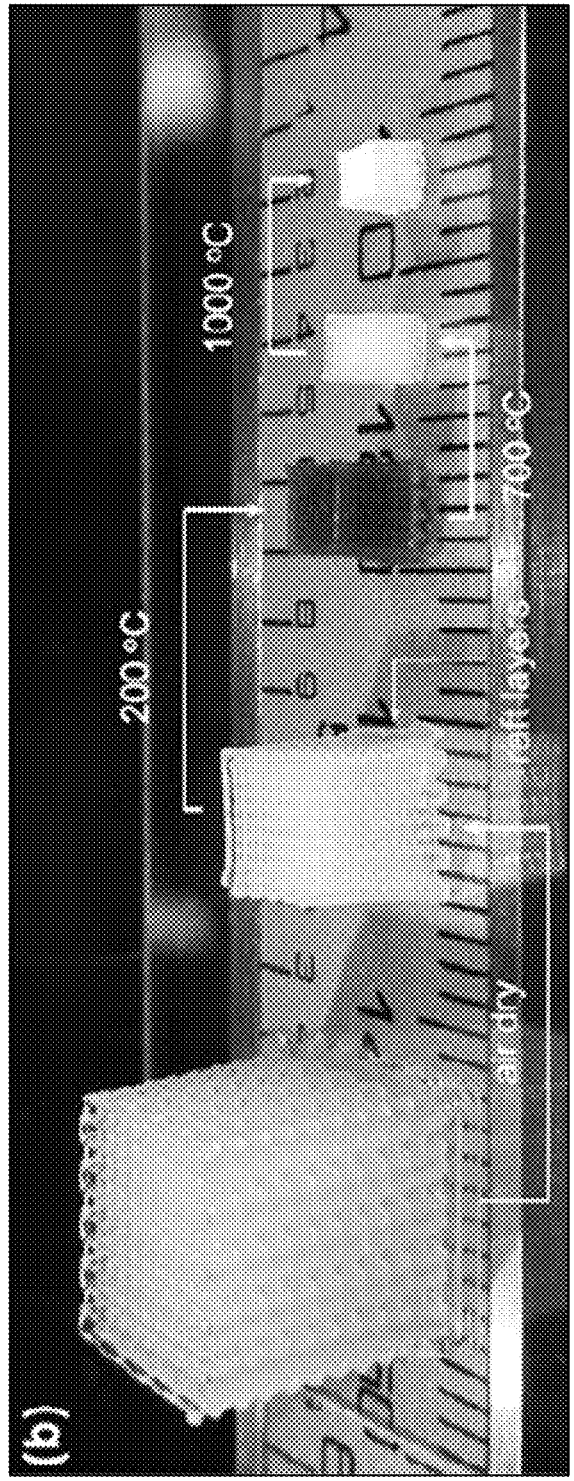
FIG. 2B shows a photograph of post-printing co-assembly of a woodpile lattice cubes (9×9×9.6 mm) composed of G1 at room temperature and calcinated at 200° C., 700° C., and 1000° C., respectively.

Controlling the evaporation rate of the solvent helps prevent inhomogeneities and/or discontinuities from forming in the three-dimensional structure, allowing for isotropic contraction. For example, FIG. 2B illustrates a three-dimensional structure prepared according to embodiments described herein, including removing the solvent using a controlled evaporation rate. The structure shown includes features that are uniform and continuous. Variations in line width and/or feature size in a three-dimensional printed structure can be problematic depending on the application, as will be appreciated. As such, the techniques described herein that can reduce feature size variation are beneficial.

In alternative embodiments, method step 222 may be performed where the monomers are crosslinked via methods disclosed elsewhere herein.

The method 200 continues with at least two optional elements. First, having formed 208 a three-dimensional structure using the composition and removed 220 solvent from the composition at a controlled rate, the template can be removed 224 from the three-dimensional structure. One method of removing 224 the template is by calcining, which has at least two possible effects. First, calcination converts the template (which in the examples described herein is a carbon-based polymer) to gaseous phase molecules (including CO and $CO_2$). The material remaining after calcination is primarily meso-porous silica. Second, feature size of the three-dimensional structure shrinks during calcination, further reducing minimum feature size that can be achieved using embodiments of the present disclosure. In examples, line widths 167 μm, 180 μm, and 262 μm after removal 220 of solvent where reduced to 65 μm, 103 μm, and 179 μm, respectively, after calcination. The extent of feature size reduction (which can also be referred to as "line width resolution improvement") is partially a function of an extent to which TEOS (or other template) has polymerized during preceding elements of the method 200. The more extensive template polymerization, the less line width resolution improvement will be exhibited upon calcination.

Calcination can be performed by heating the three-dimensional structure in any atmosphere that support combustion and at a temperature high enough to combust the template (but not so high as to cause degradation of the meso-porous silica or other molecule formed by reactive components). For example, calcination can occur by heating the three-dimensional structure to within any of the following ranges: 400° C. to 700° C., 700° C. to 900° C., 900° C. to 1200° C. Heating durations can be empirically determined based on a volume and/or complexity of the three-dimensional structure, but in examples can be on the order of 24 hours, 36 hours, or 48 hours.

In other examples, rather than calcination, a template can be removed 224 by dissolving the template with a solvent, whether ethanol, an organic solvent, an acid, or a base. The solvent selected should solvate the template, but not substantially solvate the molecule formed by reaction of the reactive component.

A second optional element is to provide 228 a fluid to the three-dimensional structure that has had a template material removed 224. In this way, another material, whether a polymer, a solution or suspension with electrically conductive properties, or some other material, can be infiltrated into the meso-pores formed by TEOS reaction.

As indicated above, solvent evaporation from composition in an as-printed three-dimensional structure is one factor by which embodiments described herein achieve high line width resolution (in other words, low or small feature size dimensions).

At a high level, after forming the three-dimensional structure (as described above in the context of the method 200), solvent is removed at a controlled rate using an atmosphere having a controlled and/or stable relative humidity. This is referred to herein as a "first humidity controlled environment." For example, solutions of bases in water can absorb water vapor from an atmosphere or release water into the atmosphere so as to maintain a thermodynamically preferred vapor pressure of water over the solution. KCl and LiCl can be used to maintain a relative humidity of a contained atmosphere in which the as-printed three-dimensional structure is disposed at approximately 80% and 15% respectively. It will be appreciated that humidity can be maintained using other methods and that the use of these solutions was merely for convenience. Removal of the solvent from the composition using a controlled atmosphere having a relative humidity within any of the following ranges: 15% to 90%; 60% to 90%; 70% to 90%; 60% to 70%; 80% to 90%; 75% to 85%. Selection of the relative humidity can be based on the volume of the as-printed structure, and complexity (e.g., a number of lines/features, spacing between lines/features, dimensions of lines/features, patterns in which lines/features are configured, which can influence a solvent evaporation rate), and the nature and composition of the supramolecular polymer. Similarly, a duration of time in which a three-dimensional structure is disposed in this controlled humidity atmosphere can be within any of the following ranges depending on the volume of the as-printed structure, the complexity of the as-printed structure, and the as-printed line width: from 1 hours to 200 hours; from 1 hours to 175 hours; from 10 hours to 150 hours; from 25 hours to 150 hours; from 50 hours to 100 hours; and from 100 hours to 200 hours.

In embodiments, the present invention also includes a method of manufacturing a three-dimensional structure comprising a supramolecular polymer composition of the invention. The method may include the steps of delivering one or more supramolecular polymer composition s onto a surface of a substrate to form the 3 dimensional structure, wherein the 3-D structure comprises internal cavities or voids that are interconnected in one, two or three dimensions within the structure; and providing conditions for polymerization. The method of delivering may include addition manufacturing or 3-D printing.

The present invention also includes a method of manufacturing a supramolecular polymer composition capable of co-assembly to maintain a 3-D macrostructural form after 3-D printing. The method includes the steps of providing a template-monomer supramolecular polymer composition, which includes the steps of providing (a) a solvent; (b) providing a template molecule comprising an at least partially linear amphiphilic or hydrophilic polymer; and (c) providing at least one reactive component comprising a monomer, wherein the monomer is capable of hydrogen bonding with the template molecule to form a 1 D supramolecular structure, and wherein the monomer comprises least two groups capable of covalent crosslinking. The method includes providing the conditions for (a), (b) and (c) to mix and form a template-monomer co-assembled supramolecular polymer structure. In embodiments, the template-monomer co-assembled supramolecular polymer structure has a viscosity which allows for 3-D printing of the supramolecular polymer to form a 3-D structure. In embodiments, the template-monomer co-assembled supramolecular polymer structure is also capable of co-assembly after 3-D printing to maintain the printed three dimensional (3-D) macrostructural form.

In an embodiment, the method includes the step of allowing the at least partial evaporation of the solvent and/or the step of crosslinking the monomer. In embodiments, the method further allows the step of removing the template molecule by use of a solvent which selectively solubilizes the template molecule. In embodiments, removal of the template molecule creates a porous structure, preferably a homogenously porous structure.

The present invention also includes a method of manufacturing a 3-D structure. The method includes a step of delivering one or more supramolecular polymer compositions onto a surface of a substrate to form the 3-D structure, wherein the 3-D structure comprises internal cavities or voids that are interconnected in one, two or three dimensions within the structure. The supramolecular polymer composition includes a template-monomer co-assembled supramolecular polymer structure as described elsewhere herein. For example, the template-monomer structure can include i) a solvent; ii) a template molecule comprising an at least partially linear amphiphilic or hydrophilic polymer; iii) a reactive component comprising at least one monomer, wherein the at least one monomer is capable of hydrogen bonding with the template molecule to form a 1D supramolecular structure, and wherein the monomer comprises least two groups capable of covalent crosslinking. The supramolecular polymer composition also, in embodiments, has a suitable viscoelastic property which allows for 3-D printing of the supramolecular polymer to form a 3-D structure, and is capable of co-assembly after 3-D printing to maintain the printed three dimensional (3-D) macrostructural form.

Optionally, the method further includes allowing at least partial evaporation of the solvent. During the evaporation step, a dynamic process is driven by the template-monomer co-assembled supramolecular structure to maintain the supramolecular structure e.g., the co-assembly, even as solvent is removed.

Optionally, the method includes providing conditions for polymerization to allow for crosslinking of the at least two crosslinkable groups on the at least one monomer. The method may optionally further include removing the template molecules. Removal of the template molecule may be achieved by methods known in the art.

As used herein, the term "alkyl" refers to a straight or branched chain hydrocarbon, preferably having from one to twelve carbon atoms. Examples of "alkyl" as used herein include, but are not limited to, methyl, ethyl, propyl, isopropyl, isobutyl, n-butyl, tert-butyl, isopentyl, n-pentyl, and the like. Alkyl is optionally replaced (e.g., a C is replaced with) with N, O, or S in one or more positions.

The term "alkenyl" refers to a straight or branched chain aliphatic hydrocarbon containing one or more carbon-to-carbon double bonds. Examples include, but are not limited to, vinyl, allyl, and the like. Alkenyl is optionally replaced (e.g., a C is replaced with) with N, O, or S in one or more positions.

As used herein, the term "alkynyl" refers to a straight or branched chain aliphatic hydrocarbon containing one or more carbon-to-carbon triple bonds. Examples include, but are not limited to, ethynyl and the like. Alkynyl is optionally replaced (e.g., a C is replaced with) with N, O, or S in one or more positions.

The term "alkylene" refers to a straight or branched chain divalent hydrocarbon radical, preferably having from one to ten carbon atoms. Alkylene groups as defined herein may optionally be substituted. Examples of "alkylene" as used herein include, but are not limited to, methylene, ethylene, n-propylene, n-butylene. Alkylene is optionally replaced (e.g., a C is replaced with) with N, O, or S in one or more positions.

As used herein, the term "alkenylene" refers to a straight or branched chain divalent hydrocarbon radical, preferably having from one to ten carbon atoms, containing one or more carbon-to-carbon double bonds that may be optionally substituted. Examples include, but are not limited to, vinylene, allylene or 2-propenylene, and the like. Alkenylene is optionally replaced (e.g., a C is replaced with) with N, O, or S in one or more positions.

The term "alkynylene" refers to a straight or branched chain divalent hydrocarbon radical, preferably having from one to ten carbon atoms, containing one or more carbon-to-carbon triple bonds that may be optionally substituted. Examples include, but are not limited to, ethynylene and the like. Alkynylene is optionally replaced (e.g., a C is replaced with) with N, O, or S in one or more positions.

As used herein, the term "cycloalkyl" refers to an optionally substituted non-aromatic cyclic hydrocarbon ring, which optionally includes an alkylene linker through which the cycloalkyl may be attached. Exemplary "cycloalkyl" groups include, but are not limited to, cyclopropyl, cyclobutyl, cyclopentyl, cyclohexyl, cycloheptyl, and substituted versions thereof. As used herein, the term "cycloalkyl" includes an optionally substituted fused polycyclic hydrocarbon saturated ring and aromatic ring system, namely polycyclic hydrocarbons with less than maximum number of non-cumulative double bonds, for example where a saturated hydrocarbon ring (such as a cyclopentyl ring) is fused with an aromatic ring (herein "aryl," such as a benzene ring) to form, for example, groups such as indane. Cycloalkyl is optionally replaced (e.g., a C is replaced with) with N, O, or S in one or more positions.

As used herein, the term "cycloalkenyl" refers to an optionally substituted non-aromatic cyclic hydrocarbon ring containing one or more carbon-to-carbon double bonds which optionally includes an alkylene linker through which the cycloalkenyl may be attached. Exemplary "cycloalkenyl" groups include, but are not limited to, cyclopropenyl, cyclobutenyl, cyclopentenyl, cyclohexenyl, cycloheptenyl, and substituted versions thereof. Cycloalkenyl is optionally replaced (e.g., a C is replaced with) with N, O, or S in one or more positions.

The term "cycloalkylene" refers to a divalent, optionally substituted non-aromatic cyclic hydrocarbon ring. Exemplary "cycloalkylene" groups include, but are not limited to, cyclopropylene, cyclobutylene, cyclopentylene, cyclohexylene, cycloheptylene, and the like. Cycloalkylene is optionally replaced (e.g., a C is replaced with) with N, O, or S in one or more positions.

As used herein, the term "cycloalkenylene" refers to a divalent optionally substituted non-aromatic cyclic hydrocarbon ring containing one or more carbon-to-carbon double bonds. Exemplary "cycloalkenylene" groups include, but are not limited to, cyclopropenylene, cyclobutenylene, cyclopentenylene, cyclohexenylene, cycloheptenylene, and the like. Cycloalkenylene is optionally replaced (e.g., a C is replaced with) with N, O, or S in one or more positions.

As used herein, the term "heterocycle" or "heterocyclyl" refers to an optionally substituted mono- or polycyclic ring system containing one or more degrees of unsaturation and also containing one or more heteroatoms. Preferred heteroatoms include N, O, and/or S, including N-oxides, sulfur oxides, and dioxides. Preferably the ring is three to twelve-membered and is either fully saturated or has one or more degrees of unsaturation. Such rings may be optionally fused to one or more of another "heterocyclic" ring(s) or cycloalkyl ring(s). Examples of "heterocyclic" groups include, but are not limited to, tetrahydrofuran, pyran, 1,4-dioxane, 1,3-dioxane, piperidine, pyrrolidine, morpholine, tetrahydrothiopyran, and tetrahydrothiophene.

As used herein, the term "aryl" refers to an optionally substituted benzene ring or to an optionally substituted fused benzene ring system, for example anthracene, phenanthrene, or naphthalene ring systems. Examples of "aryl" groups include, but are not limited to, phenyl, 2-naphthyl, 1-naphthyl, and the like.

As used herein, the term "heteroaryl" refers to an optionally substituted monocyclic five to seven membered aromatic ring, or to an optionally substituted fused bicyclic aromatic ring system comprising two of such aromatic rings. These heteroaryl rings contain one or more nitrogen, sulfur, and/or oxygen atoms, where N-oxides, sulfur oxides, and dioxides are permissible heteroatom substitutions. Examples of "heteroaryl" groups used herein include, but should not be limited to, furan, thiophene, pyrrole, imidazole, pyrazole, triazole, tetrazole, thiazole, oxazole, isoxazole, oxadiazole, thiadiazole, isothiazole, pyridine, pyridazine, pyrazine, pyrimidine, quinoline, isoquinoline, benzofuran, benzothiophene, indole, indazole, benzimidizolyl, imidazopyridinyl, pyrazolopyridinyl, pyrazolopyrimidinyl, and the like.

As used herein, the term "alkoxy" refers to the group —O-alkyl. The term "nitro" refers to the group —NO$_2$. The term "cyano" refers to the group —CN. The term "azido" refers to the group —N$_3$. The term "acyl" refers to the group RaC(O)—, where Ra is alkyl, aryl, heteroaryl, or heterocyclyl, as each is defined herein.

As used herein throughout the specification, the phrase "optionally substituted" or variations thereof denote an optional substitution, including multiple degrees of substitution, with one or more substituent group. The phrase should not be interpreted so as to be imprecise or duplicative of substitution patterns herein described or depicted specifically. Rather, those of ordinary skill in the art will appreciate that the phrase is included to provide for obvious modifications, which are encompassed within the scope of the appended claims.

Exemplary optional substituent groups include acyl; alkyl; alkenyl; alkynyl; alkylsulfonyl; alkoxy; alkoxycarbonyl; cyano; halogen; haloalkyl; hydroxy; carboxy, carbamate; nitro; aryl, which may be further substituted with acyl, alkoxy, alkyl, alkenyl, alkynyl, alkylsulfonyl, cyano, halogen, haloalkyl, hydroxy, or nitro; heteroaryl, which may be further substituted with acyl, alkoxy, alkyl, alkenyl, alkynyl, alkylsulfonyl, cyano, halogen, haloalkyl, hydroxy, or nitro; arylsulfonyl, which may be further substituted with acyl, alkoxy, alkyl, alkenyl, alkynyl, alkylsulfonyl, cyano, halogen, haloalkyl, hydroxy, or nitro; heteroarylsulfonyl, which may be further substituted with acyl, alkoxy, alkyl, alkenyl, alkynyl, alkylsulfonyl, cyano, halogen, haloalkyl, hydroxy, or nitro; aryloxy, which may be further substituted with acyl, alkoxy, alkyl, alkenyl, alkynyl, alkylsulfonyl, cyano, halogen, haloalkyl, hydroxy, or nitro; heteroaryloxy, which may be further substituted with acyl, alkoxy, alkyl, alkenyl, alkynyl, alkylsulfonyl, cyano, halogen, haloalkyl, hydroxy, or nitro; or aryloxycarbonyl, which may be further substituted with acyl, alkoxy, alkyl, alkenyl, alkynyl, alkylsulfonyl, cyano, halogen, haloalkyl, hydroxy, or nitro.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

EXAMPLES

Example 1: Hierarchical Co-Assembly Enhanced Direct Ink Writing

Abstract. Integrating intelligent molecular systems into 3D printing materials and transforming their molecular functions to the macroscale with controlled superstructures will unleash the great potential for the development of smart materials. Compared to those macromolecular 3D printing materials, self-assembled small molecule-based 3D printing materials are very limited due to the difficulties of facilitating 3D printability as well as preserving their molecular functions macroscopically. Here we report a general approach to integrate functional small molecules into direct ink writing 3D printing materials through the introduction of a supramolecular template. A variety of inorganic and organic small molecule-based inks are 3D printed and their superstructures are refined by post printing hierarchical co-assembly to effectively transform their molecular features to the macroscale. Through the spatial and temporal control of individual molecular events across nano-to-macroscale, fine-tuned macroscale features of the monoliths have been successfully achieved, including hierarchical porous structures with enhanced printing resolution, dynamic fluorescence color change and macroscopic volume expansion/contraction.

Introduction. Self-assembled molecular systems with stimuli-responsive behavior[1] and molecular mechanical motions[2] have been demonstrated with great promise for the advancement of smart materials. Collectively harnessing their dynamic molecular features to the macroscale[3] and performing complex tasks,[4] however, remains a grand challenge,[5] because it requires hierarchical control of materials' nanoscale chemical structure, mesoscale assembly, and macroscale three-dimensional (3D) architectures. Integrating assembled functional molecules with 3D printing technology[6] is a promising path to achieve this goal, since it combines the controlled nanoscale assembly with designed macroscale 3D geometry.[7] For example, by aligning cellulose fibers anisotropically at the micrometer scale, Lewis et al. successfully designed[8] a series of 3D-printed monoliths which undergo complex shape morphing upon swelling. We recently reported[9] a 3D-printed polyrotaxane monolith with ordered crystalline domains, which amplifies the nanoscale ring shutting to-stationary motion to the macroscale and converts the external energy input into useful work.

Intelligent small molecular systems, however, often lack the required features to be integrated into 3D printing materials, which is a major roadblock that limits the number of smart materials available for use in 3D printing applications. For example, inks for direct ink writing[10] (DIW, FIG. 1) need to possess shear thinning and rapid self-healing properties.[11] Self-assembled molecular systems are often too weak to be self-supportive due to the low-degree of non-covalent crosslinking[12] and/or too fast association/dissociation kinetics,[13] or difficult to self-heal rapidly (within seconds) as a result of high kinetic barrier[14] for the reformation of the superstructure. In effort to facilitate 3D printability to small molecules for DIW, Burdick et al. recently reported[15] a simultaneous photo-crosslinking while DIW method to print previously non-compatible acrylic monomers. While in situ photo-crosslinking is desired for rapid prototyping,[16] the readily formed polymer network can limit the control over the assembled superstructures because (1) the extrusion process will disrupt the ordered superstructures and those ill-defined structures will be fixed by rapid photo-crosslinking; and (2) the covalently linked polymer chains can perturb the molecular moieties from assembling and dissembling cooperatively, resulting in the loss of molecular features macroscopically.

To address these challenges, we report herein a general method (FIG. 1) to integrate a variety of assembled inorganic and organic molecules (molecular monomers) into 3D printing inks through the introduction of supramolecular templates. The high-density multivalent supramolecular network formed between monomers, templates and monomer-templates can rapidly deform upon extrusion and reform to self-heal,[11] as well as sufficiently strong to be self-supportive. After 3D printing, these molecular monomers and templates co-assemble hierarchically to refine their superstructures across nano-to-macroscale, affording homogeneous hard and soft functional monoliths with fine-tuned features such as high-resolution hierarchical porous structures, dynamic fluorescence color change, and macroscopic volume expansion and contraction that are collectively amplified from their molecular entities.

In this hierarchical co-assembly enhanced direct ink writing design (FIG. 1), molecular monomers and supramolecular templates co-assemble via multivalent noncovalent interactions to form a viscoelastic ink (step 1). After 3D printing (step 2), the molecular monomers and supramolecular templates in the 3D printed monolith co-assemble in a holistic manner, affording monoliths with hierarchically ordered superstructures[17] (step 3). In this process, a localized re-configuration of monomer and template is critical to maintain the macroscale structure against gravity. Subsequent chemical crosslinking (step 4) and template removal (step 5) staple these assembled molecular monomers together at the macroscale to afford the desired functional monoliths.

Figure 4:
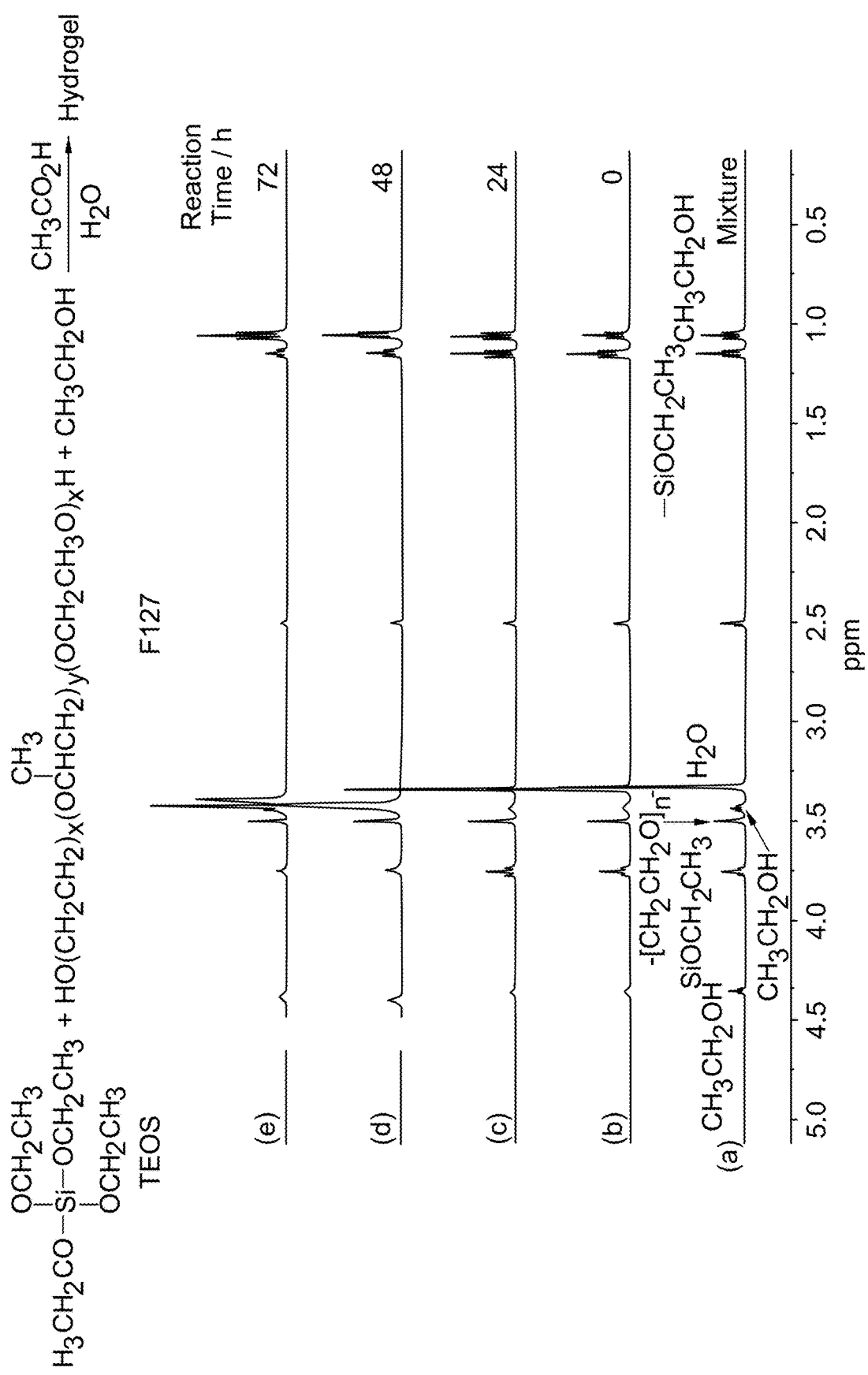
FIG. 4 shows $^1$H NMR spectra of a mixture of TEOS and F127 mixtures at various reaction times.
Figure 5:
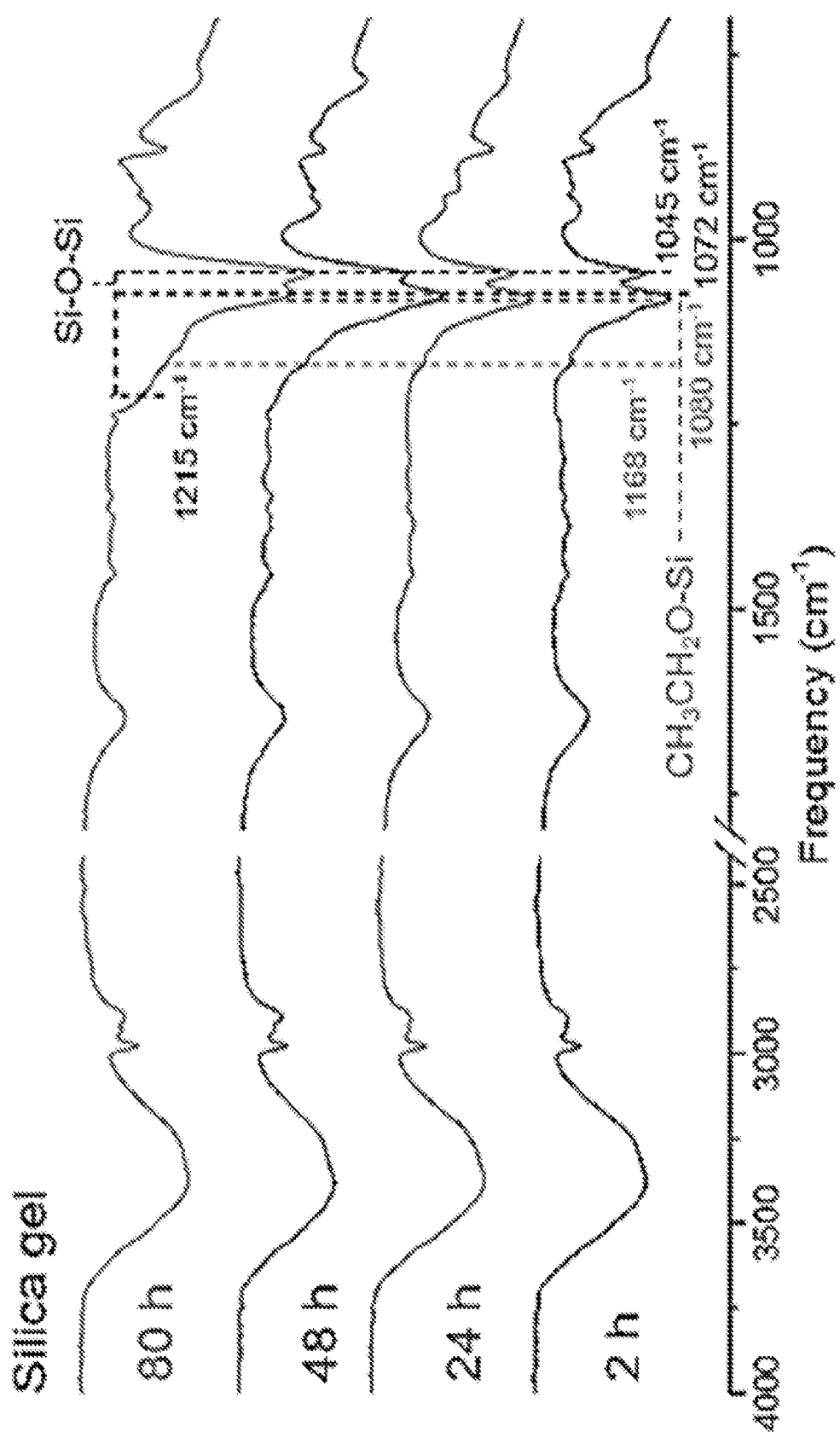
FIG. 5 shows time-dependent FT-IR spectra of a mixture of TEOS and F127 mixtures at various reaction times.

At the outset, we chose tetraethyl orthosilicate (TEOS) as the molecular monomer and Pluronic F127 triblock copolymer[18] as the supramolecular template (FIG. 2A) due to their well-documented co-assembly behavior,[19] in which the micellar F127 and partially hydrolyzed TEOS monomers co-assemble[20] to form hydrogels. The polycondensation of TEOS before 3D printing is undesired because the dynamic post-printing co-assembly process would be inhibited. A series of TEOS/F127-based hydrogels were prepared (See FIG. 3) with various solvent combinations and reaction times. Under the optimized conditions (FIG. 3, entries 5-9), a printable transparent hydrogel G1 with very low degree of oligomerized TEOS (FIGS. 4 and 5), an elastic modulus (G') of 4000 Pa, and a yield stress (where G'=G") of 402 Pa (FIG. 21) was obtained. Images of hydrogels synthesized with a reaction time of 4, 24, 36 and 48 hours shows that the opaqueness of the hydrogel gradually increases as the polymerization proceeds. G1 is formed as a result of the co-assembly between TEOS and F127 since no hydrogel was obtained in the absence of TEOS under the same condition (FIG. 3, entry 13). Although it is difficult to quantify the binding energy between the monomer and the template, the measured yield strain of G1 reflects the required energy to extensively break the non-covalent interactions[21] between TEOS and F127 to facilitate the solid-to-liquid transition.

Figure 2C:
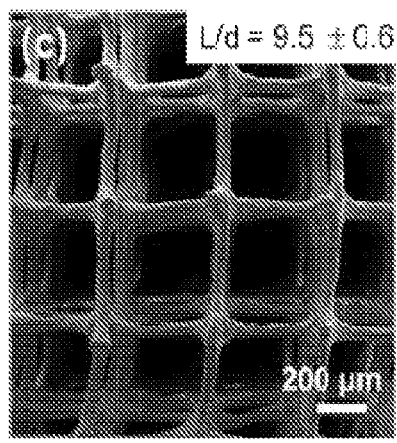
FIG. 2C shows microscope images of a lattice cube (12×12×12.2 mm, $d_0$=331 μm, $L_0/d_0$=3.6) after calcination at 700° C.

Hydrogel ink G1 was loaded to syringe barriers and printed into a series of woodpile lattice cubes (FIG. 2B). The spacing-to-diameter ratios between an in-plane center-to-center filament spacing (FIG. 1, $L_0$) and a measured linewidth ($d_0$) are recorded between $L_0/d_0$=3~6. The lattice cubes fabricated using various nozzle diameters (25-200 μm) exhibit good structure integrity and accuracy in all x, y and z dimensions (FIG. 2B). Since TEOS oligomers can freely translocate in the hydrogel, evaporating the solvent of the printed monolith initiates the coassembly of TEOS and F127 to refine their superstructures homogeneously. Nearly isotropic shrinkages (FIGS. 2B and 2C) with significantly reduced linewidth and volume of the lattice cubes ($d_0/d$=2.3, $V_0/V$=3.0, L/d from 2.71 to 6.62 in FIG. 6) were achieved by introducing a few sacrificial layers. The significant enhancement of printing resolution and L/d is attributed to a rapid and localized co-assembly of TEOS and F127 during the evaporation evolution. In contrast, when TEOS have been polymerized in the hydrogels $G1_{24h}$ and $G1_{48h}$ before printing, less size shrinkage as well as macroscale structural defects are recorded after evaporation, because the dynamics of the polymer/template co-assembly is not fast enough to compensate for the local surface tension variation. These results suggest that preserving the dynamic molecular assembly is critical in forming ordered structures across the nano-to-macroscale and enhancing printing resolution macroscopically.

Figure 2D:
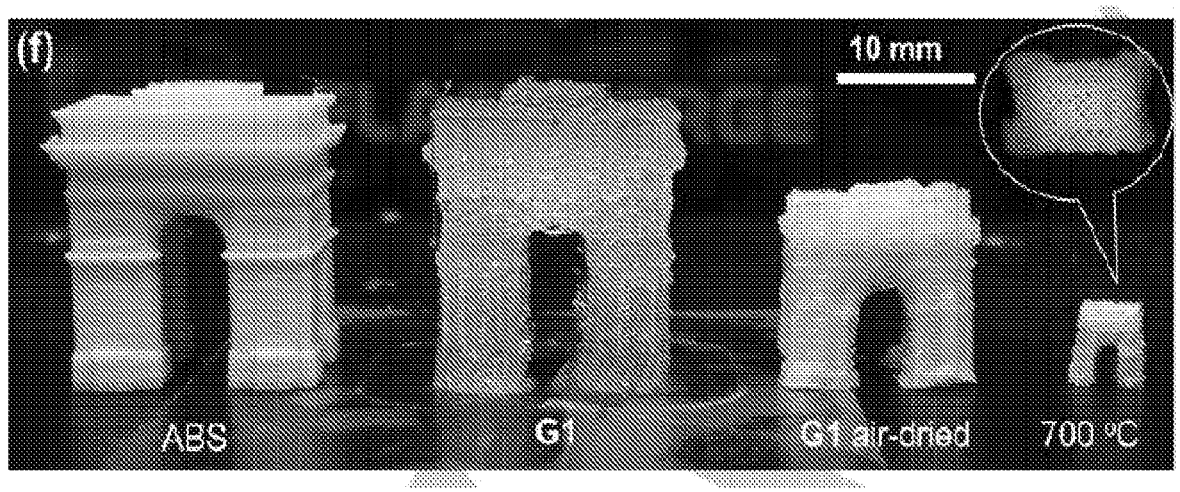
FIG. 2D shows a photograph of a printed figure replicates printed using polyacrylonitrilebutadienestyrene, G1, G1 after evaporation and G1 after calcination at 700° C., respectively.
Figure 7:
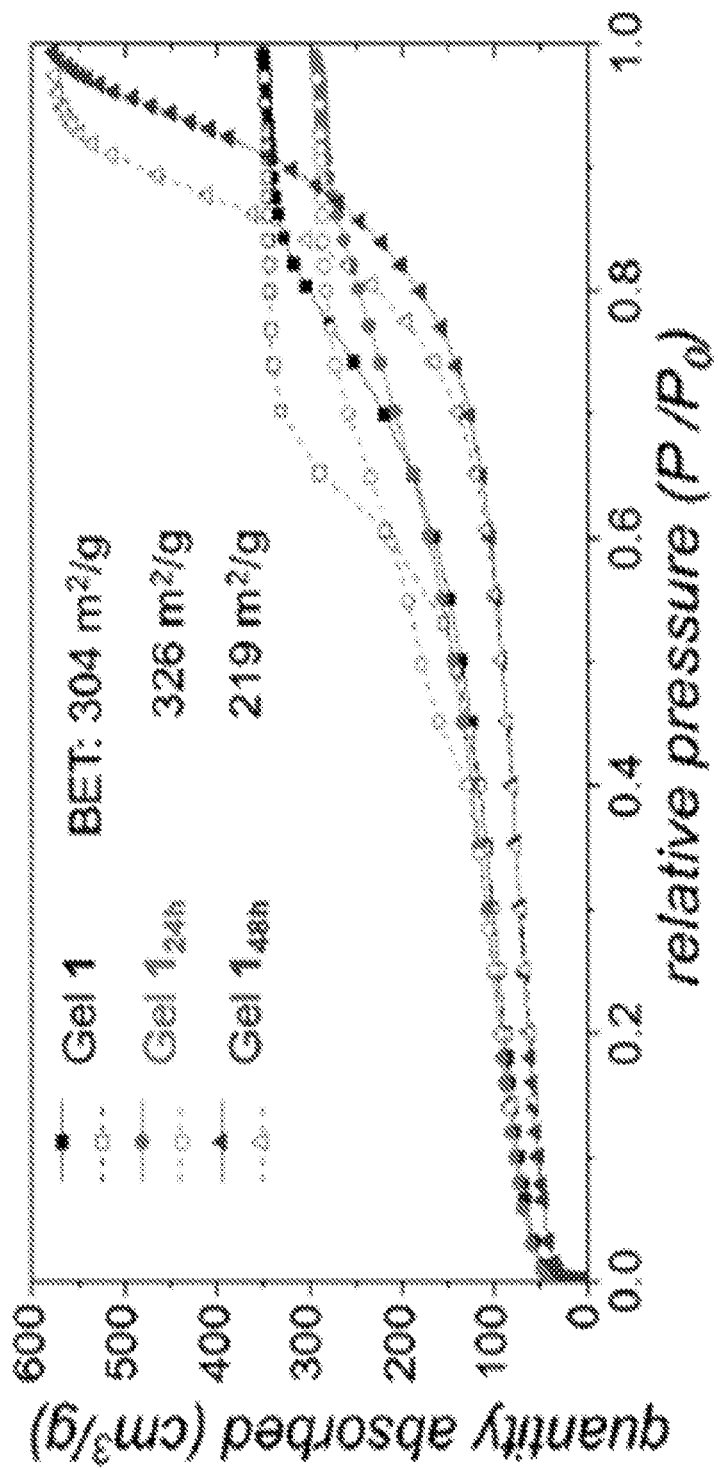
FIG. 7 shows a graph showing $N_2$ sorption isotherms of the monoliths fabricated using G1, and G1 at 24 and 48 hours after 700° C. calcination.

Calcination of these monoliths at different temperatures (FIG. 2B) allows for extensive polycondensation of TEOS and the removal of F127 template, affording silica monolith with good structural integrity at both macroscopic (FIG. 2B), mesoscopic (FIG. 2C) and nanoscopic scales with a measured Brunauer-Emmett-Teller (BET) surface area of 304 m2/g (700° C., FIG. 7). After calcination at 1000° C., the linewidth (38 μm)shrunk nearly an order of magnitude compared to the as-printed linewidth (330 μm) and a 97-99% volume reduction was achieved (FIG. 6). Our co-assembly method enables high-resolution fabrication of functional materials with controlled nanoscopic structures far beyond printing nozzle physical limit.[22] For example, G1-based 'Arc de Triomphe' replicates (FIG. 2D) fabricated by a low-cost customized desktop 3D printer was transformed into a high-resolution mesoporous silica monolith.

Figure 8:
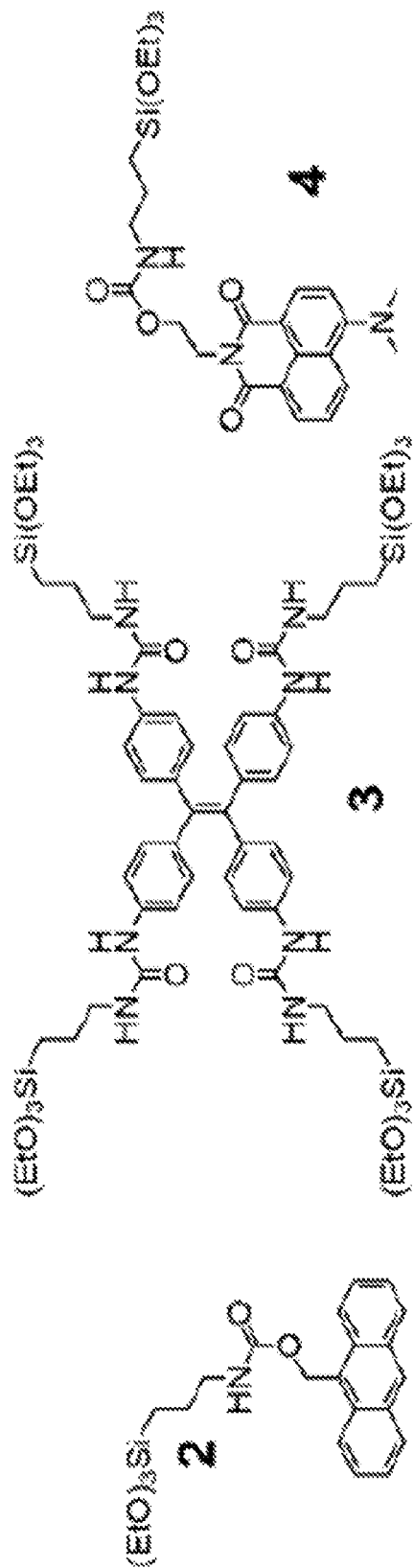
FIG. 8 shows representative chemical structures.
Figure 9:
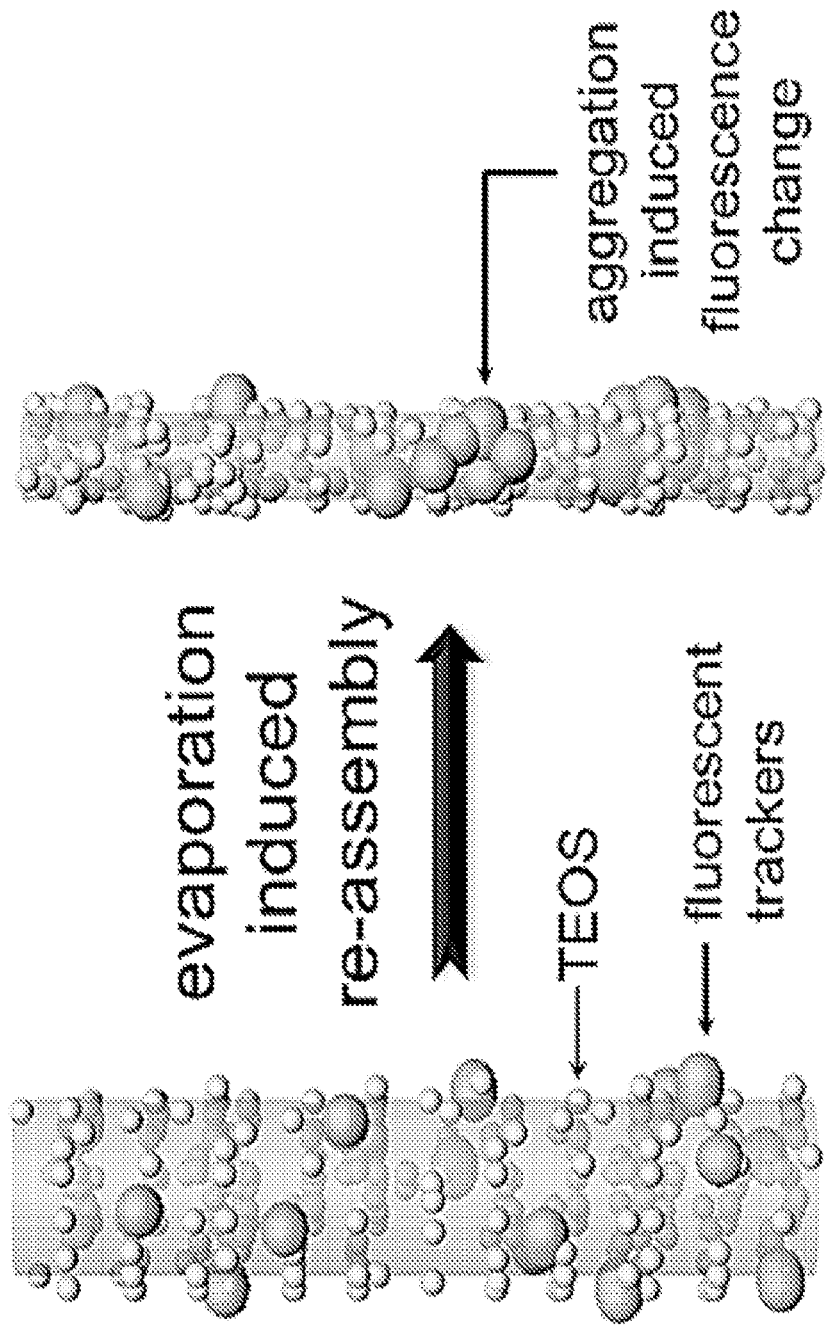
FIG. 9 shows a schematic representing evaporation induced re-assembly of TEOS and fluorescent tracker on a template.
Figure 10A:
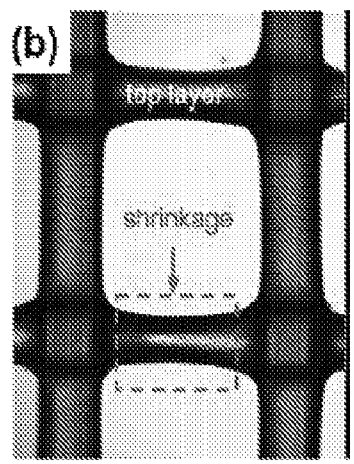
FIG. 10A shows a photograph bright field microscope images of a two-orthogonal-layer monolith fabricated using 2@G1.
Figure 10B:
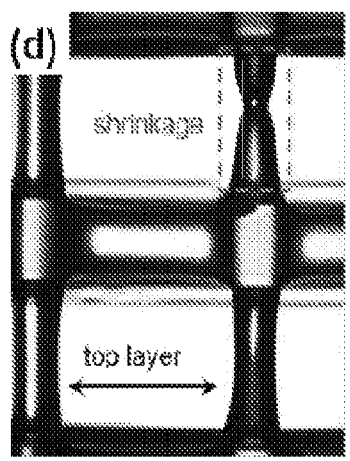
FIG. 10B shows a photograph bright field microscope images of a two-orthogonal-layer monolith fabricated using 3@G1.

To provide molecular understanding of this evaporation induced hierarchical co-assembly process, fluorescent TEOS analogs 2 and 3 (FIG. 8) were synthesized as fluorescent trackers, which were doped into G1. Upon evaporation, these fluorescent trackers can not only translocate with the TEOS monomers but also aggregate owing to their hydrophobic fluorophores and hydrogen bonding motifs (FIG. 9). Fluorescent tracker-doped hydrogels[23] 2@G1 ([TEOS]/[2]=1790) and 3@G1 ([TEOS]/[3]=17900) were printed into two-layer orthogonal lattices and the evaporation-induced co-assembly of the top layer[24] were monitored in real-time using a fluorescence microscope. In 2@G1 and 3@G1 lattices, after 5 min of solvent evaporation, noticeable linewidth shrinkages of the top layers were recorded in the bright field images (FIGS. 10A and 10B), while localized fluorescent quenching and enhancement were observed firstly at the periphery of filament and progressively expanded to the inner sections, respectively. The net fluorescent emission changes of the doped hydrogels were recorded by the time-dependent fluorescence emission spectra. Upon irradiation, the emission of 2 increased in the first 20 min due to the loss of solvent and subsequently quenched as a result of the aggregation of 2 in G1.[25] Similarly, the emission of 3@G1 increases in the first 20 min and keep increasing owing to the aggregation induced emission,[26] suggesting that tracker 3 aggregates in G1 due to its strong inter-molecular hydrogen bonding interactions. The recorded dynamic process and time dependent fluorescence spectra reveal that, (i) the strong interaction between the supramolecular template and molecular monomer can effectively localize the dynamic co-assembly process, which avoids structural failure macroscopically during the post-printing process; (ii) the stimuli-induced co-assembly process is largely kinetically controlled and monomer/F127 assemble rapidly at the surface of the hydrogel and progressively re-organize into the inner sections; (iii) the monomer dynamic self-assembly feature is well-preserved in a macroscopic monolith after 3D printing.

Figure 12:
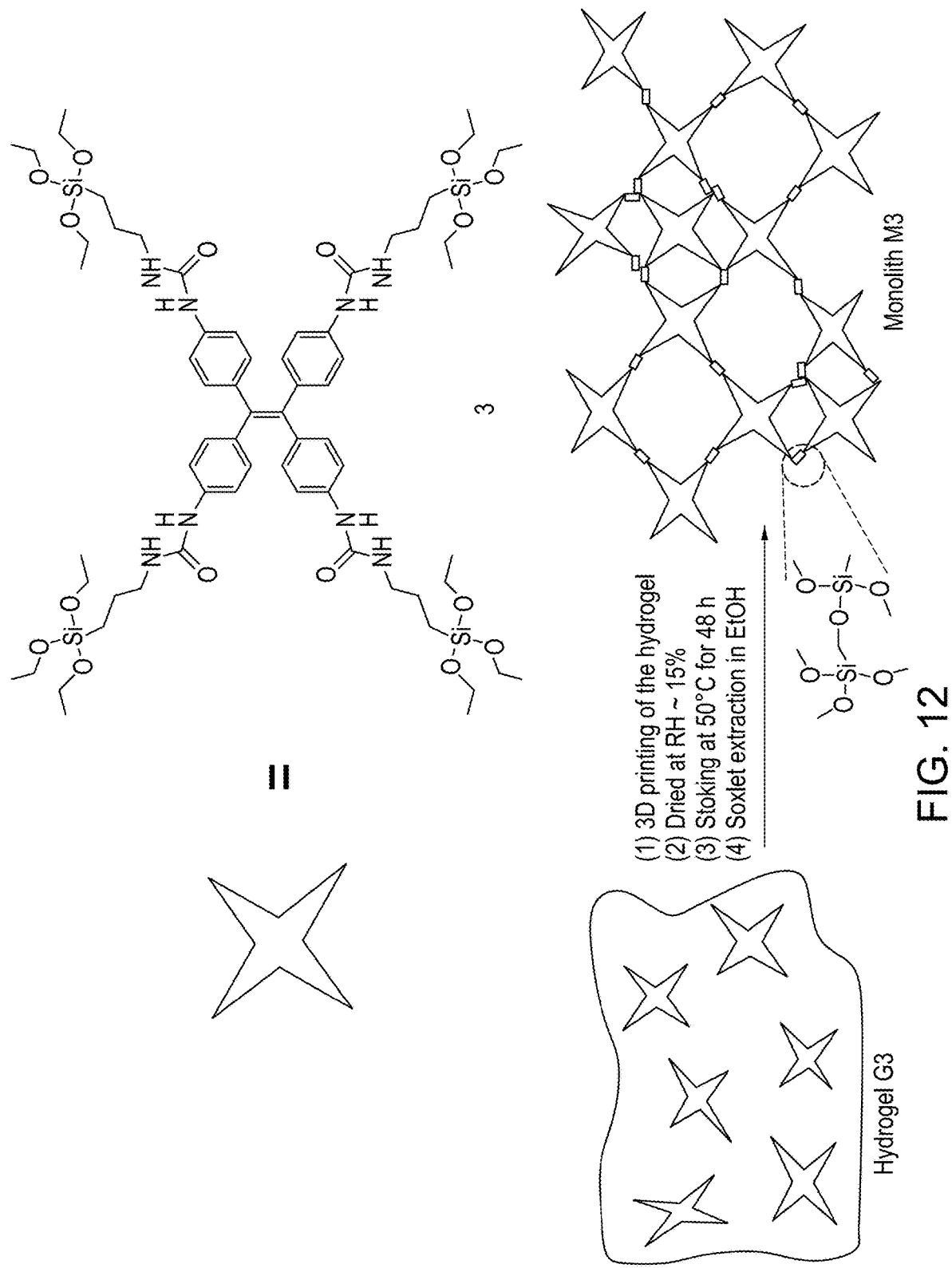
FIG. 12 shows a schematic representing the preparation of the organosilica monolith M3.
Figure 14:
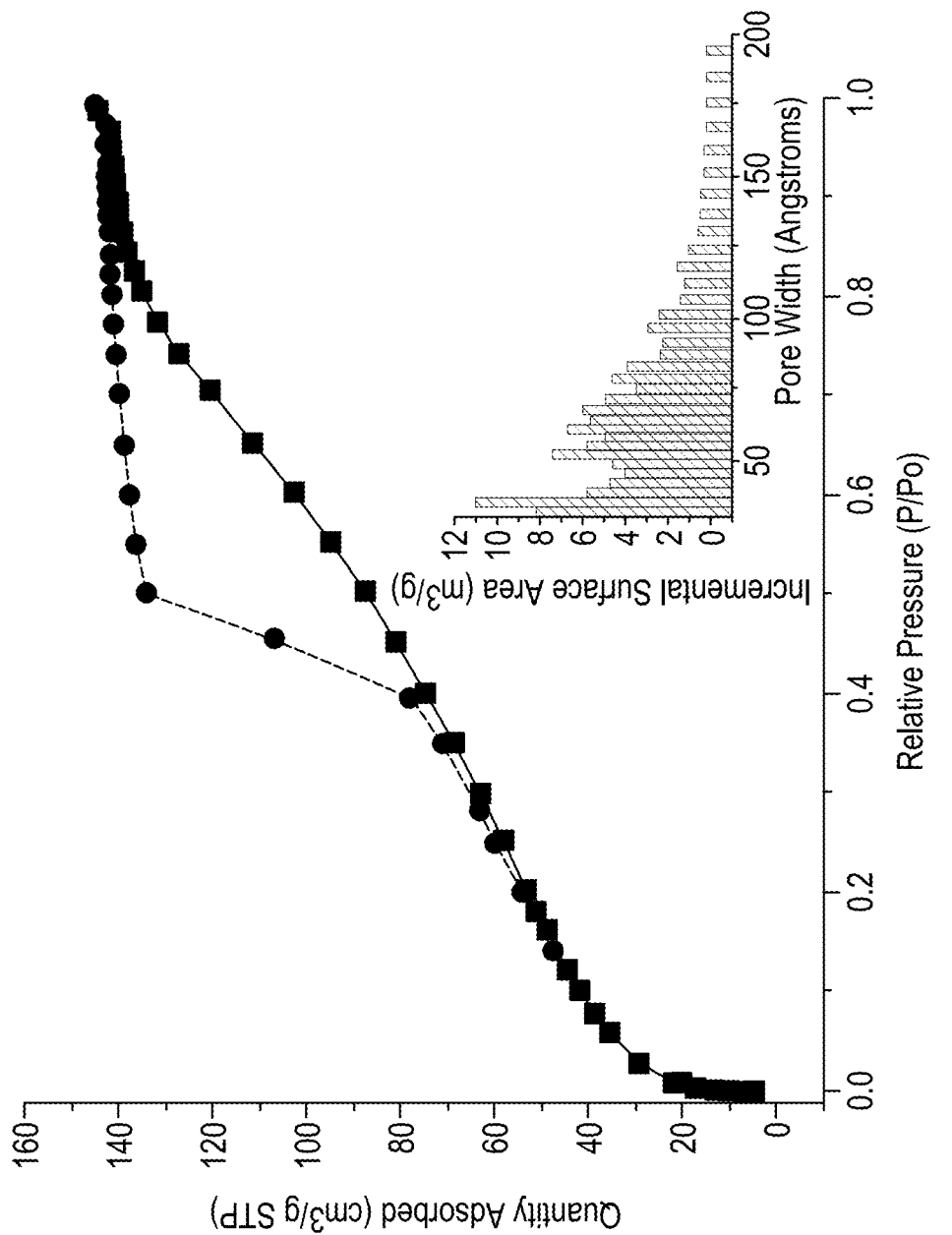
FIG. 14 shows a graphical representation of nitrogen absorption (squares) and desorption (circles) of M3 measured at 77 K. Inset is the pore size distribution of M3.
Figure 15:
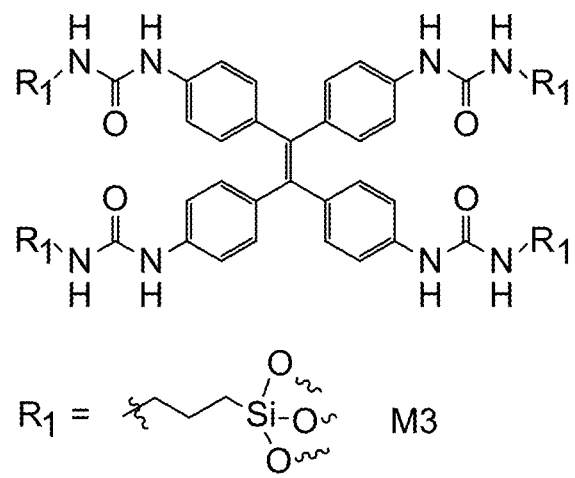
FIG. 15 shows organosilicate representative structures.

The established model system and revealed molecular understanding of the co-assembly process encouraged us to spatially and temporally control the monomers in a 3D printed monolith and alter their macroscopic property, realizing a 4D printing process.[27] A pair of Forster resonance energy transfer[28] (FRET) donor and acceptor monomers (2 and 4) were synthesized, doped into hydrogel G1 ([TEOS]/[2]/[4]=17900:10:1) and printed into a woodpile lattice cube. Upon solvent evaporation, the fluorescence of lattice cube changed gradually from sky blue ($\lambda_{ex}$=365 nm) to greenish blue and then green color along with volume reduction, suggesting that the FRET donor and acceptor are approaching each other nanoscopically in the hydrogel, which is also confirmed by the time-dependent fluorescence experiment. The well-controlled molecular co-assembly behavior in G1 suggests the possibility of further expanding the scope of monomers, given that the selected monomer coassembles with the supramolecular template of choice. Indeed, when organosilicate derivative 3 (FIG. 15) was introduced as the functional monomer, an opaque viscoelastic hydrogel G3 (see the Supporting Information) was obtained with a yield stress ($\varepsilon$=974 Pa) larger than that of F127 hydrogel ($\varepsilon$=520 Pa, FIG. 11), indicating that more energy is required to break the supramolecular co-assembly formed between 3 and F127 than F127 alone. The functional monolith M3 was obtained after evaporation-induced co-assembly, extensive chemical cross-linking (FIG. 12) and template removal by EtOH extraction, with moderately enhanced printing resolution and 85-92% volume reduction (FIG. 13). M3 emits green fluorescence with $\lambda$max=507 nm in the solid-state as well as possessing nano-sized pores ranging from 5-20 nm with a measured BET surface area of 177 m2/g (FIG. 14), suggesting a successful transformation of their molecular properties to the macroscale.

Figure 16:
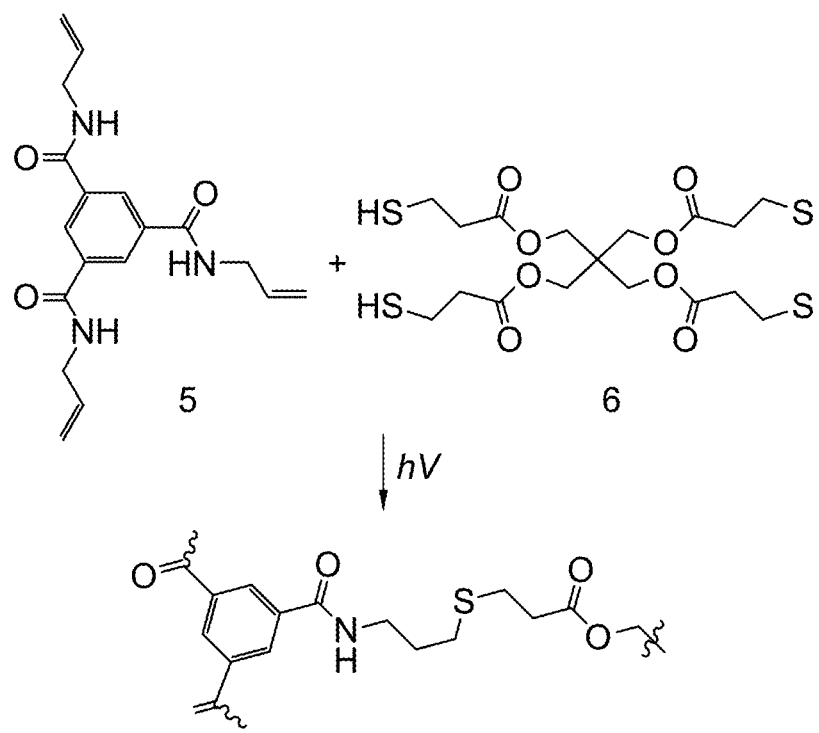
FIG. 16 shows organic compound crosslinking.
Figure 17:
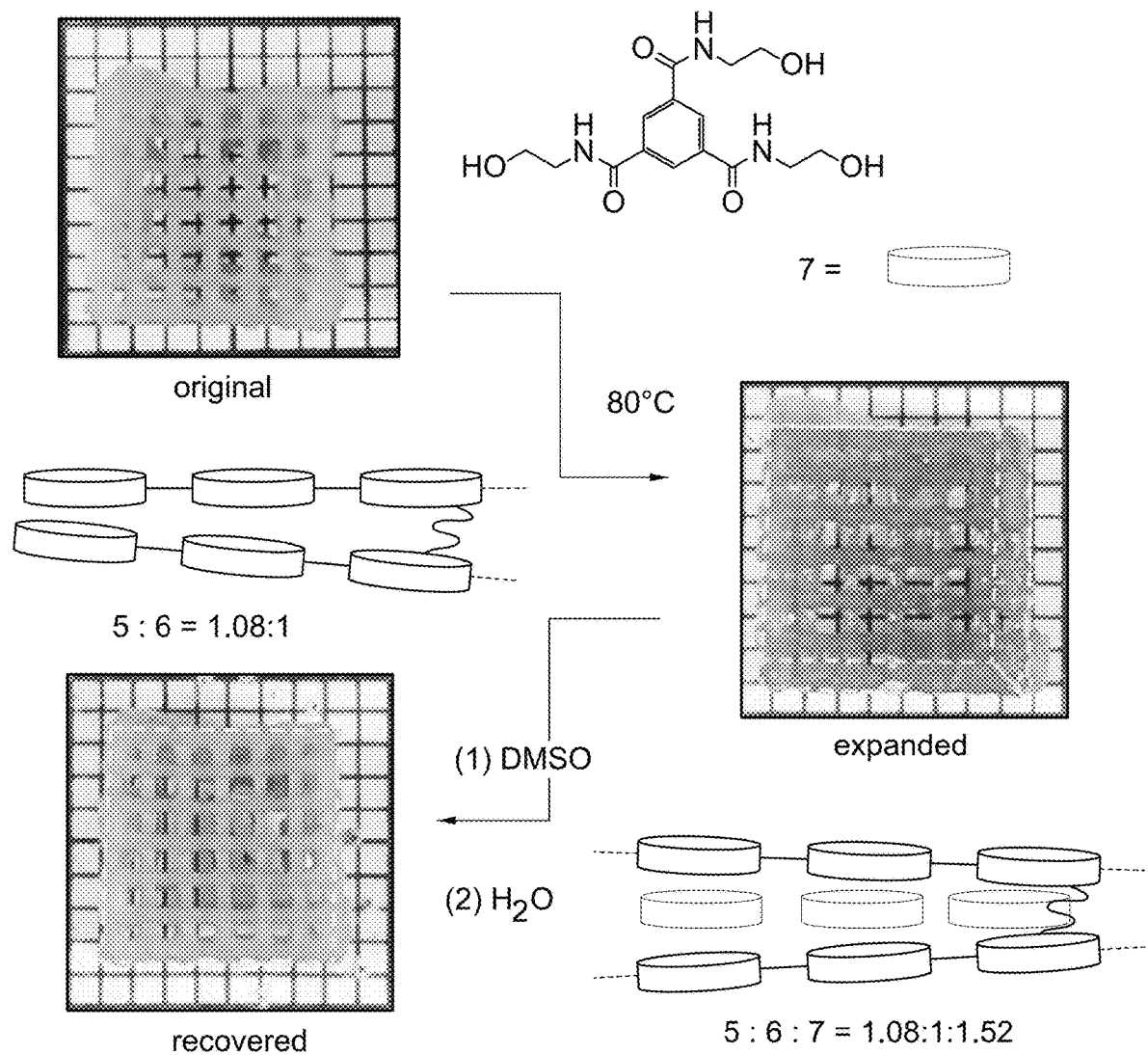
FIG. 17 shows a schematic showing active insertion of supramolecular pillar 7 (0.7 M) into monolith M5/6 (7×7× 5.6 mm) in an aqueous environment at 80° C. The recovered M5/6 was obtained after DMSO extraction followed by EtOH and $H_2O$ solvation.

Similarly, monomer 5 and tetra-thiol crosslinker 6 (FIG. 16) were employed as organic monomers for DIW. 5 possesses a benzene-1,3,5-tricarboxamide (BTA) hydrogen-bonding donor-acceptor core, which forms 1 D supramolecular polymers.[29] In an aqueous environment (MeOD: $D_2O$=1:1), monomer 5 coassembles with the backbone of F127 as evident by the $^1$H NMR titration experiment. Mixing monomer 5, crosslinker 6 and F127 in $H_2O$/EtOH/THF (1:1:1) mixed solvent affords a clear solution and subsequently turned into an opaque viscoelastic hydrogel G5/6 upon solvent evaporation. Hydrogel G5/6 was fabricated into a lattice cube, which was subsequently cross-linked through thiol-ene reaction.[30] The F127 template was removed by EtOH extraction, affording a crosslinked monolith M5/6 with [5]/[6]=1.08:1 suggested by elemental analysis. Different from M3, no significant nanoporous structure was observed in the TEM analysis of M5/6, which may attribute to the re-organization of the flexible network after the template removal. Since BTA moieties in M5/6 are connected via hydrogen bonding network, an active insertion of supramolecular pillars with BTA core[31] at the nanoscale will cooperatively induce a macroscale size expansion (FIG. 17). Interestingly, when a M5/6 was immersed in an aqueous solution[32] of supramolecular pillar 7 (0.7 M) at room temperature, no noticeable macroscopic size expansion was observed until the solution temperature was raised above 80° C. The observation is consistent with previous report,[33] in which an elevated temperature is required to break the multivalent hydrogen bonding network in M5/6 to allow for a hetero supramolecular insertion between different BTA monomers.

After 2 h immersion at 80° C. and cooled to room temperature,[34] an isotropic volume expansion of 156±4% is recorded (FIG. 17), and the mass of hydrogel 7@M5/6 is 160±5% to that of M5. Elemental analysis of the xerogel 7@M5/6 suggests an insertion ratio of 7/5=1.4:1. The 7-inserted monolith did not recover to its original size even after washing with a large excess of water, suggesting that the cooperative supramolecular interaction between the BTA moieties of M5/6 and 7 is stable against high dilution. Pillar 7 was removed from M5/6 by DMSO extraction and M5/6 recovers to its macroscopic size after $H_2O$ re-solvation (FIG. 17). This process has been repeated three times and the macroscopic size of M5/6 can be successfully altered by actively inserting and removing supramolecular pillars, demonstrating the successful amplification of the nanoscale hetero-supramolecular assembly event to the macroscopic level.

In this work, we presented a general approach of integrating functional small molecules into 3D printing materials and transforming their molecular features to the macroscale through supramolecular templation, post-printing hierarchical co-assembly and covalent crosslinking. 3D monoliths made by inorganic and organic functional molecules are fabricated, featuring macroscale properties that are introduced by the correspondent molecular monomers. The co-assembly process not only enhances the printing resolution up to an order of magnitude, it also enables the precise spatial control of nanoscale features such as molecular assembly over a large scale. Fluorescent tracking experiments provide molecular understanding of the dynamic co-assembly process at the macroscale as well as enabling the development of simultaneous color and shape changing 4D printing in response to the external stimuli. Furthermore, we showcased a benzene-1,3,5-tricarboxamide-based monolith capable of expanding and contracting its size by actively inserting and removing the correspondent supramolecular pillars. We believe this new approach will initiate the development of small molecule-based 3D printing materials and greatly accelerate the development of smart materials and devices beyond our current grasp that are capable of doing complex tasks in response to environmental stimuli.

[1] (a) G. Chen, M. Jiang, Chem. Soc. Rev. 2011, 40, 2254-2266; (b) Z. Qi, C. A. Schalley, Acc. Chem. Res. 2014, 47, 2222-2233; (c) W. Weng, J. B. Beck, A. M. Jamieson, S. J. Rowan, J. Am. Chem. Soc. 2006, 128, 11663-11672.

[2] (a) K. Kinbara, T. Aida, Chem. Rev. 2005, 105, 1377-1400; (b) J. F. Stoddart, Chem. Soc. Rev. 2009, 38, 1802-1820; (c) I. Aprahamian, Chem. Commun. 2017, 53, 6674-6684.

[3] (a) A. Harada, R. Kobayashi, Y. Takashima, A. Hashidzume, H. Yamaguchi, Nat. Chem. 2011, 3, 34-37; (b) S. Iamsaard, S. J. Aβhoff, B. Matt, T. Kudernac, J. J. Cornelissen, S. P. Fletcher, N. Katsonis, Nat. Chem. 2014, 6, 229-235; (c) Q. Li, G. Fuks, E. Moulin, M. Maaloum, M. Rawiso, I. Kulic, J. T. Foy, N. Giuseppone, Nat. Nanotech. 2015, 10, 161-165; (d) K. Iwaso, Y. Takashima, A. Harada, Nat. Chem. 2016, 8, 625-632; (e) J. Chen, F. K.-C. Leung, M. C. A. Stuart, T. Kajitani, T. Fukushima, E. van der Giessen, B. L. Feringa, Nat. Chem. 2018, 10, 132-138; (f) A. Goujon, T. Lang, G. Mariani, E. Moulin, G. Fuks, J. Raya, E. Buhler, N. Giuseppone, J. Am. Chem. Soc. 2017, 139, 14825-14828.

[4] (a) L. Ionov, Mater. Today 2014, 17, 494-503; (b) S. J. Asshoff, F. Lancia, S. Iamsaard, B. Matt, T. Kudernac, S. P. Fletcher, N. Katsonis, Angew. Chem. Int. Ed. 2017, 56, 3261-3265; Angew. Chem. 2017, 129, 3309-3313. (c) J. T. Foy, Q. Li, A. Goujon, J.—R. Colard-Itté, G. Fuks, E. Moulin, O. Schiffmann, D. Dattler, D. P. Funeriu, N. Giuseppone, Nat. Nanotech. 2017, 12, 540-545.

[5] (a) A. Coskun, M. Banaszak, R. D. Astumian, J. F. Stoddart, B. A. Grzybowski, Chem. Soc. Rev. 2012, 41, 19-30; (b) J. M. Abendroth, O. S. Bushuyev, P. S. Weiss, C. J. Barrett, ACS Nano 2015, 9, 7746-7768.

[6] (a) M. Hegde, V. Meenakshisundaram, N. Chartrain, S. Sekhar, D. Tafti, C. B. Williams, T. E. Long, Adv. Mater. 2017, 29, 1701240; (b) J. Wang, A. Chiappone, I. Roppolo, F. Shao, E. Fantino, M. Lorusso, D. Rentsch, K. Dietliker, C. F. Pirri, H. Grützmacher, Angew. Chem. Int. Ed. 2018, 57, 2353-2356; Angew. Chem. 2018, 130, 2377-2380.

[7] (a) S. Hong, D. Sycks, H. Chan, S. Lin, G. P. Lopez, F. Guilak, K. W. Leong, X. Zhao, Adv. Mater. 2015, 27, 4035-4040; (b) S. Roh, D. P. Parekh, B. Bharti, S. D. Stoyanov, O. D. Velev, Adv. Mater. 2017, 29, 1701554; (c) C. S. O'Bryan, T. Bhattacharjee, S. Hart, C. P. Kabb, K. D. Schulze, I. Chilakala, B. S. Sumerlin, W. G. Sawyer, T. E. Angelini, Sci. Adv. 2017, 3, e1602800.

[8] S. A. Gladman, E. A. Matsumoto, R. G. Nuzzo, L. Mahadevan, J. A. Lewis, Nat. Mater. 2016, 15, 413-418.

[9] Q. Lin, X. Hou, C. Ke, Angew. Chem. Int. Ed. 2017, 56, 4452-4457; Angew. Chem. 2017, 129, 4523-4528.

[10] R. L. Truby, J. A. Lewis, Nature 2016, 540, 371-378.

[11] T. Jungst, W. Smolan, K. Schacht, T. Scheibel, J. Groll, Chem. Rev. 2016, 116, 1496-1539.

[12] (a) X. Zhang, X. Chu, L. Wang, H. Wang, G. Liang, J. Zhang, J. Long, Z. Yang, Angew. Chem. Int. Ed. 2012, 124, 4388-4392; Angew. Chem. 2012, 124, 4464-4468; (b) B. Ding, Y. Li, M. Qin, Y. Ding, Y. Cao, W. Wang, Soft Matter 2013, 9, 4672-4680; (c) M. Martínez-Calvo, O. Kotova, M. E. Möbius, A. P. Bell, T. McCabe, J. J. Boland, T. Gunnlaugsson, J. Am. Chem. Soc. 2015, 137, 1983-1992.

[13] (a) G. Ducouret, C. Chassenieux, S. Martins, F. Lequeux, L. Bouteiller, J. Coll. Inter. Sci. 2007, 310, 624-629; (b) X. Yu, Z. Wang, Y. Li, L. Geng, J. Ren, G. Feng, Inorg. Chem. 2017, 56, 7512-7518.

[14] (a) Z. Xie, A. Zhang, L. Ye, X. Wang, Z.-g. Feng, J. Mater. Chem. 2009, 19, 6100-6102; (b) A. J. P. Teunissen, M. M. L. Nieuwenhuizen, F. Rodríguez-Llansola, A. R. A. Palmans, E. W. Meijer, Macromolecules 2014, 47, 8429-8436.

[15] L. Ouyang, C. B. Highley, W. Sun, J. A. Burdick, Adv. Mater. 2017, 29, 1604983.

[16] S. Bertlein, G. Brown, K. S. Lim, T. Jungst, T. Boeck, T. Blunk, J. Tessmar, G. J. Hooper, T. B. F. Woodfield, J. Groll, Adv. Mater. 2017, 29, 1703404.

[17] G. J. d. A. A. Soler-Illia, C. Sanchez, B. Lebeau, J. Patarin, Chem. Rev. 2002, 102, 4093-4138.

[18] P. Alexandridis, T. A. Hatton, Coll. Surf. A: Phys. Eng. Asp. 1995, 96, 1-46.

[19] C. J. Brinker, Y. Lu, A. Sellinger, H. Fan, Adv. Mater. 1999, 11, 579-585.

[20] G. Pérez-Sanchez, S. C. Chien, J. R. B. Gomes, M. N. D. S. Cordeiro, S. M. Auerbach, P. A. Monson, M. Jorge, Chem. Mater. 2016, 28, 2715-2727.

[21] W. Y. Shih, W. H. Shih, I. A. Aksay, J. Am. Ceram. Soc. 1999, 82, 616-624.

[22] H. Yuk, X. Zhao, Adv. Mater. 2017, 29, 1704028.

[23] The doping ratio of 3 is significantly lower than 2 in these hydrogels due to 3's strong multivalent hydrogen-bonding capability.

[24] The bottom layer of the lattice undergo very slow evaporation process due to the strong gel-substrate interaction.

[25] A. Nakajima, J. Lumin. 1977, 15, 277-282.

[26] Y. Hong, J. W. Y. Lam, B. Z. Tang, Chem. Soc. Rev. 2011, 40, 5361-5388.

[27] (a) S. Tibbits, Architect. Des. 2014, 84, 116-121; (b) Q. Ge, A. H. Sakhaei, H. Lee, C. K. Dunn, F.-N. X. reports, Sci. Rep. 2016, 6, 31110; (c) L. Huang, R. Jiang, J. Wu, J. Song, H. Bai, B. Li, Q. Zhao, T. Xie, Adv. Mater. 2017, 29, 1605390.

[28] P. R. Selvin, Nat. Struc. Mol. Bio. 2000, 7, 730.

[29] (a) S. Cantekin, T. F. A. de Greef, A. R. A. Palmans, Chem. Soc. Rev. 2012, 41, 6125-6137; (b) T. F. A. de Greef, M. M. J. Smulders, M. Wolffs, A. P. H. J. Schenning, R. P. Sijbesma, E. W. Meijer, Chem. Rev. 2009, 109, 5687-5754; (c) T. Aida, E. W. Meijer, S. I. Stupp, Science 2012, 335, 813-817.

[30] C. E. Hoyle, C. N. Bowman, Angew. Chem. Int. Ed. 2010, 49, 1540-1573; Angew. Chem. 2010, 122, 1584-1617.

[31] M. H. Bakker, C. C. Lee, E. W. Meijer, P. Y. W. Dankers, L. Albertazzi, ACS Nano 2016, 10, 1845-1852.

[32] C. M. A. Leenders, M. B. Baker, I. A. B. Pijpers, R. P. M. Lafleur, L. Albertazzi, A. R. A. Palmans, E. W. Meijer, Soft Matter 2016, 12, 2887-2893.

[33] Y. Ogura, M. Artar, A. R. A. Palmans, M. Sawamoto, E. W. Meijer, T. Terashima, Macromolecules 2017, 50, 3215-3223.

[34] We noticed that the transparency of the monolith 7@M5/6 was increased due to the better solvation of the 3D polymer network following the active insertion of 7.

Experimental Section

Materials and Methods.

All reagents were purchased from commercial suppliers and used as received unless otherwise specified. Nuclear magnetic resonance (NMR) spectra were recorded on Bruker Advance 500 or 600 spectrometers with working frequencies of 500 or 600 MHz for $^1$H and 125 or 150 MHz for $^{13}$C nuclei, respectively. Chemical shifts are reported in ppm relative to the residual non-deuterated solvent signals (DMSO-d$_6$: δ=2.50 ppm). Solid state $^{13}$C-cross-polarization at magic-angle spinning (CPMAS) nuclear magnetic resonance measurements were performed on a Varian 400 MHz VNMRS system. High-resolution electrospray ionization mass spectra (HR-ESI-MS) were obtained on Synapt G2-Si or Micromass Q-Tof Ultima mass spectrometers. Fourier transform infrared (FTIR) spectra were recorded on a Shimadzu IR Affinity-1 FTIR-8000 spectrometer.

Morphological Characterization: White-light optical microscopic images were recorded using an AmScope SM-1TSW2 stereomicroscope. The fluorescent microscope images were obtained using an Olympus BX51 fluorescence microscope with a 4',6-diamidino-2-phenylindole (DAPI) fluorescent filter cube. Scanning electron microscopic (SEM) images were collected on an FEI Company X-30 field emission gun environmental scanning electron microscope at an electron acceleration voltage of 15 kV. Samples were prepared by sputter-coating the specimen with Au unless otherwise specified. Transmission electron microscopic (TEM) images were collected on an FEI Company Tecnai F20ST field emission gun transmission electron microscope at an electron acceleration voltage of 200 kV. TEM samples were prepared by drop-casting an ethanolic dispersion of the obtained material onto a Cu TEM grid and air-dried subsequently.

Porosity and Gas Sorption Analysis: Low-pressure gas adsorption experiments were carried out on a Micromeritics Accelerated Surface Area and Porosimetry System (ASAP) 2020 surface area analyzer. Ultrahigh-purity-grade N2 (obtained from Airgas Corp) were used in all sorption measurements. N$_2$ isotherms were measured using a liquid nitrogen bath (77 K). The pore volume of each material was estimated from the Dubinin-Raduskevich (DR) model with the assumption that the adsorbate is in the liquid state and that the adsorption involves a pore-filling process. Pore size distributions were determined using a nonlocalized density functional theory (NLDFT) carbon slit-pore model in the Micromeritics Software Package.

Synthesis of Molecular Monomers and Preparation of Co-Assembled Inks

Synthesis of Molecular Monomers and Fluorescent Trackers

Compound 2 was prepared according to a reported procedure. 9-(Hydroxymethyl)-anthracene (208 mg, 1.0 mmol) and 3-(triethoxysilyl)propyl-isocyanate (1.0 mL) was added to a 25 mL Schlenk tube under N$_2$ atmosphere. The reaction mixture was stirred at 100° C. for 5 h, affording a yellow solution before cooled down. After removing the solvent under the reduced pressure, the residue was purified by column chromatography (silica, CH$_2$Cl$_2$) to afford 2 (260 mg, 57%) as a light-yellow powder. $^1$H NMR (500 MHz, DMSO-d$_6$, 298 K): δ=8.68 (s, $^1$H), 8.40 (d, J=9.0 Hz, 2H), 8.13 (d, J=8.5 Hz, 2H), 7.61 (m, 2H), 7.55 (m, 2H), 7.16 (t, J=5.5 Hz, 1H), 6.06 (s, 2H), 3.71 (q, J=7.0 Hz, 6H), 2.97 (q, J=7.0 Hz, 2H), 1.43 (m, 2H), 1.12 (t, J=7.0 Hz, 9H), 0.50 (m, 2H). $^{13}$C NMR (150 MHz, DMSO-d$_6$, 298 K): δ=156.8, 131.4, 130.9, 129.4, 129.0, 128.0, 127.0, 125.7, 124.7, 58.18, 58.13, 43.5, 23.5, 18.7, 7.6.

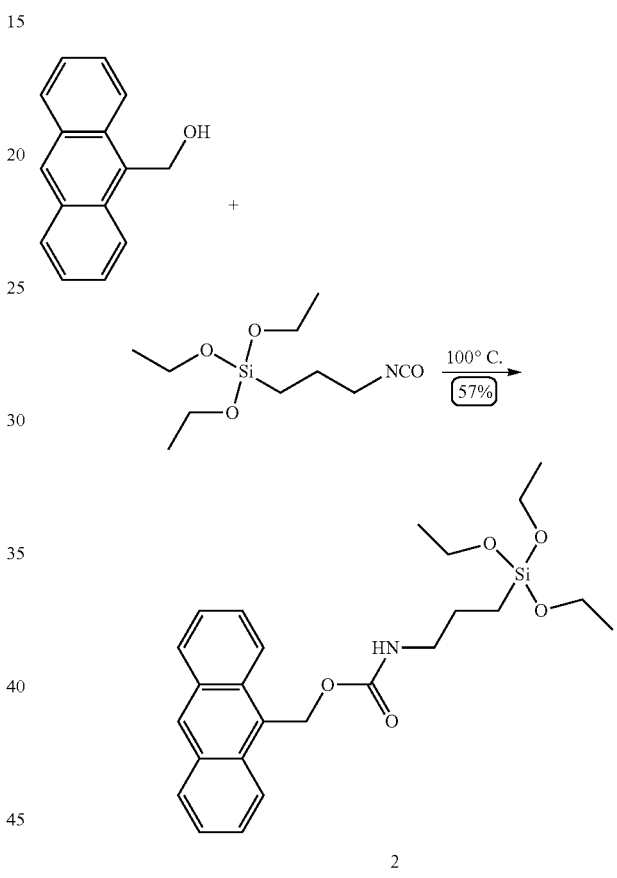

Tetrakis(4-aminophenyl)ethylene (200 mg, 0.51 mmol) was dissolved in anhydrous THF (10 mL) at room temperature under the N$_2$ atmosphere before 3-(triethoxysilyl)propyl-isocyanate (800 mg, 3.24 mmol) was added. The reaction mixture was stirred for 24 h at room temperature. The solvent was removed under the reduced pressure and the residue was purified by column chromatography (Al$_2$O$_3$, CH$_2$Cl$_2$) to afford 3 (445 mg, 64%) as a yellow powder. $^1$H NMR (600 MHz, DMSO-d$_6$, 298 K): δ=8.30 (bs, 4H), 7.12 (d, J=9.02 Hz, 8H), 6.77 (d, J=9.02 Hz, 8H), 6.11 (m, 4H), 3.75 (q, J=7.08 Hz, 24H), 3.02 (m, 8H), 1.45 (m, 8H), 1.14 (t, J=7.04 Hz, 36H), 0.54 (m, 8H). $^{13}$C NMR (150 MHz, DMSO-d$_6$, 298 K): δ=155.5, 139.0, 138.7, 137.2, 131.7, 117.2, 58.2, 42.2, 23.8, 18.7, 7.7. HR-ESI-MS: calcd for [M+Na]$^+$ m/z=1403.6858, found m/z=1403.6808.

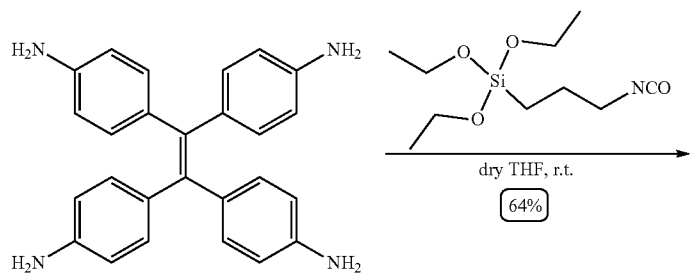

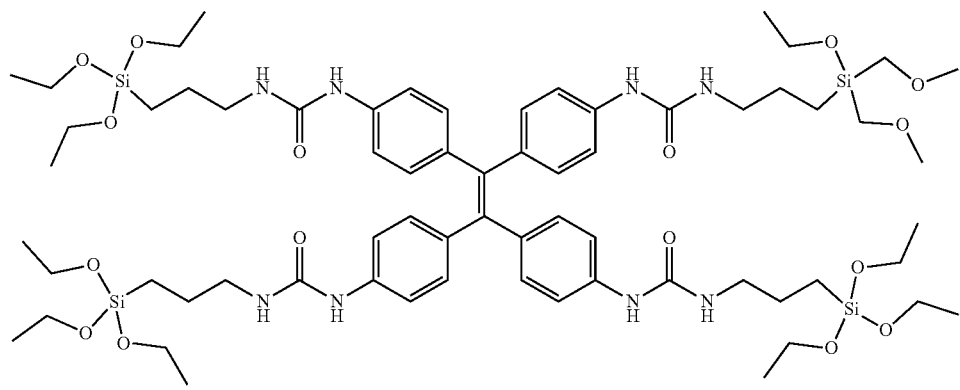

3

Compound 4 was prepared according to a similar procedure as that of 2 from 6-(dimethylamino)-2-(2-hydroxyethyl)-1Hbenzo[d,e]isoquinoline-1,3(2H)-dione (100 mg, 0.35 mmol) and 3-(triethoxysilyl)propyl-isocyanate (0.2 mL). The crude compound was purified by column chromatography (silica, $CH_2Cl_2$) to afford 4 (95 mg, 51%) as an orange powder. $^1$H NMR (500 MHz, DMSO-$d_6$, 298 K): δ=8.53 (d, J=8.5 Hz, 1H), 8.47 (d, J=7.3 Hz, 1H), 8.36 (d, J=8.3 Hz, 1H), 7.77 (t, J=8.1 Hz, 1H), 7.23 (d, J=8.3 Hz, 1H), 7.05 (t, J=5.5 Hz, 1H), 4.26 (m, 4H), 3.72 (q, J=7.0 Hz, 6H), 3.11 (s, 6H), 2.86 (q, J=8.5 Hz, 2H), 1.38 (m, 2H), 1.13 (t, J=7.0 Hz, 9H), 0.48 (m, 2H). $^{13}$C NMR (150 MHz, DMSO-$d_6$, 298 K): δ=164.2, 163.5, 157.1, 156.4, 132.8, 132.0, 131.1, 130.2, 125.4, 124.7, 122.8, 113.8, 113.4, 61.1, 58.1, 44.9, 43.4, 39.4, 23.3, 18.7, 7.5. HR-ESI-MS: calcd for [M+Na]$^+$ m/z=532.2479, found m/z=532.2480.

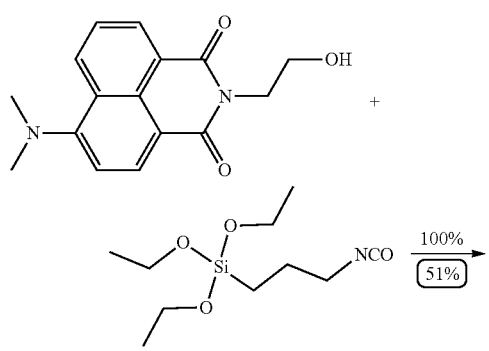

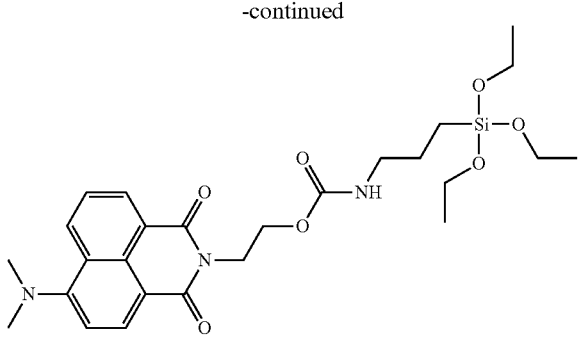

4

Compound 5 was prepared according to a reported procedure. S2 In a two-neck round-bottom flask (50 mL), allylamine (1.1 g, 19.3 mmol) and triethylamine (2.3 g, 22.6 mmol) were added to anhydrous $CH_2Cl_2$ (10 mL) at 0° C. under the $N_2$ atmosphere. A $CH_2Cl_2$ (10 mL, anhydrous) solution of 1,3,5-tricarboxychloride (1.0 g, 3.77 mmol) was added dropwisely to the reaction. The reaction mixture was stirred overnight at room temperature before the $CH_2Cl_2$ was removed under the reduced pressure. The residue was washed by HCl aqueous solution (1 M), saturated sodium bicarbonate aqueous solution and water respectively to afford 5 (1.1 g, 90%) as a white powder. $^1$H NMR (600 MHz, DMSO-$d_6$, 298 K): δ=8.85 (t, J=5.6 Hz, 3H), 8.44 (s, 3H), 5.91 (m, 3H), 5.20 (dd, J=17.2, 1.7 Hz, 3H), 5.11 (dd, J=10.3, 1.6 Hz, 3H), 3.96-3.91 (m, 6H). $^{13}$C NMR (150 MHz, DMSO-$d_6$, 298 K): δ=165.8, 135.6, 135.4, 129.1, 115.9, 42.2.

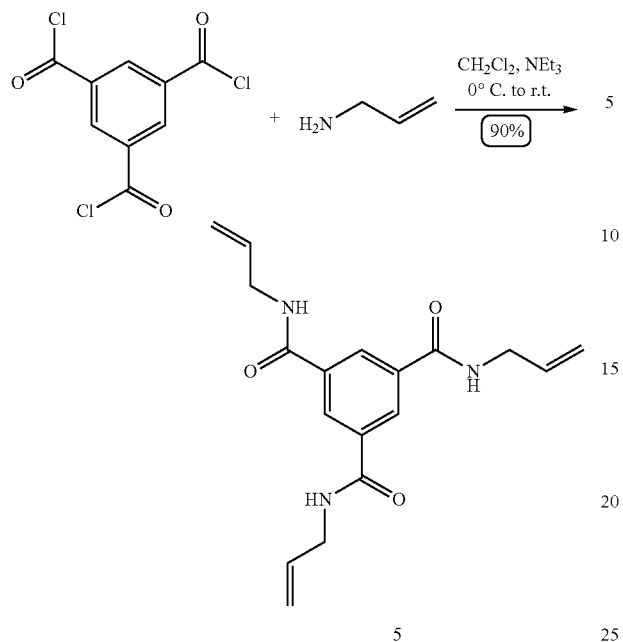

5

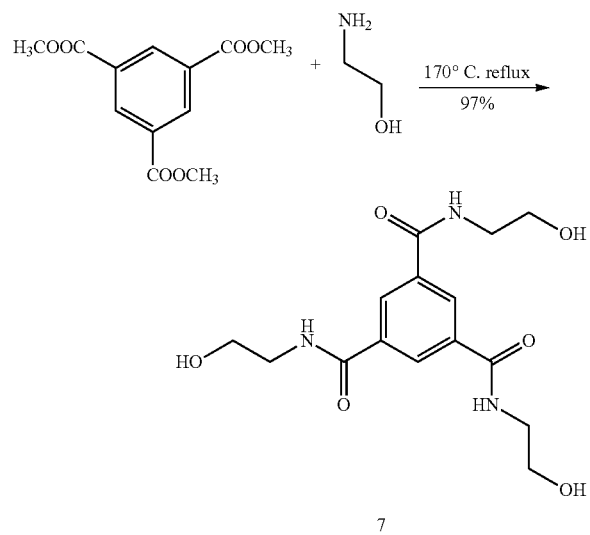

7

Compound S1 was prepared according to a reported procedure. S3 A round bottom flask (100 mL) was charged with 1,3,5-benzenetricarboxylic acid (3.0 g, 14.3 mmol), 30 mL of MeOH, and 1.5 mL $H_2SO_4$ (conc.). The reaction was refluxed for 6 h, cooled to room temperature, and the generated white power was collected by filtration. The crude product was washed with an excess of MeOH and dried in vacuum to afford the desired product (3.4 g, 97%). $^1$H NMR (600 MHz, DMSO-$d_6$, 298 K): δ=8.61 (s, 3H), 3.93 (s, 9H). $^{13}$C NMR (150 MHz, DMSO-$d_6$, 298 K): δ=164.5, 133.4, 131.0, 52.8.

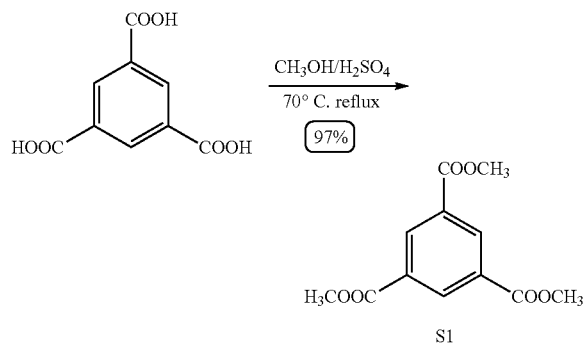

Compound 7 was prepared according to a reported procedure. S4 A round bottom flask (10 mL) was charged with S1 (1.0 g, 4.0 mmol), and 2-aminoethanol (3.0 mL, 49.6 mmol). The reaction was refluxed (170° C.) overnight before cooled to room temperature. MeOH (6 mL) was added to the reaction and then the reaction was refluxed for another 30 min. $CH_2Cl_2$ (100 mL) was added to the reaction to form a white precipitate. The product was collected by filtration, washed by an excess of $CH_2C_2$ and dried in vacuum at room temperature for 24 h as a white powder (1.3 g, 97%). $^1$H NMR (600 MHz, DMSO-$d_6$, 298 K): δ=8.62 (s, 3H), 8.42 (s, 3H), 4.77 (t, J=5.3 Hz, 3H), 3.54 (dd, J=11.4, 5.7 Hz, 6H), 3.37 (dd, J=11.5, 5.7 Hz, 6H). $^{13}$C NMR (150 MHz, DMSO-$d_6$, 298 K): δ=165.6, 134.9, 128.4, 59.7, 42.3.

Preparation of Co-Assembled Inks

Figure 18:
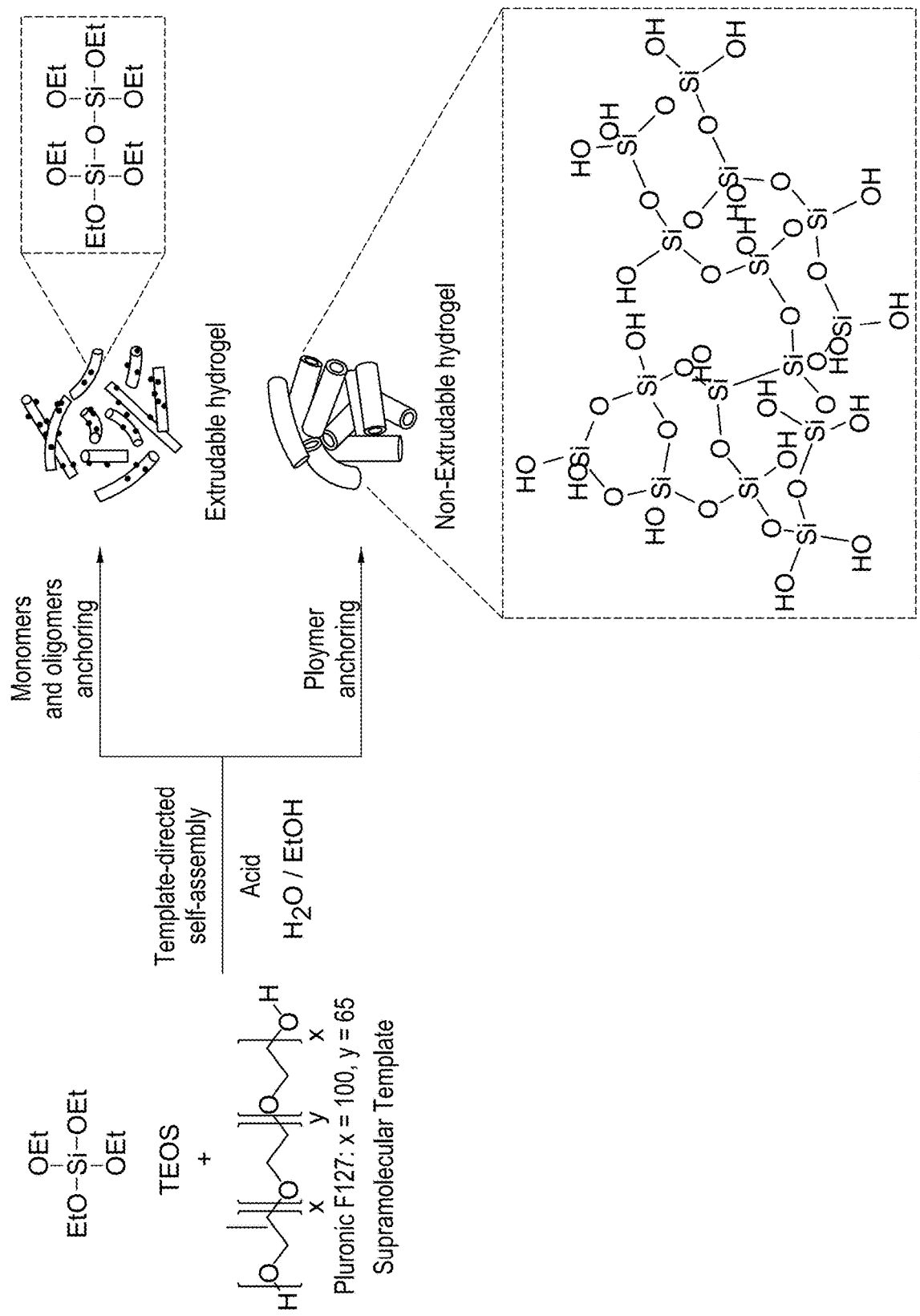
FIG. 18 shows a representation of synthesis of Pluronic F127 templated TEOS hydrogels in acidic mix-solvents of $H_2O$ and EtOH.

The formation of hydrogels (FIG. 18) is dependent on concentrations of TEOS and acid, solvent combinations, and reaction time. Hence, a series of reaction conditions were screened (FIG. 3) for optimization.

TEOS Polycondensation Rate Monitoring

Time-dependent $^1$H NMR and FT-IR spectroscopies were employed to gain a better understanding of the reaction kinetics of the TEOS polycondensation. In the $^1$H NMR spectrum (FIG. 4) of a mixture of an ethanolic solution of TEOS with an aqueous solution of Pluronic F127/$CH_3COOH$, resonance at 3.51 ppm attributed to the ethylene protons of the polyethylene oxide (PEO) block of the triblock copolymer F127. Interestingly, resonances corresponding to the polypropylene oxide (PPO) do not appear in the spectrum. In comparison, the $^1$H NMR spectrum (FIG. 4) of a transparent gel (synthesized in an open vessel and dissolved in DMSO-$d_6$ for NMR analysis), a considerable amount of EtOH and $H_2O$ loss was observed, which is consistent with the solvent evaporation during the reaction. In addition, a 6% loss of peak integration (using F127 resonances as an internal reference) corresponding to the ethoxy resonances at 1.15 and 3.75 ppm of the TEOS monomer was observed, suggesting that only a small amount of TEOS underwent hydrolysis and condensation to form oligomers. Allowing the gel to react in a sealed vessel for 24, 48 and 72 h (FIG. 4), respectively, resulted in decreasing resonances corresponding to the TEOS monomer in the $^1$H NMR spectra, confirming that the polycondensation of TEOS occurs gradually over an extended period. In the time-dependent FT-IR spectra (FIG. 5), no significant Si—O—Si stretching band was observed until the reaction time of the gel reaches 24 h. At a reaction time of 80 h at room temperature, a series of strong Si—O—Si stretching bands at 1215, 1072 and 1045 cm$^{-1}$ were observed, suggesting that an extensive polycondensation of TEOS had occurred over a period of 3 d.

Rheological Studies

Rheological measurements were performed on a stress-controlled rheometer (TA instruments, DHR-2) with a 20-mm diameter parallel plate geometry and a measuring gap of 1 mm at room temperature. Four types of rheological measurements were performed to investigate the elastic modulus, viscosity and shear thinning properties of the synthesized gels.

Figure 19:
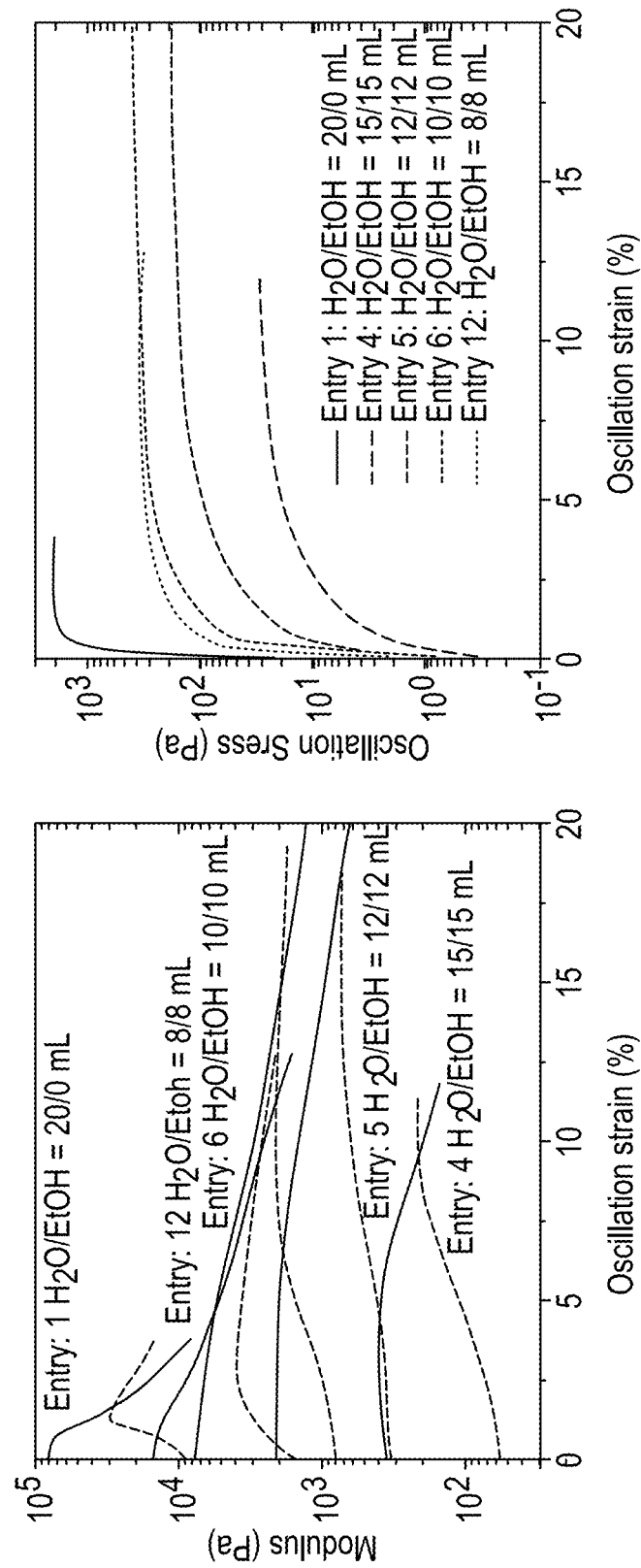
FIG. 19, panels (a)-(b), shows selected strain sweeps of synthesized hydrogels in FIG. 3. Storage G' are solid lines and loss G" are dashed lines (left panel) and oscillation stress profiles of the hydrogels (right panel). The shaded areas in the graph indicate suitable rheological range for direct-ink writing 3D printing.
Figure 20:
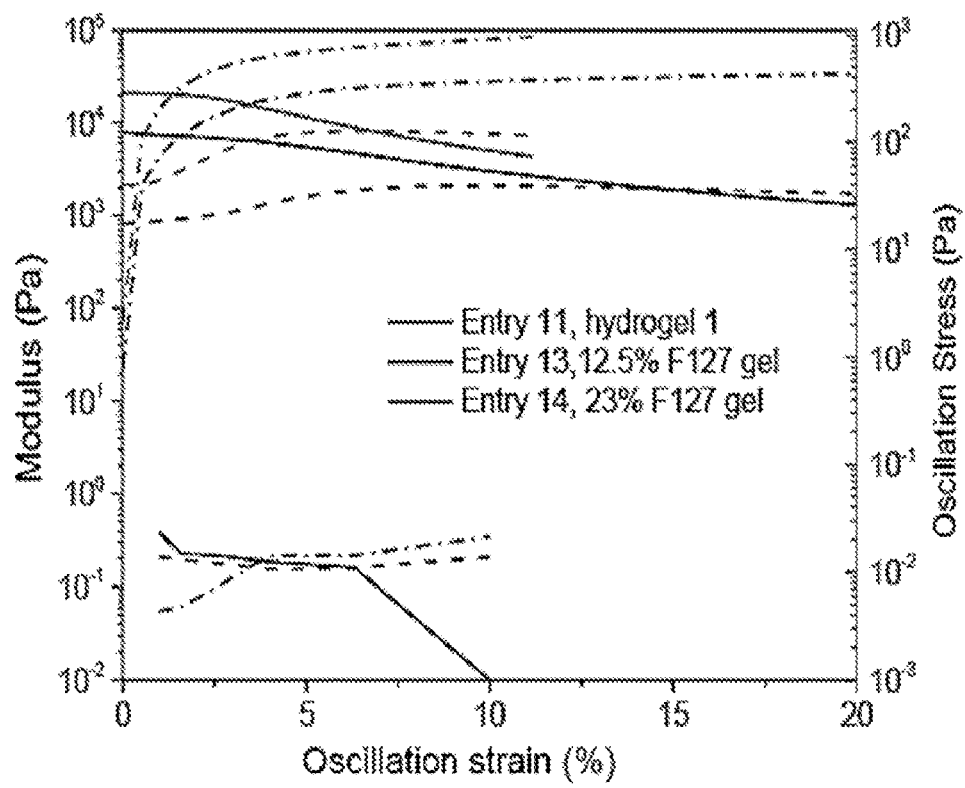
FIG. 20 shows strain sweeps of synthesized hydrogels in FIG. 3; G', G" and oscillation stress profiles are shown as solid, dash and dash-dot line.
Figure 21:
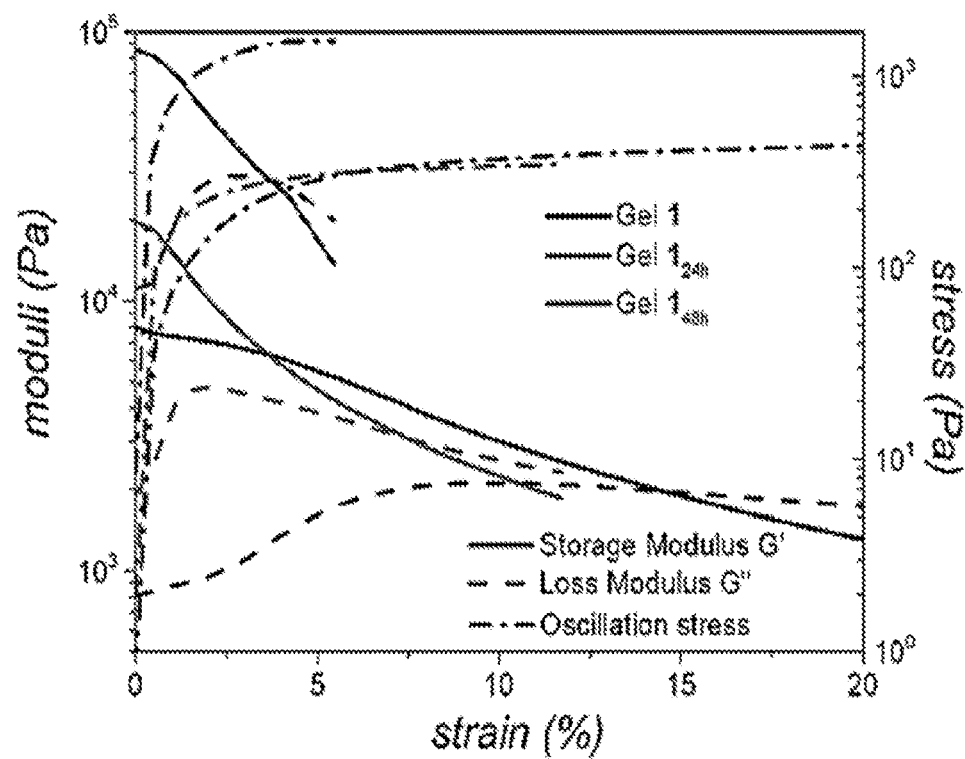
FIG. 21 shows strain sweeps of hydrogels synthesized with different reaction times.
Figure 22:
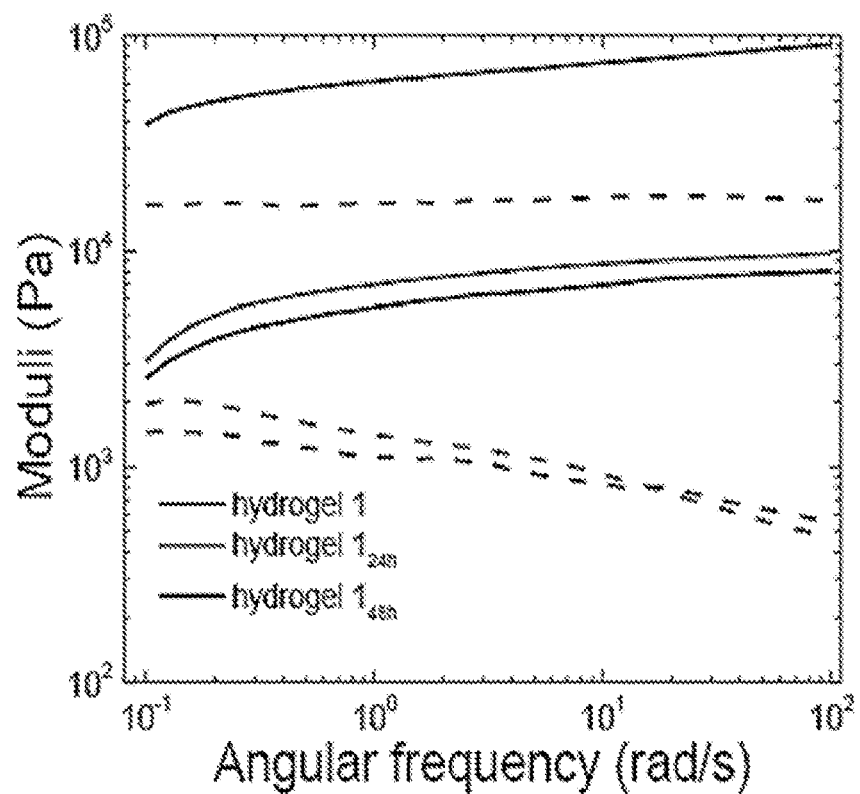
FIG. 22 shows frequency sweep of hydrogel G1 synthesized with different reaction times, showing storage (solid lines) and loss (dashed lines) moduli at a constant strain amplitude of 1%.
Figure 23:
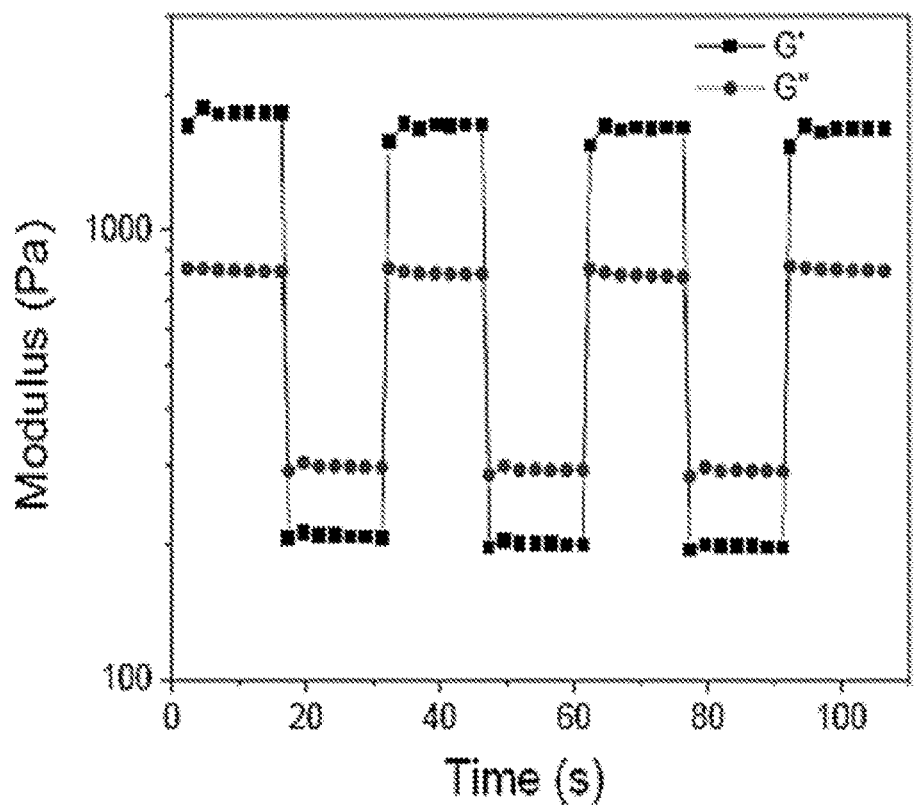
FIG. 23 shows dynamic step-strain sweeps of storage and loss moduli for hydrogel G1 under alternative strains of 1% and 50%.

Strain sweep: An oscillation with an angular frequency of 10 rad/s was applied to the synthesized hydrogel, and the corresponded storage modulus (G') and loss modulus (G") were recorded while the oscillation strain increased from 0.1% until passing the yield strain. Yield stress is defined as the stress value when G'=G". Frequency sweep: Moduli G' and G" were measured when the oscillation frequency is increasing from 0.1 Hz to 100 Hz at 1% oscillation strain. Shear rate flow sweep: Viscosity and shear stress of the hydrogel was recorded over a range of shear rate, in our case, $1\sim100$ s$^{-1}$. Dynamic step strain amplitude test: Moduli G' and G" were recorded with strain of 1% and 50% alternatively at a frequency of 10 rad/s. The period of each step is 15 s. FIG. 19 shows selected strain sweeps of synthesized hydrogels listed in FIG. 3. Storage G' (solid lines) and loss G" (dashed lines) moduli, and (b) oscillation stress profiles of the hydrogels. The shaded areas indicate suitable rheological range for direct ink writing 3D printing. FIG. 20 shows strain sweeps of hydrogels synthesized in entries 6, 13 and 14 in FIG. 3. G', G", and oscillation stress profiles were shown as solid, dash, and dash-dot-line, respectively. FIG. 21 shows strain sweeps of hydrogels synthesized with different reaction times, G1, G1$_{24h}$ (and G1$_{48h}$. FIG. 22 shows frequency sweep of hydrogel G1 synthesized with different reaction time. Storage (solid lines) and loss (dashed lines) moduli of hydrogel G1 synthesized with different reaction times were measured in angular frequency sweeps at a constant strain amplitude of 1%. FIG. 23 shows dynamic step strain sweeps of storage and loss moduli for hydrogel G1 under alternative strains of 1% and 50%.

Direct Ink Writing 3D Printing

General Procedure.

Typically, the prepared hydrogel was loaded into a syringe barrel, centrifuged to remove bubbles and transferred into a Nordson EFD syringe barrel (3 mL) and installed onto the 3D printer. 3D printing experiments were performed on an extrusion based 3D printer (Tabletop, nScrypt) equipped with either an Nordson EFD precision smooth flower tapered tip or an nTip with an inner diameter of 25, 50, 75 or 125 µm, respectively. Printing paths were generated by scripting using P-CAD. Printing substrates include glass and plastic slides, silicon wafer and Parafilm. To improve the 3D feature in vertical direction, each woodpile lattice level consists four repetitive layers generated by dispensing the hydrogel in a back-and-forth manner. Woodpile lattice consisting of eight repetitive layers affords good structural integrity of the resulting printed object. Printed objects were made that were composed of 144 dispensing layers with each woodpile feature consisting of four or eight repetitive dispensing layers using a 200 µm tip. An object consisting of 144 stacked dispensing layers shows no printing defects, suggesting good printing performance of hydrogel G1. For nTip printing, each woodpile feature consisting of two repetitive sub layers resulted in better linewidth. High-resolution 3D objects with good structural integrity can be achieved using nTips with inner diameter (id) of 125 µm, 75 µm, 50 µm and 25 µm, respectively. Also made were as-printed woodpile lattice cubes using nTips with inner diameter of (a) 125, (b) 75, (c) 50 and (d) 25 µm, respectively. The dimensions (x/y/z) of the printed objects are (a) 8/8/9 mm, (b) 6/6/6 mm, (c) 4/4/3.8 mm and (d) 3/3/1.8 mm, respectively, each consists of 120 dispensing layers of hydrogel G1. The L/d ratios are (a) 3.2, (b) 3.7, (c) 4.0 and (d) 4.2, respectively.

Customized Dual-Extruder 3D Printing System

A commercial fused deposition modeling (FDM) based 3D printer (Flashforge Pro) has been modified to a dual extrusion 3D printing system for hydrogel printing. Firstly, two syringe pumps were replicated based on a set of open-source files. The plastic parts of the pump were printed with polyacrylonitrile-butadiene-styrene (ABS) filaments using the original setup of the Flashforge Pro printer. The metal parts (thread rods, ball bearings and flexible couplings) are commercially available and assembled with the plastic parts. Two positioning holes were drilled through the top surface of the plastic shield of the printer, and then the syringe pumps were well fixed at the holes via fastening clips and screws. Two feeding motors of the original setup, which rotate the filament reels, were detached from the printer head and reused as the syringe pumps driving units without any extra rewiring. The rotatory movement of the motors was converted to vertical up/down movement of the plungers through flexible couplings, thread rods and a pair of fastening clips. Subsequently, the original heating units and metal nozzles were detached from the nozzle bed, which were replaced by a dual extruder clip board. The board was self-designed to fasten a pair of female Luer lock adapters that can fit any Luer lock tip. Finally, the syringe barrels and tapers tips were connected by vinyl tubing with Luer lock adapters. In a practical printing experiment, a "*.stl" 3D printing file was first imported to the Simplify3D software and sliced into printing paths layer by layer. The hydrogel extrusion was also controlled using the same software, by adjusting corresponded parameters. Specifically, the hydrogel extrusion speed was feasibly controlled by a parameter named "extrusion multiplier". Then two syringes (10 mL or 20 mL) loaded with hydrogels were fitted into the pump clips, and the hydrogel was subsequently driven by the motor movements, flowing through the vinyl tubing and extruded through the tips fixed on the nozzle bed. The printing speed can achieve 40 mm/s, which is reasonably high for small-scale gel extrusion based 3D printing. Dual material printing can also be readily performed by loading the two syringes with different hydrogels. An "Arc deTriomphe" was printed (FIG. 2D) with linewidth of approximately 250 µm after printing, which shrunk to 75 µm after calcination at 700° C. Images of "Arc de Triomphe" replicates printed by the dual-extrusion 3D printer using (a) ABS and (b) G1. The as-printed hydrogel Arc was then (c) dried by evaporation, followed by (d) calcination at 700° C. The dimensions (x/y/z) of the objects are (b) 20/13.5/19.5 mm, (c) 14.5/9.4/13.5 mm and (d) 5.1/3.3/4.9 mm, respectively. The inserted image (e) is an enlarged top view of (d).

Post-Printing Process

General Methods

In general, a woodpile lattice cube prepared by direct ink writing was transferred to a sealed chamber to allow solvent evaporation at approximately 85% relative humidity (RH) for 4 to 168 h, followed by further solvent evaporation in 15% RH, resulting in significant volume shrinkage of the fabricated lattice. The lattice was then calcined in a tube furnace at a desired temperature (heating rate=1° C./min). During the solvent evaporation process, uneven shrinkage of the woodpile lattice cube may occur due to the chemical interactions between the bottom layer of the cube and the printing substrate. For example, silicon wafers and glass slides are widely used substrates in gel-extrusion based direct ink writing due to their low surface roughness. However, a layer of Si—OH on the surface of these substrates can participate in the polycondensation of TEOS, leading to covalent attachment of the lattice cube to the substrate, which resulting uneven shrinkage during the solvent evaporation evolution. Hence, plastic slides or Parafilms were employed as the printing substrate for direct ink writing experiments in this work unless specifically mentioned otherwise. The uneven shrinkage problem was addressed by adding a few orthogonal raft layers. Woodpile lattice cubes with dimension of 9×9×12.2 mm were printed using hydrogels G1, $G1_{24h}$, $G1_{36h}$, and $G1_{48h}$, respectively. After solvent evaporation at room temperature, the lattice cubes composed of G1 and $G1_{24h}$ maintained their shape while the volumes shrunk to 24% (dimension: 6×6×6.5 mm) and 46% (dimension: 7×7×9.2 mm) of their original volumes, respectively. Lattice cubes composed of G136h and G148h cracked after solvent evaporation.

Shrinking Analysis

Figure 24:
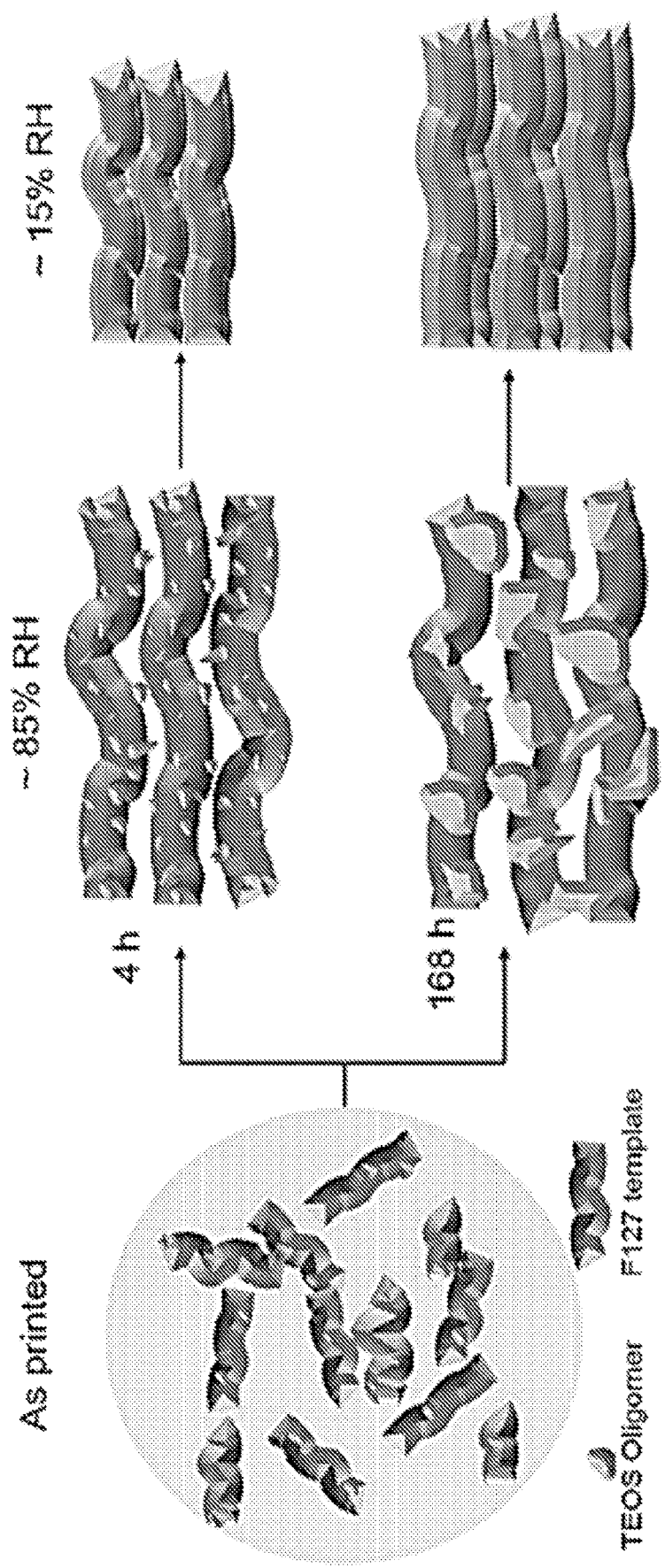
FIG. 24 shows a schematic representing fast and slow evaporation processes of the G1 monolith.
Figure 25:
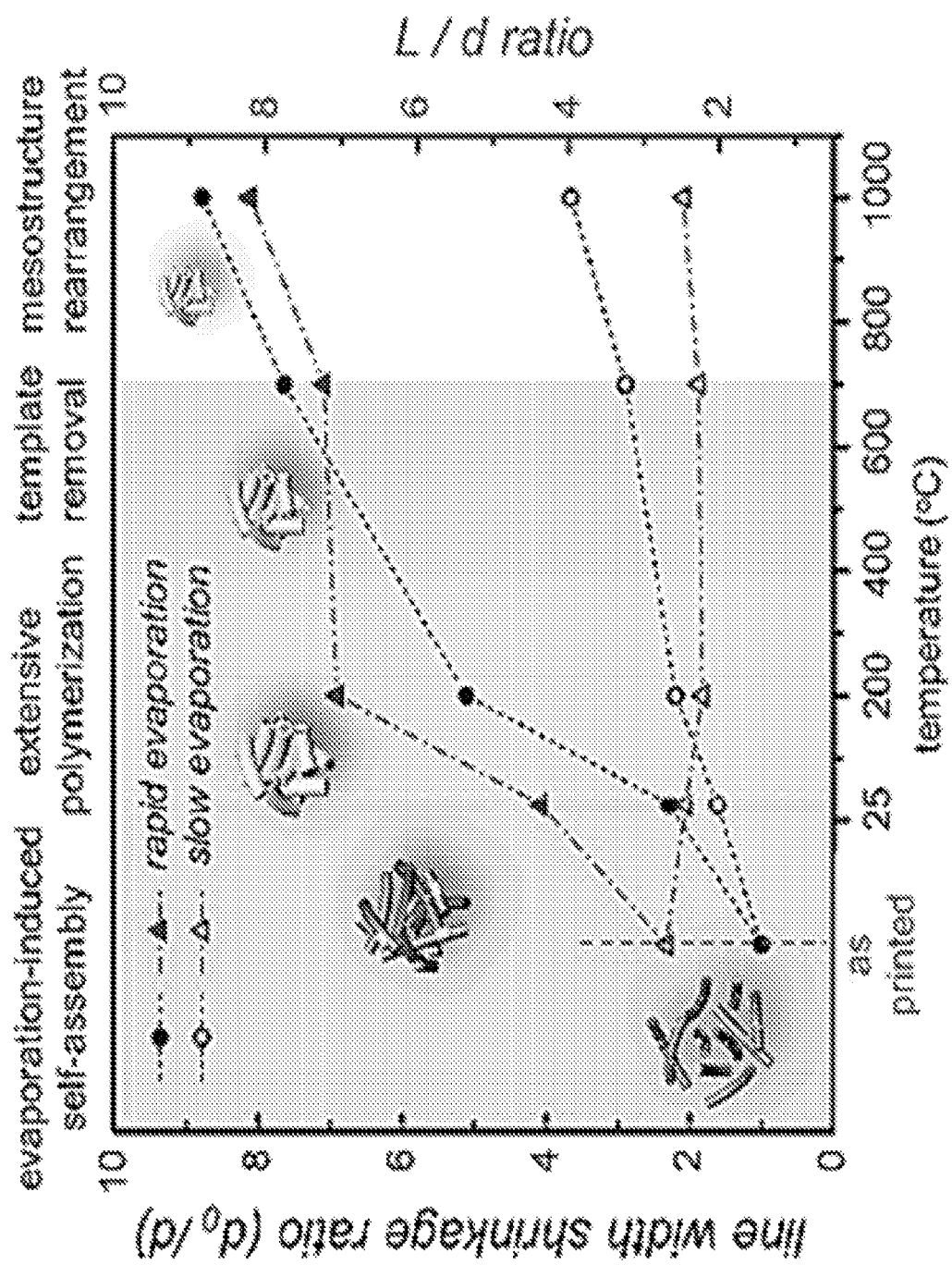
FIG. 25 shows averaged linewidth enhancement ratio and L/d of the woodpile lattices at different stages.

Hydrogel G1 was printed into 9×9×7.56 mm woodpile lattice cubes (>20 objects) with the constant air pressure (~4.5 PSi), printing speed (10 mm/s) and dispensing gap. These cubes were transferred to a sealed chamber with 85% RH. After 4 h, some lattice cubes (>5 objects) were transferred to another environment with ~15% RH to speed up solvent evaporation. Other lattice cubes were further stocked in the 85% RH sealed chamber for 168 h. All air-dried cubes were calcined at different temperatures to investigate their shrinkage. The overall volume, linewidth and L/d ratio were collected at five different post treatment stages (as printed, after solvent evaporation and after calcination at 200° C., 700° C., and 1000° C.) of the printed lattice cubes as shown in FIG. 6. In a parallel experiment, after a slow evaporation process (sealed in ~85% RH chamber for 168 h), the linewidth resolution was moderately improved from $d_0$=332 to d=205.8 μm; the L/d ratio was slightly reduced (2.44) but a significant volume reduction (−85.5%) was recorded. The lattice cube was further calcinated at 200, 700 and 1000° C., respectively and its shrinkage data were summarized in FIG. 6. Compared with the fast evaporation sample, the volume reduction in the slow evaporation sample is significant large and the final volume was only 1% of its original volume. The L/d ratio of the slow evaporation sample slightly fluctuated throughout the post-printing process. When TEOS undergoes polycondensation, EtOH was generated in the reaction (FIG. 24) and the evaporation was speed up (due to the increase of EtOH content in the solvent mixture). In the slow evaporation process, the TEOS polycondensation and solvent evaporation speed are comparable. Hence, the TEOS polymerization accelerates the solvent evaporation process (by generating EtOH during the polymerization). This polymerization induced evaporation process further aid the TEOS/F127 coassembly, therefore resulting in a dense framework microscopically with larger volume shrinkage and a slightly decreased L/d ratio macroscopically after the solvent evaporation process. FIG. 25 shows averaged linewidth enhancement ratio ($d_0$/d) and L/d of the woodpile lattices at different stages.

Optical Microscopy and SEM Characterization

Optical microscopy showed that calcined hydrogel G1-printed object possesses small particle features, while hydrogel $G1_{36h}$-printed and $G1_{48h}$-printed objects feature large silica particle structures.

Porous Structures of Silica Monoliths

Figure 26:
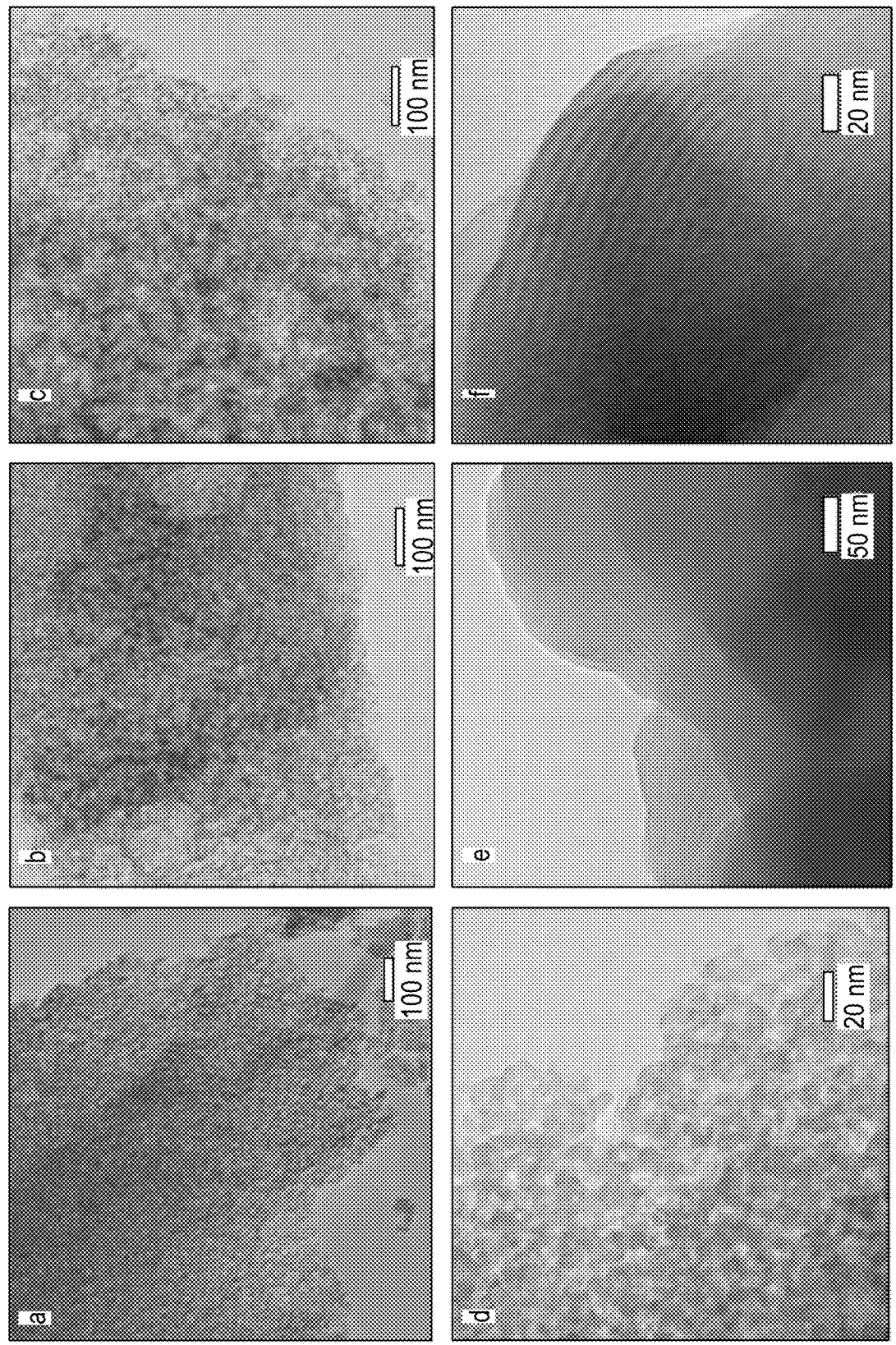
FIG. 26 shows TEM images of mesoporous structures formed in lattice monoliths after calcination at 700° C. The images are of G1 lattices and underwent 4, 24 and 26 hour stocking time in 85% relative humidity (top left, top middle, top right). Bottom left panel shows a high resolution TEM image. Bottom middle and right panels show the ordered structures formed in the lattice cube.

Mesoporous structures were obtained within silica lattice monoliths after calcination at 700° C., and their porosity were measured as shown in FIG. 26, respectively. FIG. 7 shows N2 sorption isotherms of the monoliths fabricated using G1, $G1_{24h}$ and $G1_{48h}$ after 700° C. calcination. To investigate the influence of solvent evaporation on the formation of porous structures, lattice cubes were produced via different solvent evaporation processes. All the obtained silica monoliths feature mesoporous structures as shown in TEM analysis (FIG. 26). FIG. 26 shows TEM images of mesoporous structures formed in lattice monoliths (after calcination at 700° C.). The lattice cubes presented in (a-c) were printed with hydrogel G1 and underwent 4, 24 and 36 h stocking time in ~85% RH respectively. (d) A high-resolution TEM image taken from (a). (e) and (f) indicate the ordered structures formed in the lattice cube printed with hydrogel of FIG. 3, Entry 11.

The silica monoliths acquired after a fast solvent evaporation process exhibited porous structures with a measured pore size ranging from 2-10 nm and a Brunauer-Emmett-Teller (BET) surface area of 304 $m^2$/g. The silica monoliths experienced a 24 h stocking period showed similar porous structures, with most of the pores smaller than 10 nm and a surface area of 327 $m^2$/g. While with extended stocking hours in high RH chamber, the obtained silica monoliths exhibited a larger pore size and a wide-dispersed porous structure, because of denser frameworks formed during the solvent evaporation. Using suitable feed ratio of TEOS/F127, ordered mesoporous microstructures was observed in the TEM analysis. The relative parameters of porosity analysis were summarized in FIG. 27.

Fluorescent Tracking Experiments

Methods

Preparation of fluorescent tracker-doped hydrogels. Hydrogel G1 doped with fluorescent trackers 2 or 3 was prepared following the procedure described in above, except that 2 (9.1 mg, 2.0×$10^{-2}$ mmol) or 3 (2.8 mg, 2.0×$10^{-3}$ mmol) was added to the TEOS (8 mL, 35.8 mmol) EtOH (5 mL) solution. The correspondent hydrogels will be referred to as hydrogel 2@G1 and 3@G1 respectively. In a freshly prepared fluorescent tracker-doped hydrogel (20.5 mL), the concentrations of 2 or 3 are 1.0 mM and 0.1 mM, respectively.

Real-time imaging of fluorescent trackers in the hydrogel. The fluorescent tracker-doped hydrogels 2@G1 and 3@G1 were printed into woodpile lattices and monitored using a fluorescence microscope (Olympus BX51). The solvent of printed woodpile lattices was allowed to evaporate in open air (~40% RH) at room temperature (22° C.) during the imaging process. We noticed that, compared with our controlled evaporation process, the solvent of the printed sample evaporates rapidly because of low RH and the low profile of the structure. This rapid evaporation allows us to record visible linewidth shrinkage within 10 minutes. Bright field images of the woodpile lattices were recorded under transmitted light illumination, with 15 μs exposure time and 200 ISO. The fluorescent images were recorded with a DAPI fluorescent filter cube inserted, also at a 200 ISO, and the exposure time was 50 μs or 200 μs for fluorescent trackers 2 or 3, respectively. Movies were recorded with the same camera settings. After excition (λ=352-402 nm), the fluorescence emission of 2- or 3-doped G1 was filtered by a DAPI emission filter. Hence, only part of the emission of the hydrogels was collected and the blue fluorescent color doesn't reflect the true emission color of 2 or 3.

Fluorescent spectroscopy. All the fluorescence excitation and emission data were recorded on a Horiba PTI QuantaMaster 8000 Series Fluorometers. Quartz cuvettes with 10 mm pathway were used to record the solution-state fluorescence spectra. Solid-state fluorescence samples were prepared by spreading a thin layer of hydrogel 2@G1 or 3@G1 on a quartz slide and their time-dependent fluorescence spectra were recorded accordingly.

Fluorescent Imaging

Evaporation-induced co-assembly of fluorescent trackers in hydrogel G1 was monitored by fluorescence microscopy. After 5 min in open air, a 2-layer woodpile lattice composed by 2@G1 exhibited noticeable size shrinkage (top layer) in the bright field image. In the fluorescent image, segregated dark areas appeared along the edge of the top layer because of the aggregation-caused quenching (ACQ). Extending the evaporation time, dark areas expanded substantially. The fluorescence quenching takes place firstly at the surfaces of the top layer and then expands to the central parts. The 2-layer woodpile lattice of 3@G1 also showed apparent top-layer linewidth shrinkage after an exposure of 5 min in open air. In the fluorescent image bright areas were recorded, which propagates with the extended evaporation time.

Fabrication of Organosilica M3 and Organic Monoliths M5/6

Preparation of Hydrogels G3 and G5/6

Preparation of organosilica-based hydrogels G3. Pluronic F127 (1.26 g, 0.1 mmol) was dissolved in a mixed solvent composed of EtOH (5 mL) and a $CH_3COOH$ aqueous solution (5 mL, 20 mM). Organosilica 3 (0.1 mmol) was dissolved in THF (5 mL) and the obtained solution was mixed with the F127 solution. The mixture was stirred at 400 rpm in a sealed vessel for 4 h at room temperature followed by stirring at 600 rpm in the open air to allow the solvent evaporation until a hydrogel formed.

Figure 30:
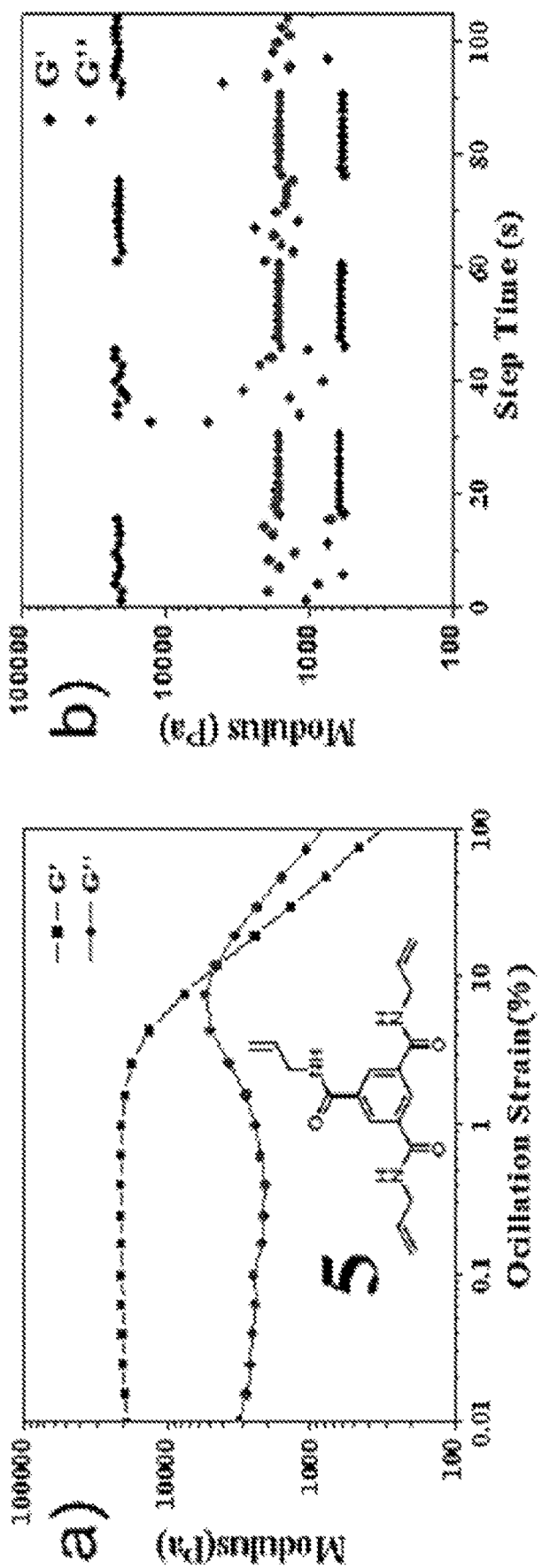
FIG. 30, panels (a)-(b), shows a graph with the strain sweep (left panel) and dynamic strain sweep (right panel) of G5/6.
Figure 31:
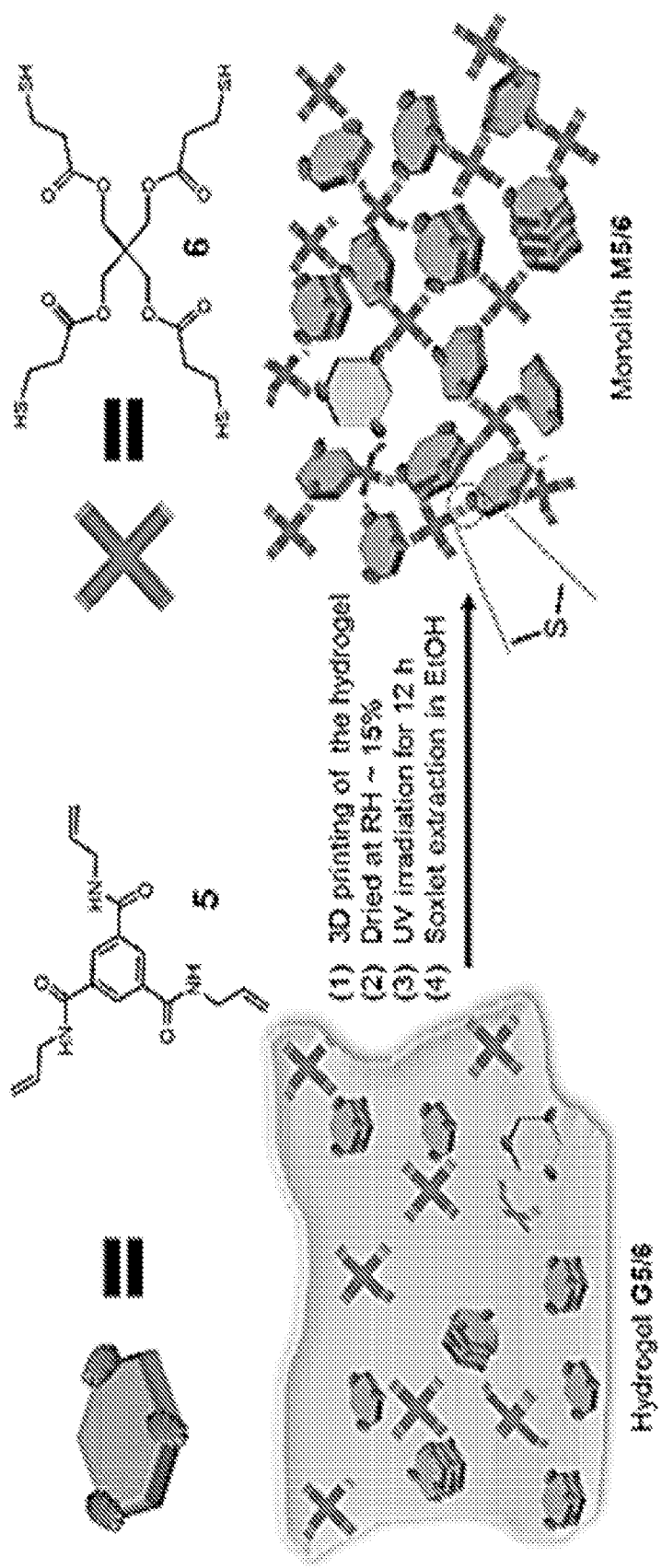
FIG. 31 shows a schematic for preparation of organic monoliths M5/6.

Preparation of organic monomer hydrogel G5/6. Pluronic F127 (1.26 g, 0.1 mmol), molecular monomer 5 (0.5 mmol), and cross-linker 6 (183 mg, 0.0375 mmol) were dissolved in a solvent mixture composed of $H_2O$ (5 mL), EtOH (5 mL) and THF (5 mL). 2,2-Dimethoxy-2-phenylacetophenione (DMPA, 8 mg, 0.06 mmol, 2 mol % to thiol groups) was added to the mixture with stirring at 400 rpm in the open air. The solvent of the mixture was gradually evaporated and an opaque hydrogel was formed (~5 g of hydrogel was obtained). FIG. 29 provides the strain sweep (left panel) and dynamic strain sweep (right panel) for hydrogel G3. FIG. 30 provides the strain sweep (left panel) and dynamic strain sweep (right panel) for hydrogel G5/6. FIG. 11 shows Storage and loss moduli of (a-b) F127 hydrogel ([F127]= 21% wt), (c-d) G3 hydrogel ([F127]=22% wt), (e-f) G5/6 hydrogel ([F127]=24% wt) as a function of ocillation strain and shear stress.

Fabrication of Organosilica-Based Monoliths M3

3 aggregates in $CDCl_3$ due to the strong hydrogen bonding interactions as indicated by the $^1H$ NMR spectrum. These intermolecular hydrogen bonding interactions are not significant in polar solvent such as DMSO, which affords a well-resolved $^1H$ NMR spectrum. The hybrid woodpile lattice cubes were fabricated through direct ink writing with hydrogels G3. After printing, the lattice cubes were transferred to a sealed chamber at ~15% RH at room temperature for 12 h to allow solvent evaporation. The lattice cubes were gradually warmed up to 50° C. for 48 h to extensive crosslink the monomers. The template F127 was removed by Soxhlet extraction using EtOH. The EtOH solvent left in the cubes was then exchanged to hexamethyldisilazane and allowed naturally evaporated, affording the desired lattice cubes (monolith M3). See FIG. 12. Solid-state $^{13}$CPMAS NMR: 157.1, 138.8, 132.5, 117.6, 75.7, 73.5, 70.7, 59.8, 58.0, 43.4, 40.4, 25.6, 18.5-11.3, 2.1 FIG. 13 shows the measured dimensions of organosilica monolith at each stage. 1st, 2nd and 3rd stages correspond to as-printed, cross-linked and template removed states, respectively.

$^1H$ NMR Studies of Co-Assembly Between Monomer 5 and Supramolecular Template

Compound 5 consists a benzene-1,3,5-tricarboxamides (BTAs) moiety, which self-assembles into one-dimensional polymers. 5 (15 mM) was dissolved in a mixed solvents of MeOD (0.5 mL) and $D_2O$ (0.5 mL) at 60° C. first and then cooled to room temperature. Time-dependent NMR spectra were recorded from 0 to 12 h at room temperature to monitor the supramolecular polymerization of 5, showing the self-assembly of compound 5 in the mixture of solvents.

Synthesis and Fabrication of Monolith M5/6.

Woodpile lattice cubes composed G5/6 were fabricated through direct ink writing. After printing, these lattice cubes were transferred to a sealed chamber with ~15% RH at room temperature for 12 h to allow solvent evaporation. These lattice cubes were then photo-irradiated under mercury lamp for 12 h for thiol-ene crosslinking. We noticed that, even under extended time of UV irradiation, the thiol-ene cross-linking degree is not sufficient to maintain the monolith's macroscopic structure after template removal. Hence, these cubes were further heated to 100° C. for another 12 h for extensive polymerization. Template F127 was removed by Soxhlet extraction using EtOH and the desired lattice cubes in the form of hydrogel were obtained by solvent exchanging using $H_2O$. The monolith was dried under the reduced pressure for elemental analysis. M5/6: $(C_{18}H_{21}N_3O_3)1.08 \cdot (C_{17}H_{28}O_8S_4) \cdot (F127)0.06$ calcd: C 54.13%, H 7.65%, N 2.93%, S 8.3%; found: C 53.59%, H 7.1%, N 3.03%, S 7.79%. Solid-state $^{13}$CPMAS NMR: 171.0, 166.2, 135.1, 75.6, 73.6, 70.9, 64.0, 43.2, 35.6, 17.9.

Active insertion of 7 to M5/6. Active insertion of a supramolecular pillar 7 into monolith M5/6 was performed by immersing the monolith M5/6 (wet weight 100 mg) in an aqueous solution of 7 (0.7 M) and heated to 80° C. for 2 h. The inserted monolith 7@M5/6 was then cooled down to room temperature and washed with small amount of water to remove physically adsorbed 7 and its size was recorded using a optical microscope. The hydrogel mass was carefully recorded after the active insertion and a mass increase of 161% was recorded. The monolith was dried under the reduced pressure for elemental analysis. 7@M5/6: $(C_{18}H_{21}N_3O_3)1.08 \cdot (C_{17}H_{28}O_8S_4) \cdot (C_{15}H_{21}N_3O_6)1.52 \cdot (F127)0.06$ calcd: C 53.95%, H 7.35%, N 5.17%, S 6.08%; found: C 53.49%, H 7.28%, N 4.71%, S 6.22%.

Figures 32A, 32B, 32C:
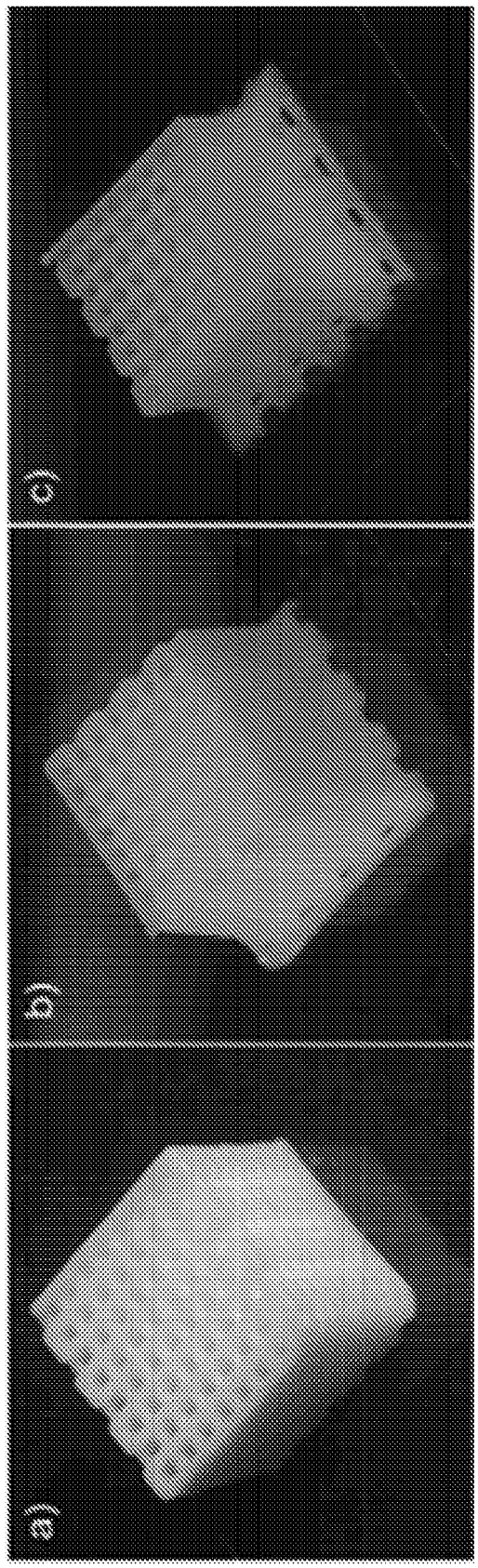
FIG. 32A shows an optical image of organic monolith M5/6 as-printed.
FIG. 32B shows an optical image of organic monolith M5/6 after air-dry at 15% RH.
FIG. 32C shows an optical image of organic monolith M5/6 after UV irradiation for 12 hours.
Figures 32D, 32E:
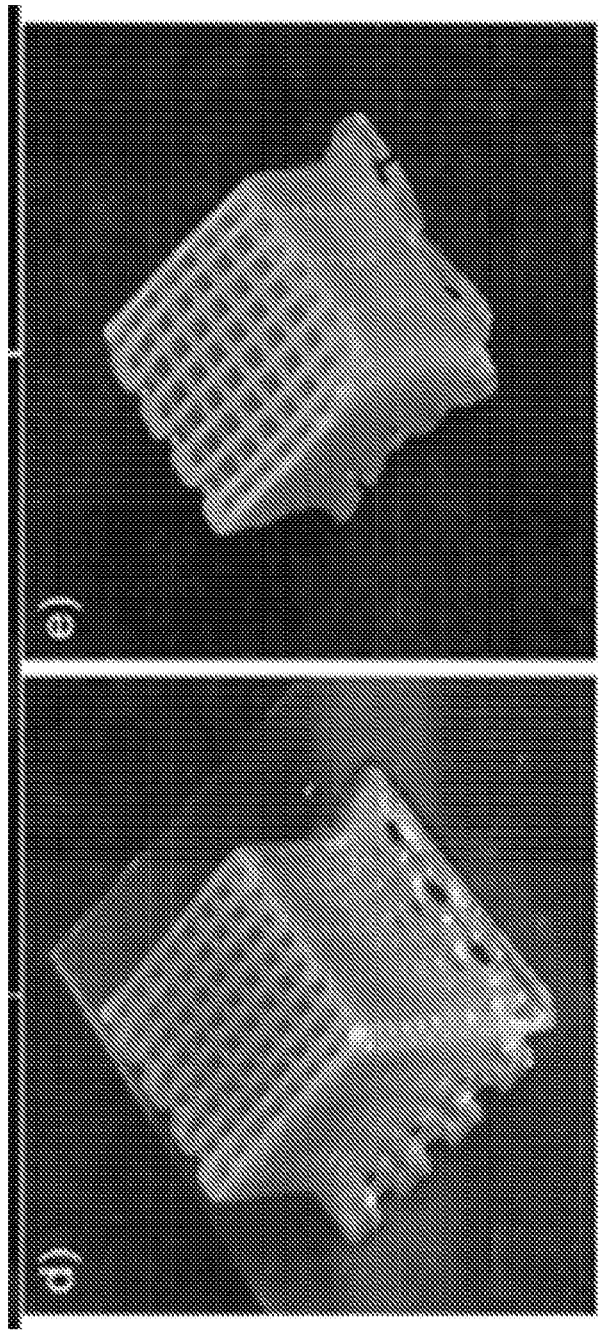
FIG. 32D shows an optical image of organic monolith M5/6 after thermal treatment at 100° C.
FIG. 32E shows an optical image of organic monolith M5/6 after template removal by EtOH extraction.
Figure 33:
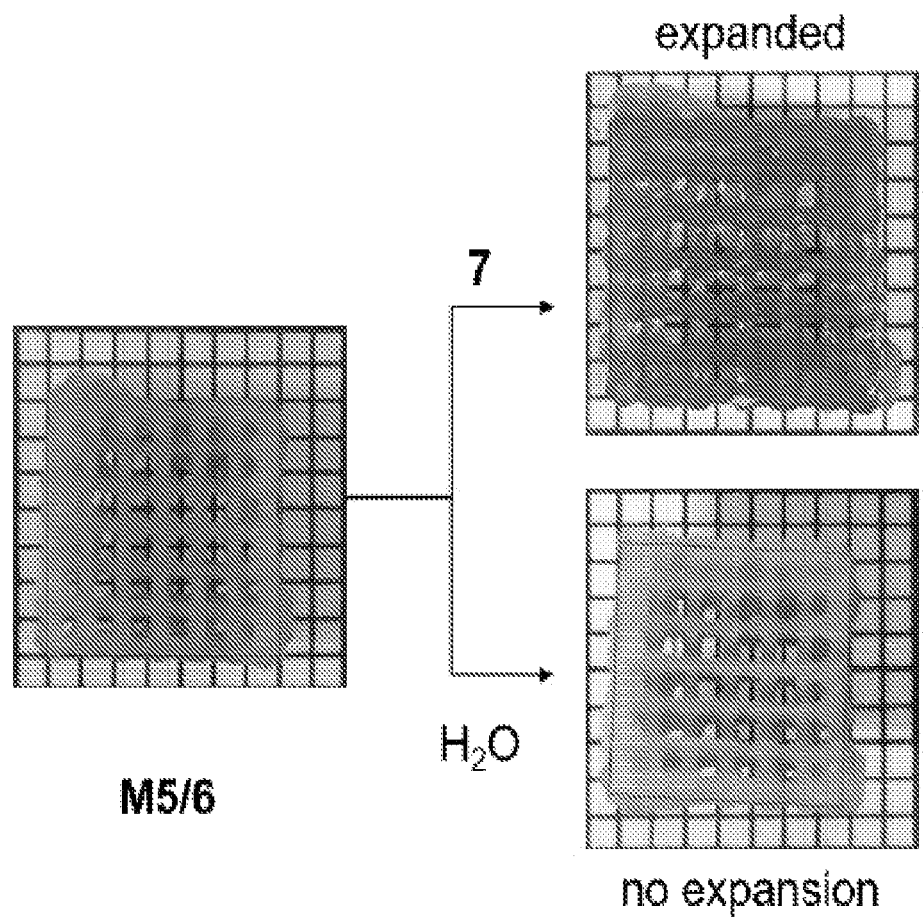
FIG. 33 shows images of M5/6 at room temperature (left), after active insertion of 7 at 80° C. and cooled down to room temperature (right, top) and control (bottom) in water. No size change was recorded for control.

Removal of supramolecular pillar 7. A 7@M5/6 monolith was soaked in DMSO at room temperature for 24 h to remove the supramolecular pillar. The solvent was then exchanged to EtOH followed by H2O to re-generate the monolith M5/6. $^1H$ NMR spectra of 7@M5/6 monolith in DMSO-$d_6$ reveals the gradually removal of pillar 7 from the hydrogen bonding network in M5/6. The insertion and removal of supramolecular pillar 7 has been performed 3 cycles on the same M5/6 monolith. The hydrogel mass increasement after active insertion were recorded as 155%, 164%, 161%, respectively. Another set of optical images of organic monoliths composed of G5/6 at different stages: FIG. 32A, as-printed, FIG. 32B, after air-dried at ~15% RH, FIG. 32C, after UV irradiation for 12 h, FIG. 32D, after thermal treatment at 100° C., and FIG. 32E, after template removal by EtOH extraction. Images of M5/6 at room temperature (left), after active insertion of 7 at 80° C. and cooled down to room temperature (right, top), and a control experiment of M5/6 after heating to 80° C. and cooled down to room temperature in water (right, bottom). No noticeable size change was recorded in the control experiment after the heating-cooling cycle in water. See FIG. 33.

Peptide-Based Co-Assembled Links

General Information

All reagents were purchased from commercial suppliers and used as received unless otherwise specified. Oligopeptide was synthesized through a solid-phase peptide synthesis (SPPS). Nuclear magnetic resonance (NMR) spectra were recorded on Bruker Advance 600 spectrometers with working frequencies of 600 MHz for $^1$H. White-light optical microscope images were recorded using AmScope SM-1TSW2 stereomicroscope, other optical images were recorded using iPhone 7 plus. Rheological measurements were performed on a stress-controlled rheometer (TA instruments, DHR-2) with a 20-mm diameter parallel plate geometry and a measuring gap of 1 mm at room temperature.

Peptide-co-assembled inks (P-ink) was obtained by the following general method. Pluronic F127 (1.25 g, 0.099 mmol) was dissolved in EtOH/H$_2$O (5 mL/5 mL) and peptide molecule FSC-126 (0.25 g, 0.336 mmol)(FIG. 34) was added. The mixture was stirred at room temperature until a clear solution was obtained. Then the mixture was stirred at 250 rpm in the open air to allow slow evaporation of the solvent until a hydrogel (~4.5 mL) was afforded. After centrifuging at 5000 rpm for 5 mins to remove the bubble in the sample, a transparent hydrogel (P-link) was obtained for rheological studies and 3D printing using direct ink writing technology.

Figure 34:
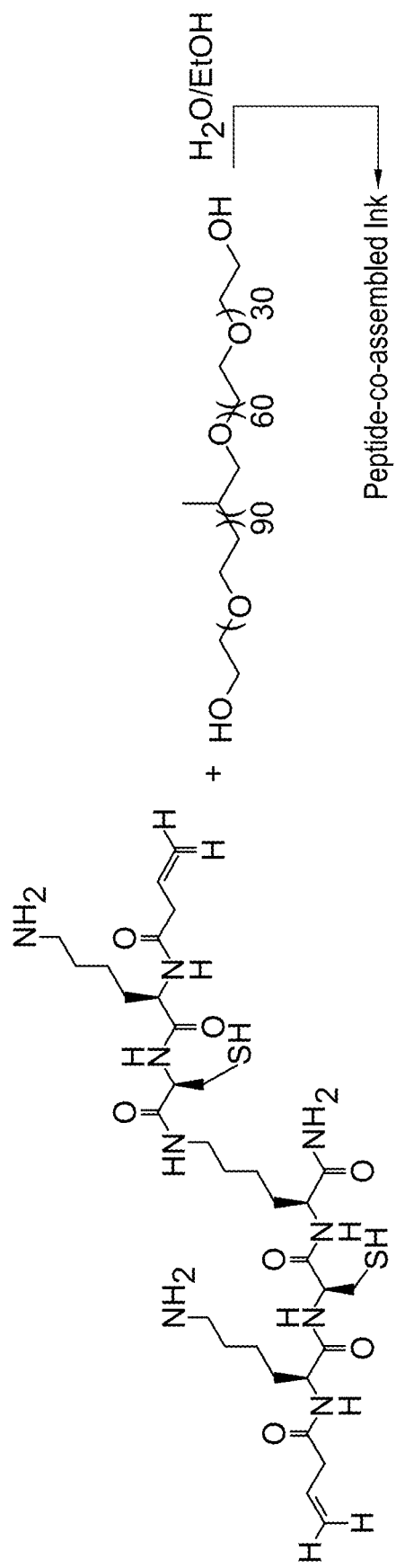
FIG. 34 shows a schematic for preparation of peptide-co-assembled ink.

FIG. 34 shows a scheme for the preparation of the peptide-coassembled link.

Rheological Studies

To investigate of 3D printability of peptide-co-assembled inks, the elastic and loss modulus, viscosity, shear-thinning and self-healing properties need to be known. Based on the requirements for 3D printable ink, four types of rheological measurements were performed.

Oscillation strain sweep: The storage modulus (G') and loss modulus (G") of the prepared ink were recorded with the oscillation strains increased from 0.1% to 100% and an angular frequency of 10 rad/s.

Frequency sweep: Storage modulus (G') and loss modulus (G") were recorded when the angular frequency is increasing from 0.1 rad/s to 100 rad/s. Shear rate flow sweep: Viscosity was recorded over a range of shear rate increased from 0 to 100 s$^{-1}$.

Figure 35B:
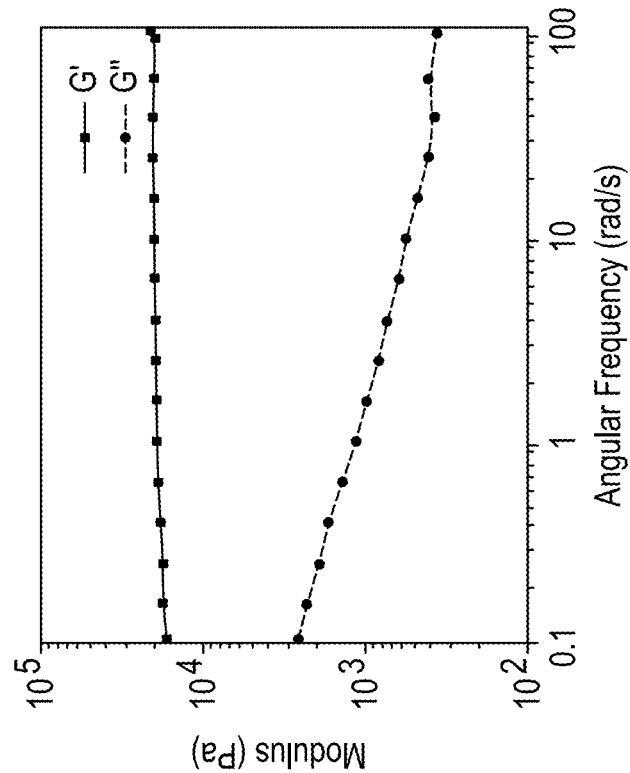
FIG. 35B shows rheological measurements of the peptide-co-assembled ink: angular frequency sweep.
Figure 35A:
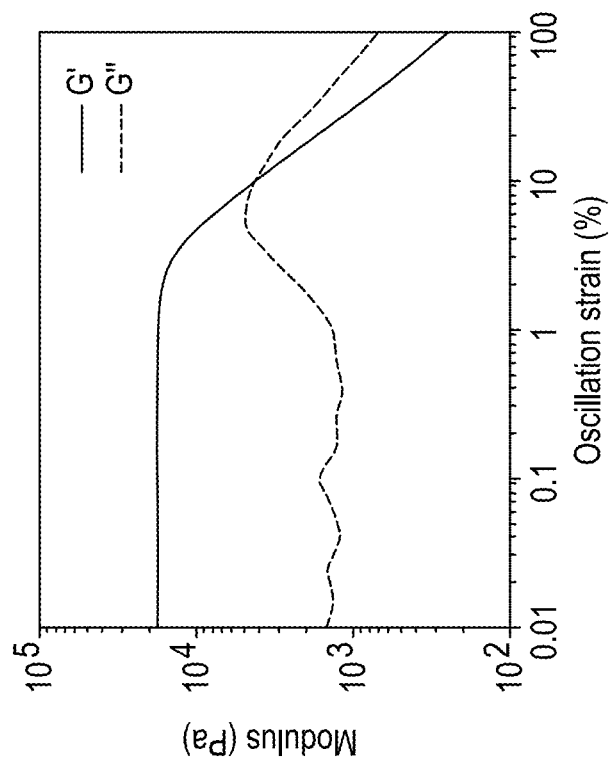
FIG. 35A shows rheological measurements of the peptide-co-assembled ink: strain sweep.
Figure 36B:
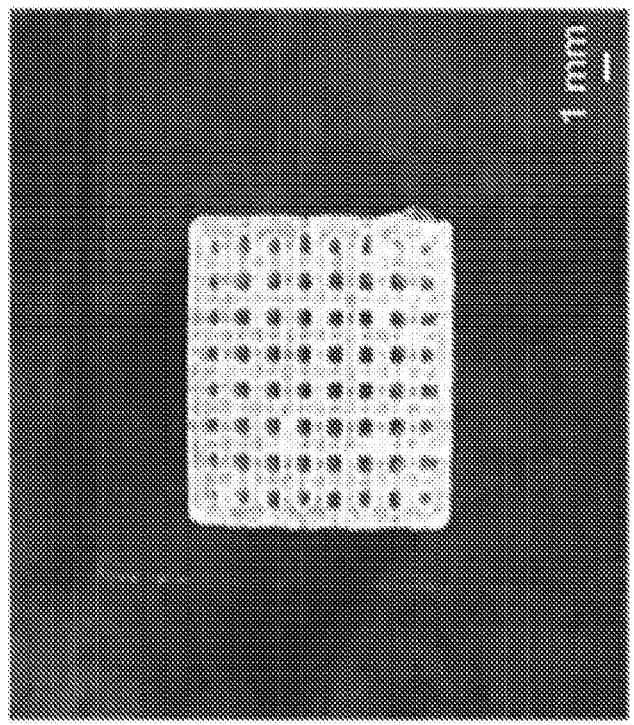
FIG. 36B shows optical image of top view of a printed object comprising peptide co-assembled ink with woodpile lattice feature consisting of four repetitive dispensing layers using a 200 µm tip.
Figure 36A:
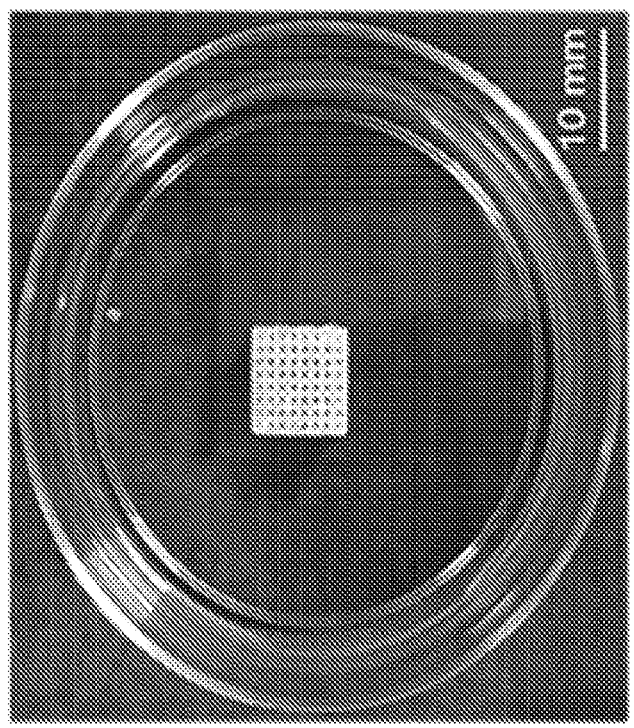
FIG. 36A shows optical image of top view, of a printed object comprising peptide co-assembled ink with woodpile lattice feature consisting of four repetitive dispensing layers using a 200 µm tip.
Figure 36D:
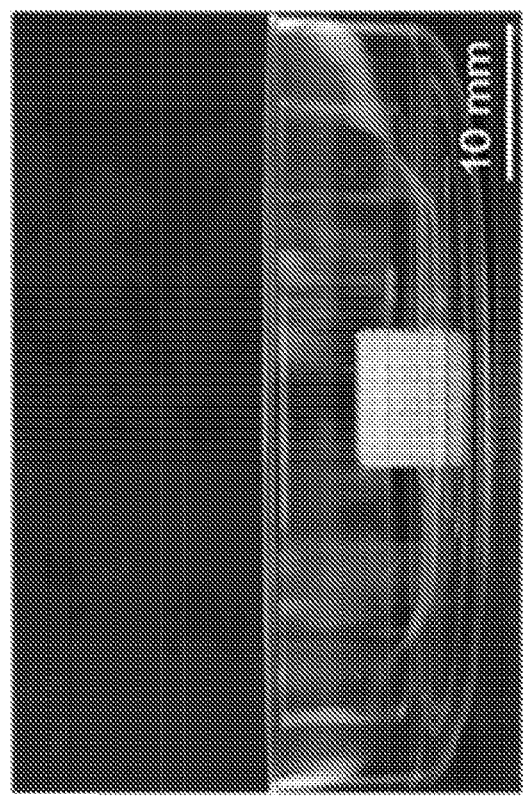
FIG. 36D shows optical images of a side view of a printed object comprising peptide co-assembled ink with woodpile lattice feature consisting of four repetitive dispensing layers using a 200 µm tip.
Figure 36C:
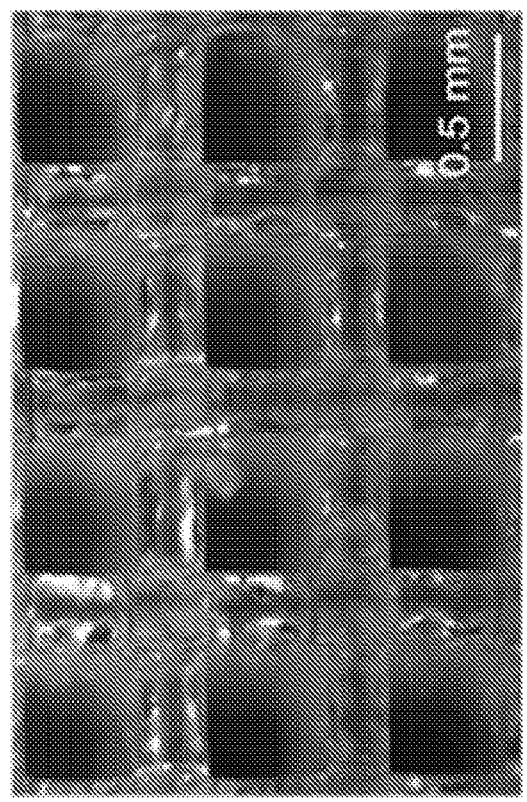
FIG. 36C shows optical images of top view under microscope of a printed object comprising peptide co-assembled ink with woodpile lattice feature consisting of four repetitive dispensing layers using a 200 µm tip.

Dynamic step strain amplitude test: Storage modulus (G') and loss modulus (G") were recorded with strain of 0.1% and 100% alternatively at a frequency of 10 rad/s. The period of each step is 15 s and no equilibrium time in between. FIG. 35A-B shows rheological measurements of the peptide-coassembled link: FIG. 35A, strain sweep; FIG. 35B, angular frequency sweep.

3D Printing Using Direct Ink Writing

Typically, the prepared peptide-co-assembled was loaded into a Nordson EFD syringe barrel (3 mL or 5 mL) and installed onto the 3D printer. The 3D printing experiments were performed on an extrusion-based 3D printer (Tabletop, nScrypt) equipped with either a Nordson EFD precision smoothflower tapered tip or nTips. Printing paths were G-code files generated by scripting using P-CAD or transferred from other 3D printing files. Printing pressure varied from 10-50 psi and speed varied from 5-40 mm/s. Printing substrates were glass sides. FIG. 36A-D shows an object with woodpile lattice feature consisting of four repetitive dispensing layers printed by a 200 μm tip. FIG. 36A-D. Optical images of FIG. 36A, 36B top view, FIG. 36C top view under microscope and FIG. 36D side view of a printed object with woodpile lattice feature consisting of four repetitive dispensing layers using a 200 μm tip.

Post-Printing Process

Synthesis and fabrication of peptide monolith. Objects consisting peptide-co-assemble ink fabricated by 3D printing were transferred to a sealed chamber to allow solvent evaporation at approximately 15% relative humidity (RH) for 24 h. Then these printed objects were photo-irradiated under a mercury lamp for 48 h for thiol-ene crosslinking. After that, the objects were further heated to 70° C. Template F127 was removed by Soxhlet extraction using EtOH after crosslinking. Finally, peptide monoliths were obtained after solvent exchanging using H$_2$O.

Figure 37C:
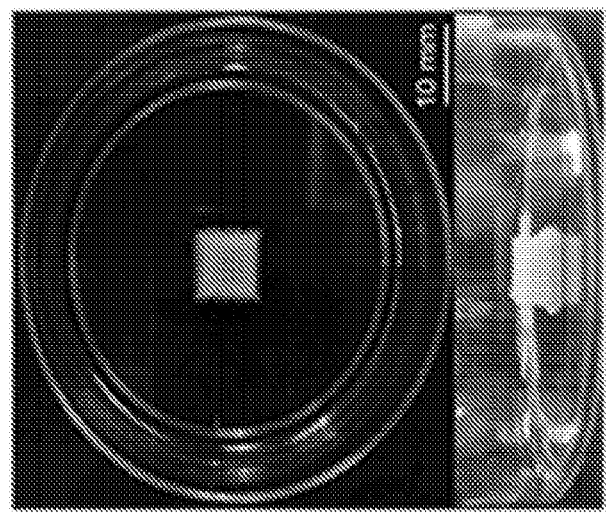
FIG. 37C shows optical image of a printed object with woodpile lattice feature after UV-irradiation.
Figure 37B:
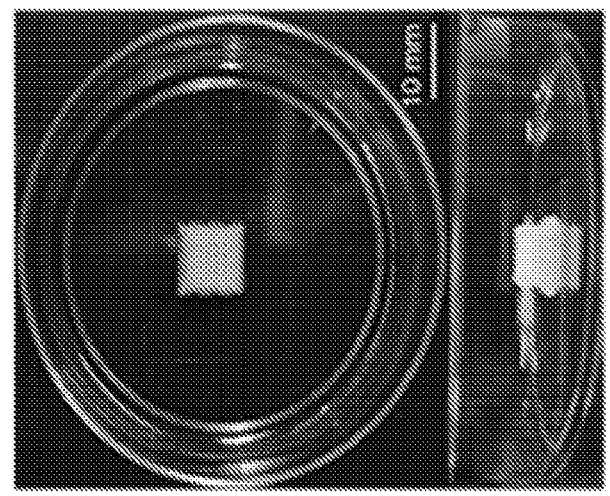
FIG. 37B shows optical image of a printed object with woodpile lattice feature after air-drying at 15% RH.
Figure 37A:
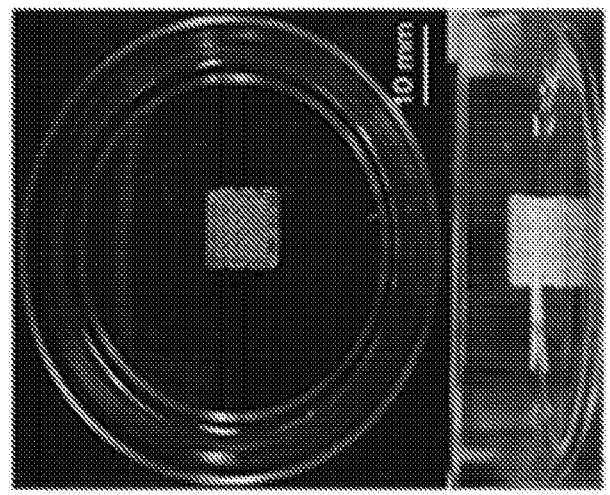
FIG. 37A shows optical image of a printed object with woodpile lattice feature as-printed.
Figure 37E:
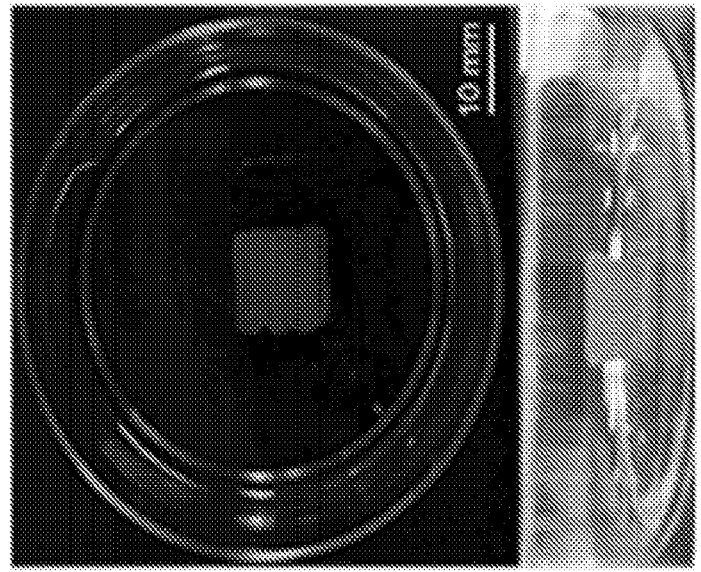
FIG. 37E shows optical image of a printed object with woodpile lattice feature after template removal by EtOH extraction.
Figure 37D:
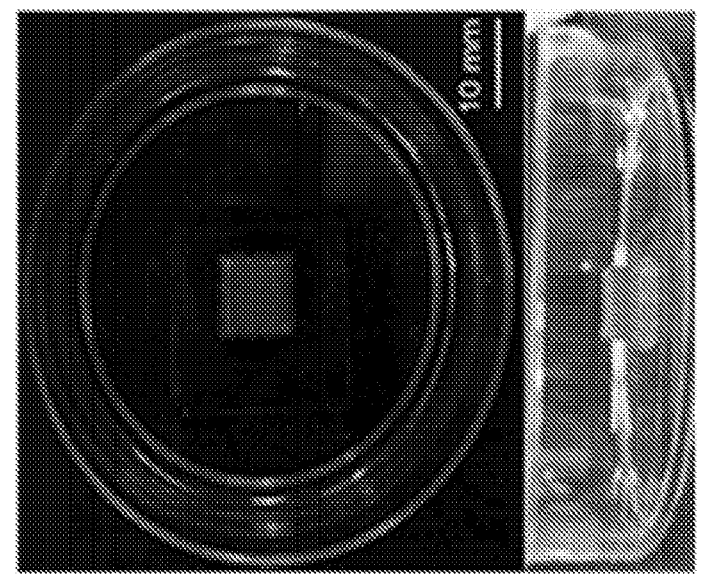
FIG. 37D shows optical image of a printed object with woodpile lattice feature after heating to 70° C.
Figure 38C:
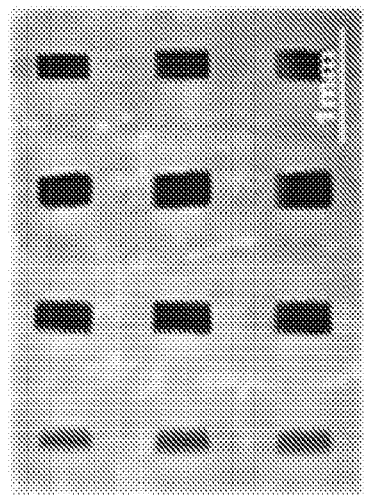
FIG. 38C shows white-light optical microscope images of a printed object with woodpile lattice feature at different stages: after UV irradiation.
Figure 38B:
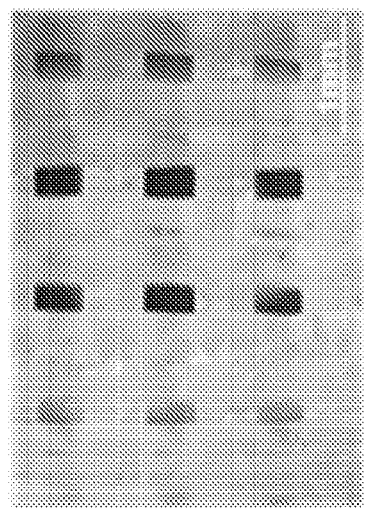
FIG. 38B shows white-light optical microscope images of a printed object with woodpile lattice feature at different stages: after air-dried at ~15% RH.
Figure 38A:
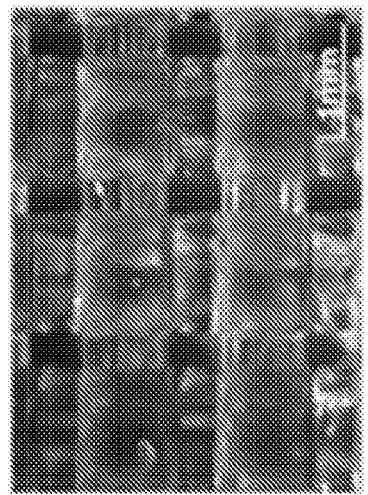
FIG. 38A shows white-light optical microscope images of a printed object with woodpile lattice feature at different stages: as printed.
Figure 38F:
FIG. 38F shows white-light optical microscope images of a printed object with woodpile lattice feature at different stages: after template removal by EtOH extraction. The photographed areas were different.
Figure 38E:
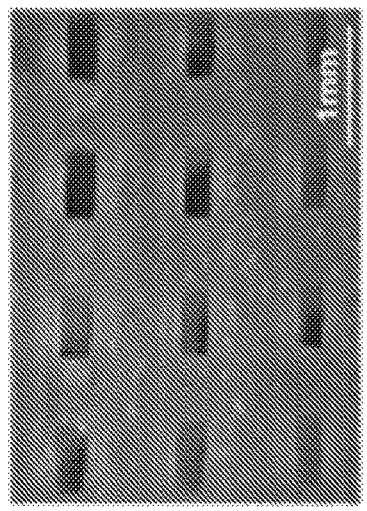
FIG. 38E shows white-light optical microscope images of a printed object with woodpile lattice feature at different stages: after template removal by EtOH extraction. The photographed areas were different.
Figure 38D:
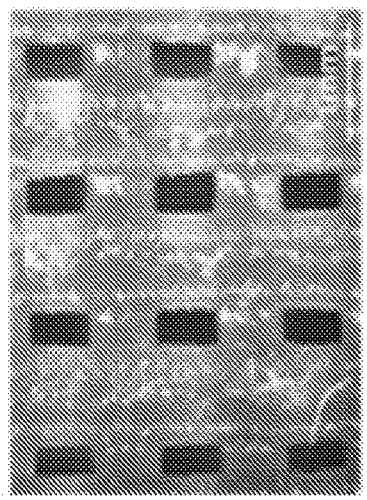
FIG. 38D shows white-light optical microscope images of a printed object with woodpile lattice feature at different stages: after heating at 70° C.

FIG. 36A-D show optical images of (36A, 36B) top view, (36C) top view under microscope and (36D) side view of a printed object with woodpile lattice feature consisting of four repetitive dispensing layers using a 200 μm tip. FIG. 37A-D. Optical images of a printed object with woodpile lattice feature at different stages: FIG. 37A, as printed, FIG. 37B, after air-dried at ~15% RH, FIG. 37C, after UV irradiation, FIG. 37D after heating at 70° C. and FIG. 37E, after template removal by EtOH extraction. FIG. 38A-D. White-light optical microscope images of a printed object with woodpile lattice feature at different stages: FIG. 38A, as printed, FIG. 38B, after air-dried at ~15% RH, FIG. 38C, after UV irradiation, FIG. 38D, after heating at 70° C. and FIG. 38E, 38F, after template removal by EtOH extraction. The photographed areas were different.

REFERENCES

S1. H. Matsukizono, H. Murada, R.-H. Jin. Chem.-Eur. J. 2014, 20, 1134-1145.

S2. M. Garca-lglesias, B. F. M. de Waal, I. de Feijter, A. R. A. Palmans, E. W. Meijer. Chem.-Eur. J. 2015. 21, 377-385.

S3. X. Q. Zhang, X. L. Wang, S. W. Huang, R. X. Zhuo, Z. L. Liu, H. Q. Mao, K. W. Leong. Biomacromolecules, 2005, 6, 341-350.

S4. S. M. Hong. Faming Zhuanli Shenqing, 2014, CN 104151257 A 20141119.

S5. B. Wijnen, E. J. Hunt, G. C. Anzalone, J. M. Pearce. Plos One 2014, 9, 107216.

S6. C. Kulkarni, E. W. Meijer, A. R. A. Palmans. Acc. Chem. Res. 2017, 50, 1928-1936.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Many of the molecules disclosed herein contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method of manufacturing a 3-D structure, the method comprising:
   (a) delivering one or more supramolecular polymer compositions onto a surface of a substrate to form the 3-D structure, wherein the 3-D structure comprises internal cavities or voids that are interconnected in one, two or three dimensions within the structure;
   wherein the supramolecular polymer composition comprises a template-monomer co-assembled supramolecular polymer structure comprising:
   i) a solvent;
   ii) a template molecule comprising an at least partially linear amphiphilic or hydrophilic polymer;
   iii) a reactive component comprising at least one monomer, wherein the monomer is capable of hydrogen bonding with the template molecule to form a 1D supramolecular structure, and wherein the monomer comprises least two groups capable of covalent cross-linking;
   wherein the supramolecular polymer composition has a suitable viscoelastic property which allows for 3-D printing of the supramolecular polymer composition to form a 3-D structure, and is capable of re-co-assembly after 3-D printing to maintain the printed three dimensional (3-D) macrostructural form.

2. The method of claim 1, wherein the method further comprises the step of providing conditions for polymerization for the delivered composition.

3. The method of claim 1, wherein the method of delivering comprises additive manufacturing or 3-D printing.

4. The method of claim 1, wherein the template-monomer co-assembled supramolecular structure is retained during an at least partial evaporation of the solvent.

5. The method of claim 2, wherein the method further comprises the step of removing the template molecule.

6. The method of claim 5, wherein the step of removing the template molecule causes the formation of a mesoporous structure.

7. The method of claim 1, wherein the at least partially linear amphiphilic or hydrophilic polymer is ionic or nonionic.

8. The method of claim 1, wherein the at least partially linear amphiphilic or hydrophilic polymer is a nonionic amphiphilic polymer.

9. The method of claim 8, wherein the nonionic amphiphilic polymer is present at a concentration above its critical micellular concentration (cmc).

10. The method of claim 8, wherein the nonionic amphiphilic polymer is a copolymer comprising at least one block of lesser hydrophilicity and at least one hydrophilic block.

11. The method of claim 8, wherein the nonionic amphiphilic polymer is a copolymer comprising at least one hydrophilic central block and at least two terminal hydrophilic blocks of comparatively lesser hydrophilicity.

12. The method of claim 8, wherein the at least partially linear polymer is a nonionic polymer wherein the hydrophilic blocks are selected from the group consisting of polyethylene oxide (PEO), polyethylene imide, and polyvinyl alcohol, and the block of lesser hydrophilicity is selected from the group consisting of polypropylene oxide (PPO), polydimethylsiloxane (PDMS), polystyrene, and polycaprolactone (PCL).

13. The method of claim 8, wherein the nonionic amphiphilic polymer is a biocompatible polymer.

14. The method of claim 8, wherein the nonionic amphiphilic polymer is a copolymer comprising poly(ethylene oxide) and poly(propylene oxide).

15. The method of claim 8, wherein the amphiphilic polymer is a PPO-PEO-PPO triblock copolymer.

16. The method of claim 1, wherein the at least partially linear amphiphilic or hydrophilic polymer is a nonionic hydrophilic polymer.

17. The method of claim 16, wherein the nonionic hydrophilic polymer is a biocompatible polymer.

18. The method of claim 17, wherein the nonionic hydrophilic polymer is a polymer or copolymer comprising poly(ethylene oxide).

19. The method of claim 1, wherein the solvent is an aqueous solvent.

20. The method supramolecular polymer composition of claim 19, wherein the solvent comprises ethanol and water, or the solvent comprises ethanol, water, and tetrahydrofuran (THF).

21. The method of claim 1, wherein the monomer is a hydrolysable organosilicate compound.

22. The method of claim 21, wherein the monomer is selected from tetraethyl orthosilicate (TEOS) or a compound represented by Formula 1

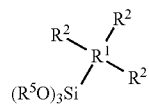
(Formula 1)

wherein
$R^1$ is substituted or unsubstituted $C_1$-$C_{20}$ alkylene, substituted or unsubstituted $C_1$-$C_{20}$ alkenylene, substituted or unsubstituted $C_1$-$C_{20}$ cycloalkylene, substituted or unsubstituted $C_1$-$C_{20}$ cycloalkenylene, substituted or unsubstituted $C_5$-$C_{20}$ arylene, or substituted or unsubstituted $C_5$-$C_{20}$ heteroarylene;
$R^5$ is independently selected from $C_1$-$C_4$ alkyl; and
each $R^2$ is independently null, H, or —Si(OR$^5$)$_3$.

23. The method of claim 22, wherein the monomer is selected from a compound represented by Formula 2:

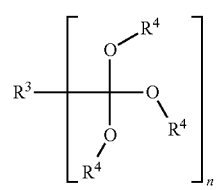
(Formula 2)

wherein
$R^3$ is selected from $R^1$ is substituted or unsubstituted $C_1$-$C_{20}$ alkylene, substituted or unsubstituted $C_1$-$C_{20}$ alkenylene, substituted or unsubstituted $C_1$-$C_{20}$ cycloalkylene, substituted or unsubstituted $C_1$-$C_{20}$ cycloalkenylene, substituted or unsubstituted $C_5$-$C_{20}$ arylene, or substituted or unsubstituted $C_5$-$C_{20}$ heteroarylene;
$R^4$ is independently selected from $C_1$-$C_4$ alkyl; and
n is 1, 2, 3, 4, 5, or 6.

24. The method of claim 23, wherein the monomer is a compound represented by Formula 2 or Formula 3:

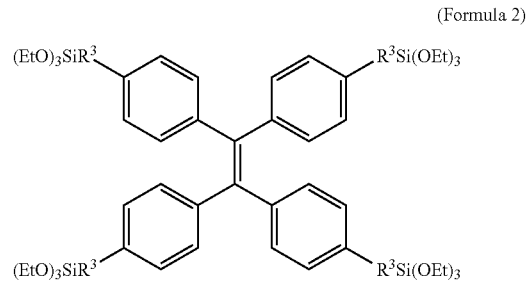
(Formula 2)

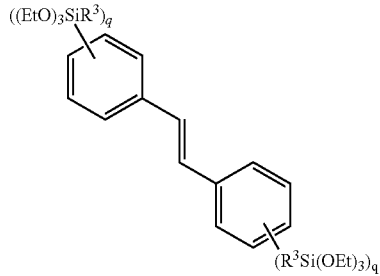
(Formula 3)

wherein R³ is independently —R⁷NC(O)R⁷—, —R₇C(O)NR⁷—, R⁷NC(O)NR⁷—, —R⁷NCO₂R⁷—, —R⁷O₂R⁷—, —R⁷(NH)NR⁷—, —C(NH)NR⁷—, —R⁷C(NH)NR⁷—, —S(O)₂NR⁷—, —R⁷SO₂NHCOR⁷—, —R⁷SO₂NR⁷—, —R⁷SO₂R⁷—;

each R⁷ is the same or different and is independently selected from null, an alkylene, cycloalkylene, alkenylene, cycloalkenylene or alkynylene group;

wherein q is selected from 1, 2, 3, or 4.

25. The method of claim 1, wherein the at least one monomer comprises aryl linked to the at least two crosslinking groups through a linker comprising at least one hydrogen bonding group.

26. The method of claim 24, wherein the at least one monomer is a compound represented by Formula 3:

(Formula 3)

wherein:
X is aryl;
L is a hydrogen bonding group;
Y is a crosslinkable group; and
m is 2, 3, 4, 5 or 6.

27. The method of claim 26, wherein X is selected from the group consisting of:

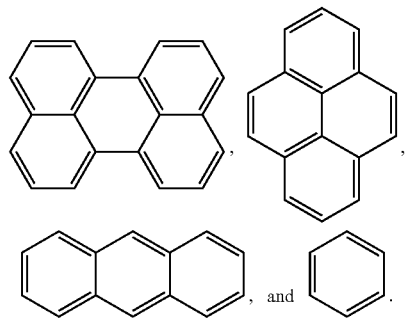

28. The method of claim 26, wherein Y is selected from the group consisting of:

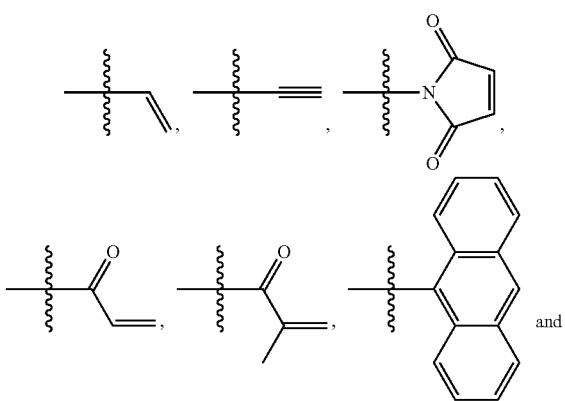

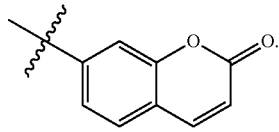

29. The method of claim 26, wherein L is a hydrogen bonding group and is selected from the following:

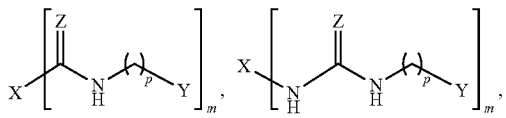

wherein
Z is O or S,
p is 0, 1, 2, 3, 4, or 5; and
m is 2, 3, 4, 5, or 6.

30. The method of claim 26, wherein the hydrogen bonding group is a urea, carboxamide group and the aryl group is substituted or unsubstituted $C_5$-$C_{20}$ arylene, or substituted or unsubstituted $C_5$-$C_{20}$ heteroarylene.

31. The method of claim 25, wherein the monomer comprises

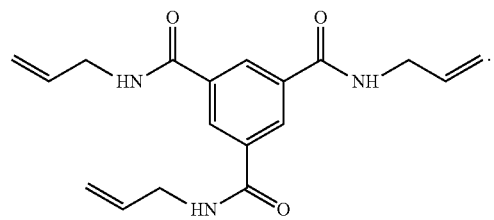 [SMILES: C=CCNC(=O)c1cc(C(=O)NCC=C)cc(C(=O)NCC=C)c1 ; "."]

32. The method of claim 1, wherein the monomer comprises an oligopeptide comprising at least three peptide residues linked to least two crosslinkable groups.

33. The method of claim 32, wherein the oligopeptide comprises at least one cysteine residue and at least two cysteine-reactive crosslinkable groups, or wherein the oligopeptide comprises at least two cysteine residues and at least one cysteine-reactive crosslinkable groups.

34. The method of claim 33, wherein the oligopeptide is a compound of Formula 4:

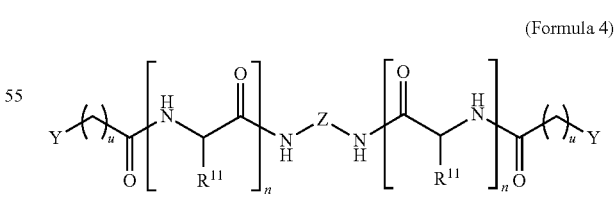

(Formula 4)

wherein
each $R^{11}$ is independently an amino acid residue side group;
Z is a linking group comprising substituted or unsubstituted $C_1$-$C_{20}$ alkylene, substituted or unsubstituted $C_1$-$C_{20}$ alkenylene, substituted or unsubstituted $C_1$-$C_{20}$ cycloalkylene, substituted or unsubstituted $C_1$-$C_{20}$ cycloalkenylene, substituted or unsubstituted $C_5$-$C_{20}$ arylene, or substituted or unsubstituted $C_5$-$C_{20}$ heteroarylene;

Y is selected from the group consisting of

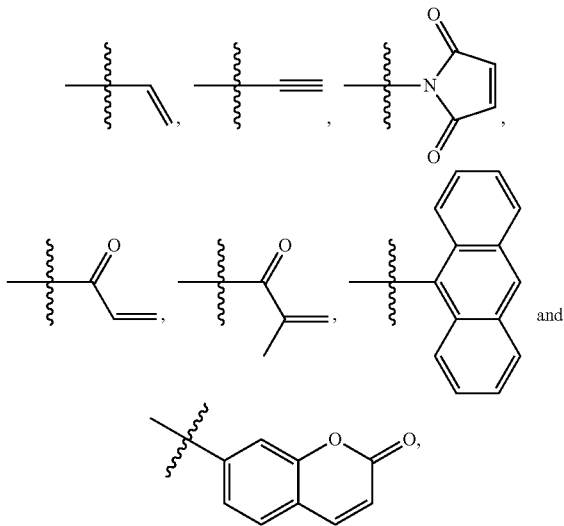

u is 0, 1, 2, 3, 4, 5, or 6; and
n is 1, 2, 3, 4, 5, 6, 7 or 8.

35. The method of claim 34, wherein $R^{11}$ is $H_2NR_{12}$—, $H_2NCOR^{12}$—, $HSR^{12}$—, $HO_2R^{12}$—, or $R^{13}R^{12}$—, wherein $R^{12}$ is substituted or unsubstituted $C_1$-$C_{20}$ alkylene, substituted or unsubstituted $C_1$-$C_{20}$ alkenylene and $R^{13}$ is imidazoline, pyrazolidine, pyrrolidine, triazoline, pyridine, diazine, or triazine.

36. The method of claim 35, wherein at least one $R^{11}$ is $HSR^{12}$—, and at least one $R^{11}$ is selected from $H_2NR^{12}$—, $H_2NCOR^{12}$—, or $R^{13}R^{12}$—, and Z is —$NR^{14}N$—, wherein $R^{14}$ is substituted or unsubstituted $C^1$-$C^{20}$ alkylene, substituted or unsubstituted $C^1$-$C^{20}$ alkenylene.

37. The method of claim 1, wherein the monomer is a hydrolysable organosilicate compound and wherein the template-monomer co-assembled supramolecular polymer structure has a molar ratio of about 150:1 monomer to template molecule in the template-monomer co-assembled supramolecular polymer structure.

38. The method of claim 37, wherein the solvent further comprises a water-soluble acidic compound.

39. The method of claim 38, wherein the acid is acetic acid and is present in the composition at a ratio of about 1:1 with the template molecule.

40. The method of claim 1, wherein the monomer is present in the template-monomer co-assembled supramolecular polymer structure in a molar ratio of about 1:1 monomer:template.

41. The method of claim 40, wherein the template-monomer co-assembled supramolecular polymer structure comprises a second crosslinking monomer in an amount of about 1:3.8 monomer:second crosslinking monomer.

42. The method of claim 1, wherein the storage modulus of the supramolecular polymer composition is at least about 1 kPa.

43. The method of claim 1, wherein the storage modulus of the supramolecular polymer composition is between about 1-100 kPa.

44. The method of claim 1, wherein the viscosity at a shear rate of 1 $s^{-1}$ and 25° C. of the supramolecular polymer composition is between 5-5000 Pa·s.

45. The supramolecular polymer composition of claim 44, wherein the covalent crosslinking is a photo-initiated free radical reaction.

* * * * *